(12) United States Patent
Battilana

(10) Patent No.: US 8,726,148 B1
(45) Date of Patent: *May 13, 2014

(54) METHOD AND APPARATUS FOR PROCESSING TEXT AND CHARACTER DATA

(75) Inventor: Michael C. Battilana, Las Vegas, NV (US)

(73) Assignee: CLOANTO Corporation, Las Vegas, NV (US)

(*) Notice: Subject to any disclaimer, the term of this patent is extended or adjusted under 35 U.S.C. 154(b) by 315 days.

This patent is subject to a terminal disclaimer.

(21) Appl. No.: 12/868,029

(22) Filed: Aug. 25, 2010

Related U.S. Application Data

(63) Continuation-in-part of application No. 11/131,915, filed on May 18, 2005, now Pat. No. 7,802,184, which is a continuation of application No. 09/675,441, filed on Sep. 28, 2000, now abandoned.

(60) Provisional application No. 60/156,377, filed on Sep. 28, 1999.

(51) Int. Cl.
*G06F 3/00* (2006.01)

(52) U.S. Cl.
USPC ............................................... 715/234

(58) Field of Classification Search
USPC .................. 715/234, 244, 254, 243
See application file for complete search history.

(56) References Cited

U.S. PATENT DOCUMENTS

| | | | |
|---|---|---|---|
| 5,623,682 A * | 4/1997 | Fukunaga | 715/210 |
| 5,761,689 A | 6/1998 | Rayson et al. | |
| 6,047,300 A | 4/2000 | Walfish et al. | |
| 6,424,983 B1 | 7/2002 | Schabes et al. | |
| 6,631,501 B1 | 10/2003 | Jurion et al. | |

FOREIGN PATENT DOCUMENTS

| | | |
|---|---|---|
| EP | 0588538 | 3/1994 |
| GB | 2325073 | 11/1998 |
| WO | WO 97/05541 | 2/1997 |
| WO | WO 00/35091 | 6/2000 |

OTHER PUBLICATIONS

Yarowsky, David, "Decision Lists for Lexical Ambiguity Resolution: Application to Accent Restoration in Spanish and French", pp. 88-95, 1994.

* cited by examiner

*Primary Examiner* — Kyle Stork
(74) *Attorney, Agent, or Firm* — Suiter Swantz pc llo

(57) ABSTRACT

Methods and systems for processing text or character data are disclosed. A text processing system receives a character input string and determines whether to apply character processing. A non-English language such as Italian can be entered into a processing system such as a computer using a standard English based keyboard such that additional keys for providing accents or other grammatical and punctuation symbols or characters not existing in English are unnecessary. In one mode, text is automatically accented or punctuated without requiring user intervention. In another mode, a user is provided with a list of accent or punctuation choices so that the user may select the optimum accent or punctuation. Text processing of an input may be activated by a predefined activator key pressed in a predetermined sequence, or may be activated in the event a predetermined sequence of characters is received.

15 Claims, 6 Drawing Sheets

METHOD AND APPARATUS FOR PROCESSING TEXT AND CHARACTER DATA

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, or for any and all parent, grandparent, great-grandparent, etc. applications of the Related Application(s)).

RELATED APPLICATIONS

The present application constitutes a continuation-in-part of and claims priority to U.S. patent application Ser. No. 11/131,915, filed May 18, 2005 which is currently co-pending, or is an application of which a currently co-pending application is entitled to the benefit of the filing date.

The present application constitutes a continuation-in-part of and claims priority to U.S. patent application Ser. No. 09/675,441 filed Sep. 28, 2000, which is currently co-pending, or is an application of which a currently co-pending application is entitled to the benefit of the filing date.

The present application claims priority to U.S. Patent Provisional Application Ser. No. 60/156,377, filed Sep. 28, 1999, which is an application of which a currently co-pending application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

FIELD OF THE INVENTION

The present invention generally relates to the field of information processing, and particularly to a character processing system.

BACKGROUND OF THE INVENTION

The advent of computer technology has revolutionized the way in which people around the world communicate. One area in which computer technology has provided change is in word and text processing applications. The first typewriters and computer terminals, which still set standards for text keyboard layouts, such as the "QWERTY" and "Dvorak" configurations, and for computer text encoding including the American Standard Code for Information Interchange (ASCII) and the Extended Binary Coded Decimal Interchange Code (EBCDIC), were invented and widely used in the United States, which continues to be the primary market for the introduction of such devices, and in which English is the official language. English is also both the most popular second language, as well as the second most popular mother language in the world. Written English uses the Roman alphabet with no diacritical marks (26 characters in upper and lower case: A, B, C, D, E, F, G, H, I, J, K, L, M, N, O, P, Q, R, S, T, U, V, W, X, Y and Z). Most other languages that use the Roman alphabet use an extended version of such alphabet, where diacritical marks such as accents and umlauts, for example À, Á, Â or Ä, are combined with certain alphabetical characters that are also used in English such as A. The characters that are present on keyboards designed for the English language are also present in most keyboards designed for other languages, whereas the additional non-English characters vary widely from keyboard design to keyboard design, depending on the target languages (e.g., German, French, Italian, etc.). In a similarly limiting way, the first definitions of computer character sets, which specify how each character is to be stored in computer memory, did not assign codes to letters other than the 26 upper case and 26 lower case letters used in English. The most important of these first character sets, which are still in use today, are ASCII, where 7 bits out of 8 are used to store information, and EBCDIC, which uses 8 bits of data, and is based on IBM's earlier BCD encoding. In the ASCII set, the upper range of 128 codes having the $8^{th}$ bit set was left undefined and unused. Similarly, in EBCDIC, certain blocks of codes were left unused. Over the years, both character sets have been extended in order to store certain non-English letters, either by replacing certain non-alphabetical characters with non-English alphabetical ones, or by assigning some codes which had originally been left undefined. As newer character sets were defined, these in general maintained backward compatibility with either ASCII or EBCDIC. Even newer 16-bit and 32-bit global character encoding schemes (e.g., Unicode) retain, for compatibility, the original subset of 7-bit ASCII codes. This illustrates how, both for the layout of text input keyboards, as well as for character encoding definitions, there is a subset of characters which is in large part both privileged and standard. This subset includes the 26 letters from A to Z, in upper and in lower case (a total of 52 alphabetical letters), the 10 digits, as well as certain spacing and punctuation signs, and other signs such as the "apostrophe" (ASCII decimal code 39), and the "grave" character (ASCII decimal code 96), which is very similar to the "apostrophe". Neither the original ASCII nor the original EBCDIC character encoding set provide support for letters used in non-English languages such as Italian. This means that on systems that employ these character sets there is no accepted standard for encoding, for example all the accented letters used in Italian. Thus there lies a need for a text processing system that allows the accents and punctuation of a non-English language to be processed by an English based system using standard English based input devices such as a QWERTY keyboard.

SUMMARY OF THE INVENTION

The present invention is directed to an apparatus for processing character or text input. In one embodiment, the apparatus includes means for receiving an input, means for determining whether to execute character processing on the input, means for executing character processing on the input whereby an output is produced representative of the character processed input, and means for providing the output to an output system.

The present invention is further directed to a method for processing character or text input. In one embodiment the method includes steps for receiving an input, determining whether to process the input according to a predetermined character processing rule, in the event it is determined to process the input, processing the input according to a predetermined character processing rule whereby and output representative of the processed input is produced, and providing the output to an output system.

The present invention is directed in one embodiment to a character encoding and decoding method that allows accented letters to be stored using a standard unmodified character set, such as 7-bit ASCII. The encoding method of the present invention can be applied to a stream of data originating either from a file or from keyboard input events, as well as from other sources. The basic encoding method can be extended to detect and correct different types of errors in the input text, as well as to give total control to the user, to handle, for example, exceptions as well as "deliberate errors".

A text encoding method whereby certain combinations of characters in a stream of text input events are converted to other characters in the output stream, in consideration of the available input device, the input and output character sets, text context, language rules, character input timing information, and custom parameters. Several ways to interface with the host environment are considered. Custom parameters, both to configure the operation of the invention, as well as to update the language rules and the database of character sets, can be entered by means of a dedicated interface, or by entering appropriate data into the input stream.

This invention provides different and innovative ways to encode diacritical marks, apostrophes and other word-related signs, optionally correcting any errors that are found. The error management part of this invention is not a general-purpose text error correction system, although it could be interfaced with one. Automatic error correction within the scope of this invention is focused on accents, apostrophes and other signs used by the encoding techniques described here, and is useful to make the technique described here reliable and usable for languages in which hints and activation sequences provided in the input stream (e.g. by the user) are, alone, not sufficient to define a character in an unambiguous and error-free way. Accent encoding limitations are common both to keyboards and to character set codes, and both can be treated as the source of a text input stream. This invention can be applied to overcome the limitations of both keyboard input data, and text file data, as well as other, similar text streams. When applied in real time, this invention greatly eases typing of text in Italian and in languages with similar properties, making it possible to reduce the number of keys on a keyboard normally required for typing text in such languages, as well as allowing for a keyboard not designed for such languages to be used, and virtually eliminating errors involving diacritical marks, while providing for simple handling of exceptions. For Italian, this invention specifies different types of logic that can be applied to resolve specific ambiguities and errors typical of Italian writing. This invention can also be very useful for German, Spanish, and other languages in which such logic is not necessary (because hints and activation sequences present in the text input stream are sufficient to unambiguously define a character), but, for reasons such as the lack of certain national characters in the keyboard or character set, a simpler way to input national characters than the methods currently in use is desirable. Additionally, this invention provides for different ways to easily program and input characters which may not yet be encoded on a keyboard or character set, such as, for example, the symbol for the euro currency.

This invention includes a simple set of rules that can be implemented in real time even on the slowest of today's handheld computers. More sophisticated options are available for more powerful and professional systems. This invention also allows for the encoding, decoding and editing of text in Italian and similar languages using standard 7 bit ASCII character codes, thereby reducing text complexity and storage requirements compared to encoding methods which employ 8 or more bits of information per character. This method also allows for the automatic correction and processing of text streams employing 7, 8 or more bits of significant character information by automatically recognizing factors such as the character encoding set and the language of the text, and appropriately applying the encoding method. This method is capable of normalizing text to a standard format so that it can more effectively be indexed or used for comparisons and searches in applications such as Internet search engines, or the search functions in word processing and database applications.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
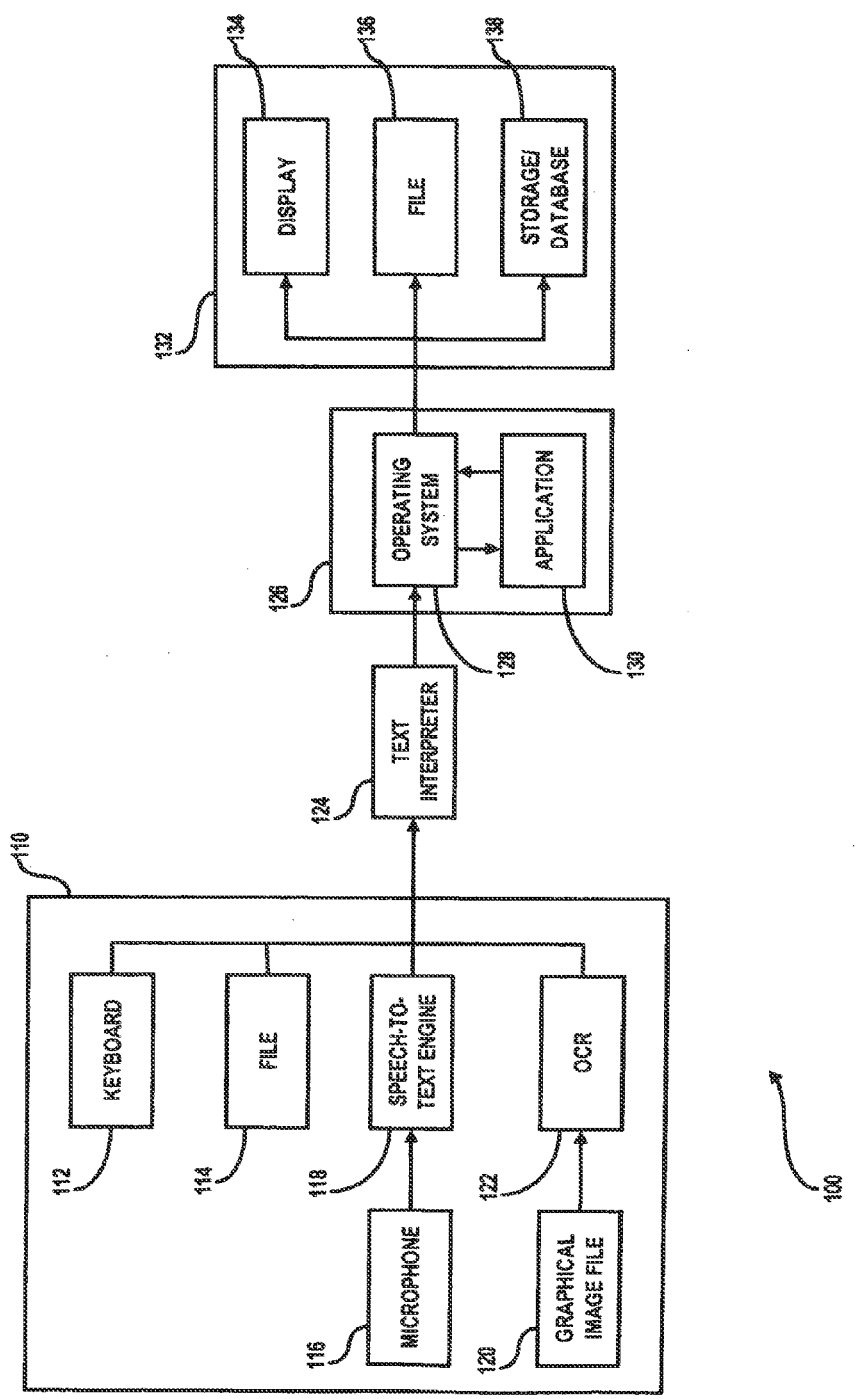
FIG. 1 is a block diagram of an overall system level embodiment of the present invention.

Referring now to FIG. 1, a block diagram of an overall system embodiment of the present invention will be discussed. The system 100 includes a text input system 110 that includes at least one or more of several means by which text or character data may be provided as input to processing system 126. Text input system 110 may comprise, for example, a keyboard 112 with which a user is able to manually enter or type text or characters to provide a text or character input stream, or a file 114 in which text or characters are stored in a format that is capable of being read, interpreted and processed by processing system 126. Furthermore, input system 110 may include a microphone 116 coupled to a speech-to-text engine 118 such that words or utterances spoken by a user are processed into a text or character stream that is capable of being interpreted and processed by processing system 126. Additionally, input system 110 may include a graphical image file 120 generated by optically scanning a text document that is then processed by an optical character reader that is capable of producing text or characters that are capable of being interpreted and processed by processing system 126.

Processing system 126 may be any type of system that is capable of processing and editing text or character input. In one embodiment, for example, processing system 126 includes an operating system 130 for controlling an application 130 that is capable of processing and editing a text or character stream provided to processing system 126. For example, application 130 may be a standard word processor such as MICROSOFT WORD for running under operating system 128 that may be, for example, MICROSOFT WINDOWS 98 or MICROSOFT WINDOWS NT, all of which being available from Microsoft Corporation of Redmond, Wash. As text or character data is processed by application 130, operating system 126 is capable of causing the resulting output of application 130 to be provided to output system 132. Output system 132 may include, for example, display 134 for displaying the output of application 130 in a format readable by a viewer, file 136 for storing the output of application 136 for later retrieval by operating system 126, or a storage database 138 wherein the output is stored in a format readable by other applications or by other computer systems.

In operation of the present invention, a text interpreter 124 receives an incoming text or character stream provided by input system 110 and processes the text or character stream in accordance with predetermined text processing rules. Text interpreter 124 may be tangibly embodied, for example, as a stand-alone hardware or firmware device connected between input system 110 and processing system 124. Alternatively, text interpreter 124 may be directly incorporated into one or more input devices 112-122 as hardware, firmware, software, or a combination thereof. In a further alternative embodiment, text interpreter 124 may be incorporated in processing system 126 as a hardware device, as firmware, as software or as a combination thereof. For example, text interpreter 124 may be included as a portion or subroutine of operating system 128 or application 130. Alternatively, text interpreter 124 may itself be a stand-alone application that is capable of providing an output directly to output system 132 or that is capable of being read and interpreted by application 130. In a further alternative embodiment, text interpreter 124 is capable of operating simultaneously and in conjunction with application 130. Thus, one having skill in the art would appreciate that the placement of text interpreter between text input system 110 and processing system 126 is for example purposes and need not be limited to the position illustrated in FIG. 1. As alternative embodiments, text interpreter 124 may be incorporated within text input system 110, for example being built into keyboard 112, or may be incorporated into processing system 126, for example as part of either operating system 128, application 130, or as a self contained hardware device, firmware, or routine or process running on processing system 126.

Figure 2:
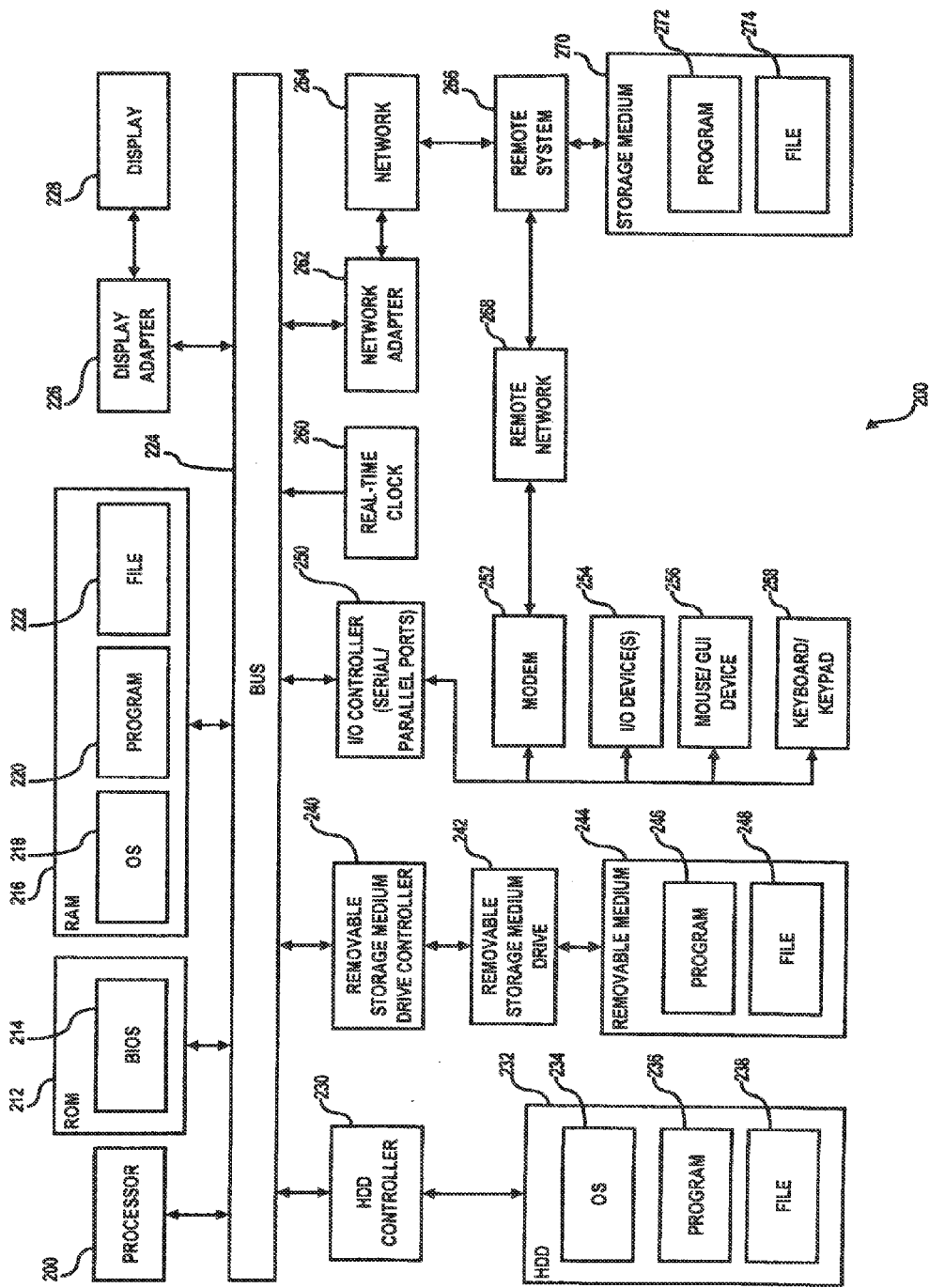
FIG. 2 is a block diagram of a computer system capable of tangibly embodying the present invention.

Referring now to FIG. 2, a block diagram of a computer system that is capable of tangibly embodying the present invention will be discussed. Computer system 200 is capable of implementing, at least in part or in whole, text processing system 100, or any portion thereof, as discussed with respect to FIG. 1. Computer system 200 includes a processor 200 for processing digital data. Processor 200 may comprise, for example, a complex instruction set computing (CISC) microprocessor, a reduced instruction set computing (RISC) microprocessor, a very long instruction word (VLIW) microprocessor, a digital signal processor (DSP), a combination of processors, or the like. A bus 224 couples to processor 210 for transmitting signals between processor 210 and other components, systems, or devices of computer system 200. A read-only memory (ROM) 212 is coupled to bus 224 for storing information that is intended not to be rewritten, or only rewritten infrequently. A random access memory (RAM) 216 couples to bus for storing information that can be dynamically written or read by processor 210. ROM 212 includes a basic input-output system (BIOS) routines for initializing computer system 200 and loading operating system (OS) 218 into RAM 216 at startup, and for facilitating the transfer of information among the devices of computer system 200. Operating system 218 may be loaded from a hard disk drive 232 coupled bus 224 via hard disk drive controller 230 in which case operating system 234 is the same as operating system 218. Likewise, RAM 220 may store one or more programs 220 and one or more files 222 that may be loaded from hard disk drive 232 in which case program 236 and file 238 are the same as program 220 and file 222, respectively. A display adapter 226 couples to bus 224 for displaying a video signal received via bus 224 on display 228. Computer system 200 may include one or more removable storage medium device controllers 240 for controlling one or more removable storage medium drives 242 that is capable of reading from or reading from and writing to a removable storage medium 224 on which a program 246 or a file 248 may be stored. For example, removable medium may include, but is not limited to, a compact disk read-only memory (CD-ROM) or a writable CD-ROM, a floppy disk, an optical disk, an optical-floppy disk, a digital versatile disk (DVD or DVD ROM) or a writable DVD, laser disk, magnetic tape (e.g., reel or cassette), removable hard disk drive, semiconductor memory (e.g., flash memory card or memory stick), or the like. An input/output (I/O) controller 250 is coupled to bus for connecting computer system 200 to one or more input, output, or input/output devices such as modem 252, I/O device 254, mouse or graphical user interface (GUI) device 256, keyboard/keypad 258 or the like. I/O controller 250 may provide one or more ports such as a serial port, parallel port, Universal Serial Bus (USB) port, or the like. I/O device 254 may include any one or more I/O device such as a touch screen input device laid over display 228 for operating as a GUI device in conjunction with a GUI based operating system. Real-time clock 260 provides one or more timing signals for synchronizing the operation of the devices of computer system 200. A network adapter 262 is capable of coupling computer system 200 to a remote system 266 via network 264 such as a local area network (LAN) or intranet. Likewise, modem 252 is capable of coupling computer system 200 to a remote system 266 via a remote network such as a wide area network 268 or a world-wide network such as the Internet. Remote system 266 may be coupled to a storage medium 270 on which a program 272 or file 274 is stored that may be transferred from remote system 266 via network 264 or remote network 268 to computer system 200 and stored, for example in RAM 216, hard disk drive 232 or removable medium 244. In one embodiment, computer system 200 and remote system 266 may implement a client-server arrangement in which the processing of an application may be divided between one of computer system 200 or remote system 266 and the other. Computer system 200 may be a client and remote system 266 may be a server, or vice-versa. Text interpreter 124 of FIG. 1 may be implemented with computer system 200 as a program of instructions executable by processor 210, or may be implemented as an I/O device 254 coupled in-line with another input device (e.g., keyboard/keypad 258) or operating in parallel therewith.

In a preferred embodiment of the present invention, text system 100 is capable of processing an incoming text string according to the rules of the Italian language using a standard input device or system such as a standard, English based keyboard. Although the present invention is particularly directed to the Italian language for example and discussion purposes, one having skill in the art would appreciate that the teachings of the present invention may be applied to many other languages, including but not limited to French and Germanic languages. It is not intended that the present invention be limited to Italian or any other specific language.

Compared to other languages, the relationship between Italian writing and pronunciation is quite easily specified by rules that provide relatively intuitive spelling and easy pronunciation of new words. One exception where most errors occur is related to the proper placing of accent and apostrophe signs in written text. Most Italian words end with a vowel. The pronunciation of Italian is such that the primary stress usually falls on the penultimate vowel, the second vowel counting from the end of the word, i.e., the syllable before the last one. Accents are used to indicate an exception to this rule. In Italian dictionaries and in some cases also to avoid ambiguities between words that have different meanings but differ only by the primary stress (e.g., tùrbine and turbìne), accents are used on vowels inside a word. In general writing, however, accents are used only on vowels at the end of a word, and indicate that the primary stress is on the last syllable (e.g., però). On some words (e.g., qui) the primary stress falls on the ending vowel, but no accent sign is used, a frequent cause of errors when writing as there is no specific rule; one must learn all the exceptions. Italian words are sometimes truncated (also referred to as elision), and in this case an apostrophe is used at the end of the word to indicate that a part of the word is "missing". If the last character of the truncated word is a vowel, the primary stress usually defaults to that syllable, which is marked by an apostrophe after it (not by an accent). In consideration of the evolution of language, writing rules change over time to accept truncated words as new words, which usually means that they are not written with an apostrophe any more, but rather with an accent, or with no sign at all. In practice, truncated words are sometimes so common that writers are not sure if the word is still considered truncated or not, leaving a doubt on whether an apostrophe should be used, or an accent, or no sign at all. For example, the Italian word poco is frequently truncated to po'. It is a common mistake to write it as pò. Another word, piede, has a truncated form, originally written as pie', now commonly accepted as piè in spite of the fact that it is less frequent than po'. Similar ambiguities also affect truncated words which are written without any sign on or after the last character, such as quale, which becomes qual, and frate, which becomes fra, whereas it is a common mistake to write qual' or fra'. In some cases an apostrophe is used if the following word is of feminine gender but not if the word is masculine (e.g., una altra becomes un'altra, but uno altro becomes un altro). On certain other words, for example weekdays ending in "ì" such as lunedì, it is a common mistake to omit the final accent.

A peculiarity of the writing of truncated words ending with an apostrophe is that if the last character of the truncated word is a consonant, then the apostrophe also acts as a spacing character between that word and the following one, i.e., no space character is used between the two words. A text processing system in accordance with the present invention removes an incorrect apostrophe sign takes this into consideration in order to place an appropriate space character where necessary.

Different diacritical signs are used for writing in Italian. In addition to the apostrophe, the grave accent (as in È) and the acute accent (as in É) are used in everyday writing. The Italian National Standards Body (UNI) standard, UNI 6015-67 "Compulsory Stress Mark In The Italian Language Orthography", first published by the Italian National Standards Body in 1967, sets the rules by which grave and acute accents have to be placed on vowels in certain words. The circumflex accent (as in Î) is also sometimes used, but like the use of grave and acute accents in the middle of a word it is generally associated to a more sophisticated and in part old-fashioned writing style, whereas in modern Italian the trend is to let certain ambiguities be resolved by the context in which the word appears, and not using grave and acute accents inside words (but only at the end), or circumflex accents. The normal Italian writer is not expected to use such a style other than in exceptional cases, which could include the writing of French or Spanish words in an Italian context, but the invention described herein allows for input and processing of such custom characters as well.

Typically, even a skilled but non-professional writer of Italian does not know when to put a grave accent and when instead to put the acute accent. In general, this is not taught at Italian schools; instead a single sign having the appearance of a small opening parenthesis rotated by 90 degrees counter-clockwise (similar to the "breve" character used in decimal positions 728 and 774 of the Unicode character set, i.e. "") is used as a "simplified fit-all accent sign". This sign, used exclusively in handwriting, is not defined by UNI 6015-67, and does not exist in printed text or on Italian keyboard layouts.

The use of proper acute and grave accents is in general always found in print, but is in general only learned as part of specific editorial, journalistic and printing training and studies. The fact that the Italian school system focuses on handwriting but not printing, and that personal computers are increasingly giving non-professional writers the ability to put words in print, results in an increasing degradation of the quality of printed words, which this invention aims to solve. The use of the apostrophe at the end of words, which historically indicates a truncation of an originally longer word, is in general taught at school, but remains a common source of mistakes in writing. Like an accent, an apostrophe at the end of the word adds emphasis to the last vowel of the word. This same emphasis is clearly reflected in the standard spoken language. This means that, on average, an Italian knows well when a word ends "either with a grave accent or with an acute accent or with an apostrophe", because this is how the word is spoken, but when writing the choice does not come intuitive. Certain words have a phonetic emphasis on the terminal vowel, but no graphical sign (accent or apostrophe) in the printed word (as in me and qui). This exception, whereby the printed form does not reflect the phonetic stress, is another frequent source of mistakes, so that accents and apostrophe signs are sometimes placed where they should not. Like all languages, Italian is in constant evolution. This means that there are cases and contexts, usually determined by editorial policies, in which certain words are written in a different way than for example the UNI specification indicates. An example of this is the word piè, which some prefer to write as pie' (as if it were a short form of piede, which historically it is). Other choices involve the use of accents, whereby for example some newspapers prefer to use acute accents in some cases where the UNI rules would require a grave accent, or vice versa. Another frequent source of diversity is the use of accents on capital letters. Some editorial styles prefer (often due to technical limitations) not to put accents on all-capital words, putting instead an apostrophe at the end of the word instead of a final accent, and simply remove accents in the middle of capital words, as is sometimes done in French. MICROSOFT WORD 97 includes an option to allow for accented uppercase in French, but no specific options for Italian. In these cases, where official rules lack, or where these are different than editorial choices, the most important rule becomes consistency, i.e., not to use one time one style and another time a different style in the same context. The invention described herein can be applied and programmed to enforce consistency in consideration of different preferences.

Ever since the introduction of typewriters, it has been a common convention in Italian to use the apostrophe sign after a vowel in those cases in which the proper accented vowel is not available on the keyboard or in the character set being used. Considering the needs of a very simple style of Italian writing (e.g., for personal correspondence), at least 7 accented characters are needed (à, è, é, È, ì, ò and ù). Anybody using all-capital words or sentences (e.g., in titles) will also need to use additional 5 capital accented letters (À, É, Ì, Ò and Ù), bringing the total to 12. More demanding writers and contexts need additional 4 characters (î, Î, ó and Ó), for a total of 16 accented characters.

The main other contexts in which apostrophe characters are used in Italian writing is as quote characters (to delimit a text, before and after it, as in 'text'), and after numbers (e.g., 5"2'). In these cases, the apostrophe character is sometimes used twice instead of a double quote character, which is in general preferred (e.g., "text" instead of "text"). An automatic text processing system must be able to recognize these cases, not only for example to convert the quotes into the proper opening and closing characters (e.g., Microsoft Word, which converts 'text' to 'text' and "text" to "text"), but also, in the particular case of Italian writing, to determine the likely intention of an apostrophe character when there is ambiguity (in very rare cases a word may exist both with and without apostrophe or accent) or insufficient data (e.g., no matching entry in the dictionary of the software). In the system described herein, which can be applied so that pressing the apostrophe key once places the correct apostrophe or accent on a word (e.g., perche' becomes perché), and pressing it again produces different variations (e.g., perché, perchè, perchê, perche', perché', etc.), the recognition of a context where an ending quote has to be expected (because an opening single quote appeared within a certain range before the current position, as in 'perch) allows the system to automatically interpret the first input of the quote character as an acute accent ('perché), and the second input of the same character as the closing quote ('perché'), instead of an attempt to write 'perchè (forcing an incorrect accent to be written). Similarly, if a word for which the system cannot apply any Italian rules (e.g., a completely unknown word which is not even recognized as a likely foreign word) is typed in a context where a single ending quote is to be expected, the system may be programmed to propose as a first output character a closing quote, rather than an accent (e.g., 'dedededo abababo' instead of 'dedededo abababò).

Apostrophes may also appear in Italian writing as part of a change of language context, which could be for a single word, or for longer parts of text. The system described here can be programmed to recognize apostrophes used in other languages, e.g., in German and English genitives and abbreviations (as in Eva's Apfel and eight o'clock), which have no match in Italian. While the fact that German is an official language in Italy and English is the most frequently-used second language is an obvious considerations, such a set of rules can improve the overall reliability of the system so that it produces little or no incorrect output even when processing (trying to apply Italian accent rules) long non-Italian texts of any language based on Latin-writing.

Variations of the Apostrophe Character

Some computer keyboards reflect the fact that the 7-bit ASCII character set contains both an "acute apostrophe" and a "grave apostrophe" character (decimal codes 39 and 96, respectively), and, accordingly, have keys to input both characters. This is a common cause of inconsistencies when writing, since it is desirable that in a text only one type of character be used to represent the apostrophe (but not for opening and closing single quotes, where, depending on the font being used, the two characters are appropriate to differentiate between opening and closing single quotes). The system described herein can be programmed to convert, for example, the apostrophe character entered with the grave key to the "acute apostrophe" character, leaving the character unchanged if it is used as a single quote character. Some keyboards and character sets have an even wider range of characters and keys that can be used, deliberately or by mistake, for the same purpose.

Other Languages

Other languages have in part needs similar to Italian, but cannot always be algorithmically solved with the same accuracy. German for example has upper and lower case versions of "ä", "ö" and "ü", which are written as "ae", "oe" and "ue" when these characters are not available. The special character "β" (lower case only) is expanded to "ss" when not available as well as always in upper case ("SS"). Different techniques have been proposed to automatically process German text files to add or restore the missing Umlaut characters, but none with the reliability that the system described here achieves for Italian and its special characters. The interactive mode of the present invention, where the user could for example enter "o" and then repeatedly press the "e" key to toggle from "ö" to "oe", could be of great help to combine automatic procedures with manual corrections during typing.

In Spanish vowels may have an acute accent, and the apostrophe character is only used for quotes (it is not part of words, as in Italian). This would make it possible to use the apostrophe key after a vowel to enter the vowel with an acute accent. A similar sequence could also be used for other Spanish characters that are variations of characters without diacritical signs, such as "ñ". Apostrophe characters that are part of quotes, or English possessives, could be recognized by the more generic procedures that are part of this system. Writing a vowel followed by an action indicating an accent is more intuitive for the writer (as it is more similar to handwriting) than the system currently employed on Spanish personal computers, which requires that the user first enters a "dead key" indicating the desired accent, and then the vowel.

French employs an even greater variety of characters, as it uses acute, grave, circumflex and dieresis signs on top of vowels, plus some other characters, like "ç". Because of this variety, which requires a lot of keys on a keyboard, the interactive use of this system could be of great advantage on a system with a reduced number of keys, also possibly in combination with some language-oriented algorithms (as for the other languages discussed here).

Other Applications, not Related to Specific Languages

The above examples for Italian, German, Spanish and French illustrate how a certain text context followed by a certain input results in a certain algorithmically-modified output, which can optionally be modified again in a dynamic fashion, controlled by the user. A system where repeated input of a certain key, for example the dollar key, produces different, alternating currency symbols, (e.g. euro, yen, pound, etc.) could easily be implemented as a subset of the system described here. It would however be substantially identical to systems that have been employed for years to enter characters on a cell phone keypad, where more than one character is associated to each key. It might however be possible to seek protection for a combination of this procedure with a particular type of keyboard hook, which intercepts repeated inputs of certain keys, and sends "fake" backspace characters in the input stream, followed by new characters.

A good implementation example for such a system would be the input of the euro key, the position of which on computer keyboards is still hotly debated, and likely to change again in a few years, with the appearance of a special euro key. This system could be used to implement a universal currency key.

Non-Linguistical Factors

The Italian letters with diacritical signs obviously exceed the limits of the character sets and keyboards designed for English. The original ASCII and EBCDIC character sets, still in use today, support none of these characters. One of the effects of this can be seen on many Italian Internet-based newsgroups, discussion boards and mailing lists, where administrators have to ask users not to use accented characters in their discussions, because such use is incompatible with the software running on the server and/or with the software used by some people to access these sites (through Internet E-mail, News, and/or Web protocols). This invention allows for the automatic conversion both from an accented Italian which requires support by a character set newer than ASCII, to an Italian using standard ASCII character set, and to restore the accented Italian characters based on a 7-bit character set such as ASCII. This invention can effectively eliminate all accent-related inconveniences caused by the use of 7-bit bottlenecks which are still very common in the computing world, especially in consideration of the increasing interconnection of different systems.

A variety of non-linguistical factors, such as limitations in the hardware and operating systems of computers, in part related to the distribution of the Italian-speaking population, add up to indicate a strong need for the invention described here. A standard Italian computer keyboard, as used for example on IBM PC, APPLE MACINTOSH and compatible systems only has keys for lower case accented characters. Of these keys, some may require the pressing of a second key in order to input a character (e.g., on most keyboards Shift plus another key must be pressed in order to generate the é character). There are no keys for accented capital letters. On a computer running one of the Windows or OS/2 series operating systems, a user wanting to input an upper case accented character, for example È, must either hold the Alt-key down while typing the sequence 0200, or load a special program which displays a window with a variety of special characters (in WINDOWS, this is done by selecting the "Programs/Accessories/Character Map" item in the "Start" menu) and instructions on the Alt-keycode combination for each character, and an alternate input method which allows for characters to be selected with the mouse. To input the same È character, a Macintosh user has to press at least three keys (Option+Shift+E), or use a graphical utility similar to the one described for WINDOWS (e.g., PopChar or KeyFinder, which are not included with the Macintosh operating system). In addition to the more frequent lower case accented letters, Italian commonly uses one capital accented letter in normal sentences (È, which is frequently used at the beginning of sentences), and six capital accented letters (all five vowels, of which one can appear in two combinations: À, È, É, Ì, Ò, Ù) used only in all upper-case text (as in titles). In practice, inputting upper case Italian characters, including the frequently used È, is so complex that users either do not use them, or they stick instructions with the Alt-keycode combinations on a piece of paper attached to the monitor or keyboard. This affects users of IBM-compatible as well as Apple Macintosh-compatible systems in similar ways. Additionally, on most Italian keyboards the Caps Lock key, which normally causes all text to appear in capitals, has no effect on accented letters.

Things become more complex when the keyboard does not have keys even for lower case accented letters, because lower case letters must then be selected in a way similar to upper case letters. This potentially affects more than five million Italian-speaking users outside of Italy, where Italian keyboards, having Italian accented keys, are not the default on computer systems. Another factor to consider is that very frequently devices with one type of keyboard are imported directly or otherwise distributed even in regions where normally other keyboards would be required. This happens for example because there may be price differences between markets, which encourage "parallel imports", or because some devices are not immediately available with the desired keyboard. However, all of the keyboards in use in regions where the Roman alphabet is used have at least an "apostrophe" character on the keyboard, and in most cases also a "grave" character. In the vast majority of cases, at least one of these two characters can be produced by pressing a key without also having to press Shift or other combinations of keys. The "slash" (/), "backslash" (\) and "vertical bar" (|) are also common to most keyboards. Another consideration is that typing proper Italian, and in particular Italian accented characters, is more difficult for people speaking Italian in areas where Italian is not an official language (and thus there are fewer possibilities to practice Italian). This difficulty is in addition to the lack of proper keyboards, which would allow for easier typing of at least Italian lower-case accented characters.

Additional Keyboard Considerations

In general, it must be considered that any solution by which 5 or more accented characters are added to a keyboard involves a variety of factors, which all have, directly or indirectly, negative effects. The sole action of "adding keys" to an existing layout, unless the keyboard is made larger, implies that the total space available for the other keys is reduced, so that in general some if not all keys must be made smaller, and/or placed narrower. Also, statistically, each key that is added to the set of keys that can be pressed adds overhead to the selection of all keys, and increases the chance of pressing the wrong key. This is especially important for those disabled users who can use only one button to select characters from a "virtual keyboard", and for which selection time prevails over other factors. Changing the arrangement of keyboards keys from one market to the other, in particular with reference to the very popular US standard, creates confusion. In an "ideal world", which this invention provides, US and Italian keyboards could be identical (with the exception, perhaps, of the currency symbol, where there could be, for example, an euro or lira sign instead of the dollar sign). Instead, forcing the user to press more than one or two keys, or to resort to a separate software program to input an accented character adds typing overhead, and can become a significant obstacle for physically challenged users. Considering the increasing impact and diffusion of personal computers, limiting the easy access of users to only a subset of the special characters used for a certain language may have a negative impact on the writing standards of that same language, artificially lowering the standards to a model which has little relation with the original language and culture. For example, just like keyboards without any accented characters at all "encourage" writers of Italian to type plain unaccented letters (with or without apostrophe, depending on individual "taste") instead of the proper accented letters, PCs and computer terminals with Italian keyboards are to a much higher degree "encouraging" writers of Italian not to use accents on capital letters (because there is no simple access to accented capital letters on Italian keyboards), and to use only the grave accent on lower case letters (because the frequently-used é character, unlike è, requires the additional Shift key to be pressed).

An additional keyboard limitation, which affects users of most notebook computers, is that the Alt+numbers keyboard combination, which is often the only way for Windows users to input certain characters, requires the use of the numerical keypad, which notebook keyboards do not have, or can enable only by pressing one or more keys, after which the digits can be entered on "virtual numerical keypad", which must then be switched off again to resume normal typing.

Devices such as pocket translators, pocket computers and handheld organizers have very limited space for the layout of keys to render characters with the various diacritical marks. In general, these devices are, at least initially, released with a keyboard layout suitable for English. This is in most cases a QWERTY layout, or, in less frequent cases, an arrangement of keys in alphabetical order from A to Z (usually aimed at children and other users expected to be less familiar with the QWERTY arrangement). In most cases, international versions have no additional keys, but require certain combinations of keys to be pressed in order to input a particular non-English alphabetical character. In some cases, additional keys are provided, for example by reducing the size of the Space and Enter key, which in most cases frees space for up to two additional keys. Such a modification, which is easy to apply to a full size keyboard, but more difficult to allow for on a smaller one, is in any case sufficient only to make room for small a subset of the non-English characters used in a given language.

Especially on small devices, the pressing of combinations of keys is not an easy task, because the hands are also used to hold the device, and the keyboard is small for use with more than two fingers. It would be easier to input non-English characters using one key at a time, but none of the available devices provide for such a method of inputting non-English characters which do not have a dedicated key on the keyboard. Especially in consideration of the increasing power and popularity of handheld devices, and new dedicated operating systems such as MICROSOFT CORPORATION's WINDOWS CE, simpler input methods for non-English texts would be useful. The invention described here provides such a solution, with particular focus on the writing of text in Italian.

Additional Character Set Considerations

The variety of solutions that were introduced to extend the ASCII character set in order to support Italian accented characters added incompatibility among character sets. For example, the "Italian ASCII" character set replaced some less-used ASCII characters (e.g. { and ]) with accented letters, while other character sets used codes greater than 127 to represent accented characters. Several of these character sets and codes are still in use today. Some of the texts encoded by these character sets have been corrupted by the removal of the $8^{th}$ bit, leaving incorrect characters instead of accented characters. While standards are now emerging for unified character encoding sets, this makes it just as difficult, if not more difficult, to deal with old data. The present invention can automatically detect the character set being used to encode text in Italian and in languages with similar properties, and restore data for accented letters, even when the $8^{th}$ data bit has been stripped Text Normalization When a user of an internet search engine or a dictionary lookup software enters a word or sentence, it is important that the search key and the entries being searched match. However, considering that for example calamità, calamitá and calamita' are three different ways in which, in practice, the same word may be written, while the word calamita (with no sign) is a different word with a different meaning, it is easy to understand how important it is that both the search key and the text being searched be normalized to a common format, using the same rules. This can be done using the same rules that can be applied in real time while the text is being typed. Other systems in use today either ignore accents (so that calamità and calamita are considered the same word), or only consider an exact match (so that calamità and calamitá and calamita' are considered three different words), but are unable do perform a language-specific normalization for Italian.

The invention described here allows for text to be normalized using only the correct accent and apostrophe characters, or using only apostrophe keys (i.e. only 7-bit ASCII text), and, whatever the preferred format, makes it possible to convert Italian text from one format to the other, without loss of information, and maintaining a natural text readability, i.e. without introducing control codes which are perceived by the human reader as "artificial".

Input Techniques

A character-input technique commonly employed to enter text using telephone keypads involves the assignment of two, three or more characters to the same key on the telephone keypad. Text is then entered either pressing keys once for each letter, or pressing each key as many times as required to select a given letter associated to that letter. The first method is sometimes employed to interactively access automatic telephone directory information services. It cannot provide 100% accuracy, because more than one letter is associated to each key, but it is nevertheless useful. The second method is more used on telephones having a display, such as handheld cellular telephones, where the keypad is used to enter names to be associated to telephone numbers, as well as to create text messages. This second technique is accurate and unambiguous, but on average requires each key to be pressed more than once for each character (even four times or more, for letters with diacritical marks), plus in most cases it uses a time-delay technique to allow for the input of consecutive letters which are associated to the same key. This makes it relatively slow and impractical for typing longer texts.

The problem of generating and encoding text where not all characters or combinations of characters and diacritical marks can be associated to keys on a keyboard and/or to characters in a character encoding set has inspired several methods and systems. These techniques, however, mainly address Asian languages, especially Chinese, Japanese, Korean and Thai. Greek, Hebrew and the Urdu group of languages are covered by some of the mentioned techniques. However, none of these methods eases the writing and encoding of Roman-based languages, especially Italian.

The need for diacritical marks on top of vowels has inspired a variety of solutions in Great Britain and in neighboring regions, where UK-English keyboards (very similar to US-keyboards) are in use, but languages and dialects of Irish, Scottish and Welsh origin require such signs. The proposed solutions involve modifications to the keyboard layout and a text replacement software where combinations of the two characters acute+vowel and grave+vowel are replaced with the single accented vowel, having either an acute or a grave accent, depending on which key was input before the vowel. Such a system would not be perceived as "natural" for most writers of Italian, where it comes more intuitive to type a special sign after a vowel rather than before it (as is done when handwriting), and without additional "intelligence" it would in any case not be possible to resolve some very common ambiguities and errors.

Modern operating systems, such as MICROSOFT WINDOWS and the APPLE MACINTOSH operating system incorporate support for so-called "input method editors" or "input methods." Currently, not all language-versions of these operating systems include this feature, which is available mainly in Asian regions. It is expected that MICROSOFT will include this capability in all language-versions of its operating systems beginning with version 5 of its WINDOWS NT operating system. An input method allows for a system such as the one proposed in this invention to receive text context information (i.e., information about the text currently being edited) by applications such as word processors, and to intercept the user's input, and process such input with consideration of the context before forwarding it to the application. Input method systems were originally developed to better support certain Asian languages. For years, operating system support for input method systems has been available both on Windows and on Macintosh systems. Yet no system to process Italian text has ever been released for these operating systems. It is believed that once this invention is introduced to the Italian market, no Italian computer user will want to write without it.

Operating system support for input methods is ideal for systems such as this invention to be able to process user input regardless of the target application. Another application-independent layer provided by some operating systems (e.g. MICROSOFT WINDOWS) as well as by some applications (e.g. MICROSOFT WORD) consists in a set of functions dedicated to error detection and correction. The invention described here can also integrate with such a set of error management functions. This invention can also be directly integrated at the application level, for example in a word processor. In this case, text context information, as well as input data, is directly accessible to the method employed by the invention, which can also directly produce output in the format used by the application itself. This approach is extremely efficient on the single application level, but requires a separate implementation for each application in use, and does not extend to the operating system level.

When integration at the operating system level is not possible, and integration within the application is either impossible or insufficient, different techniques are known to have already been employed by typing aids and text error management systems in order to get text context information, and to intercept user input, and to then forward such processed input to the operating system or to an application in real time. Some of these systems acquire text context information by monitoring the keyboard and display activity. Such context information is used to apply different rules based on both the text context and the user input. The resulting output is then forwarded either to the operating system, or to the keyboard control system (acting as if the data were typed by the user), or it is sent directly to the application. On architectures where it is possible to only detect, but not to remove the original input stream, the text processing method may insert appropriate "cursor", "backspace" and "delete" characters, in addition to new text characters, to the input stream in order to force applications to replace a series of input events with a new series of processed events generated by the text processing function.

Several other cases of possible and useful integration of this invention are known. Text search procedures, as used within word processing and database applications, as well as on the Internet could apply this invention both to the search string and/or to the text being scanned so that both are expressed in a standard and correct form, so that higher quality results are produced. Current text search techniques either simply remove accents, therefore generating false matches when either the search key or the target text contain accents, or do not always recognize a match because of lack of a way to process text to a correct and unified format as this invention does.

Figure 3:
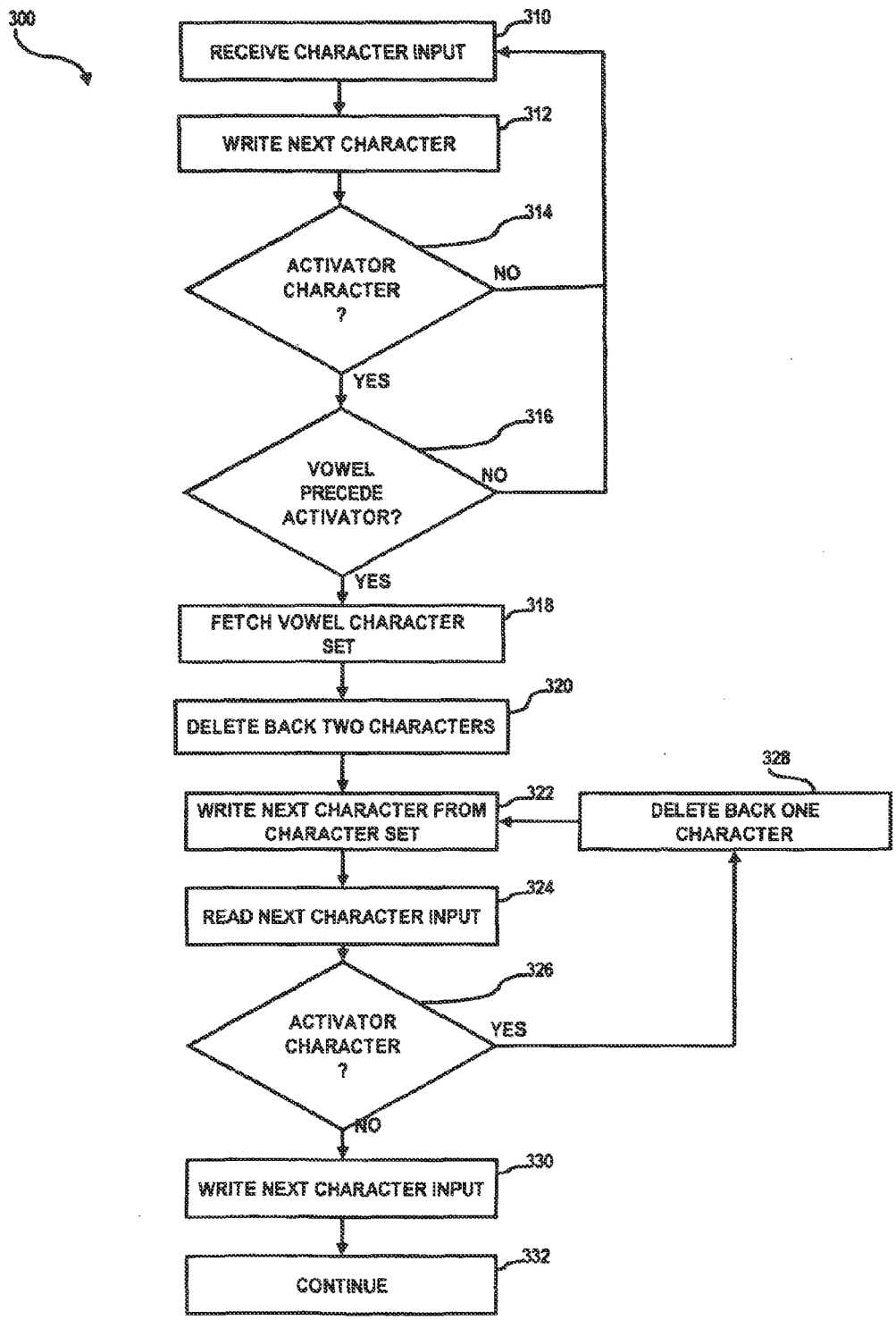
FIG. 3 is a flow diagram of a method for processing text input in accordance with the present invention.
Figure 4:
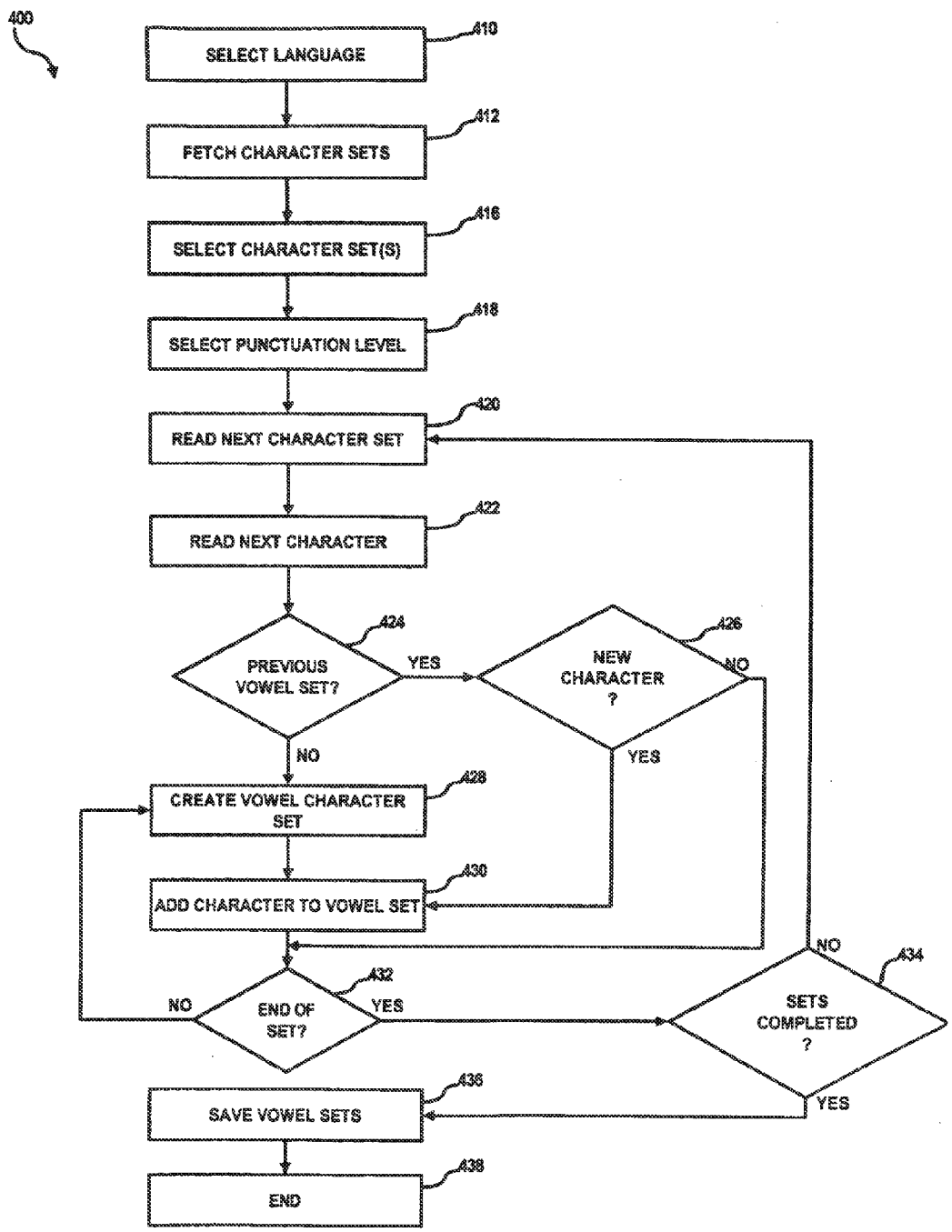
FIG. 4 is a flow diagram of a method for processing text in accordance with the present invention.
Figure 5:
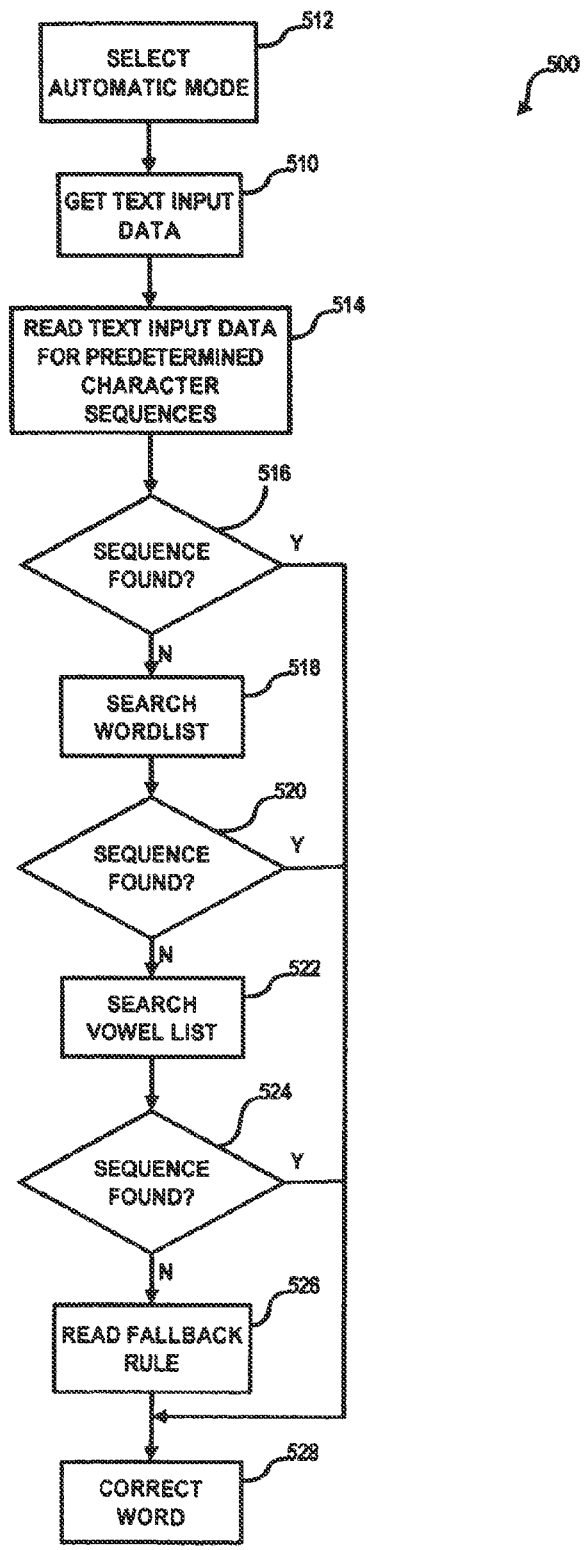
FIG. 5 is a flow diagram of a method for processing text in accordance with the present invention.
Figure 6:
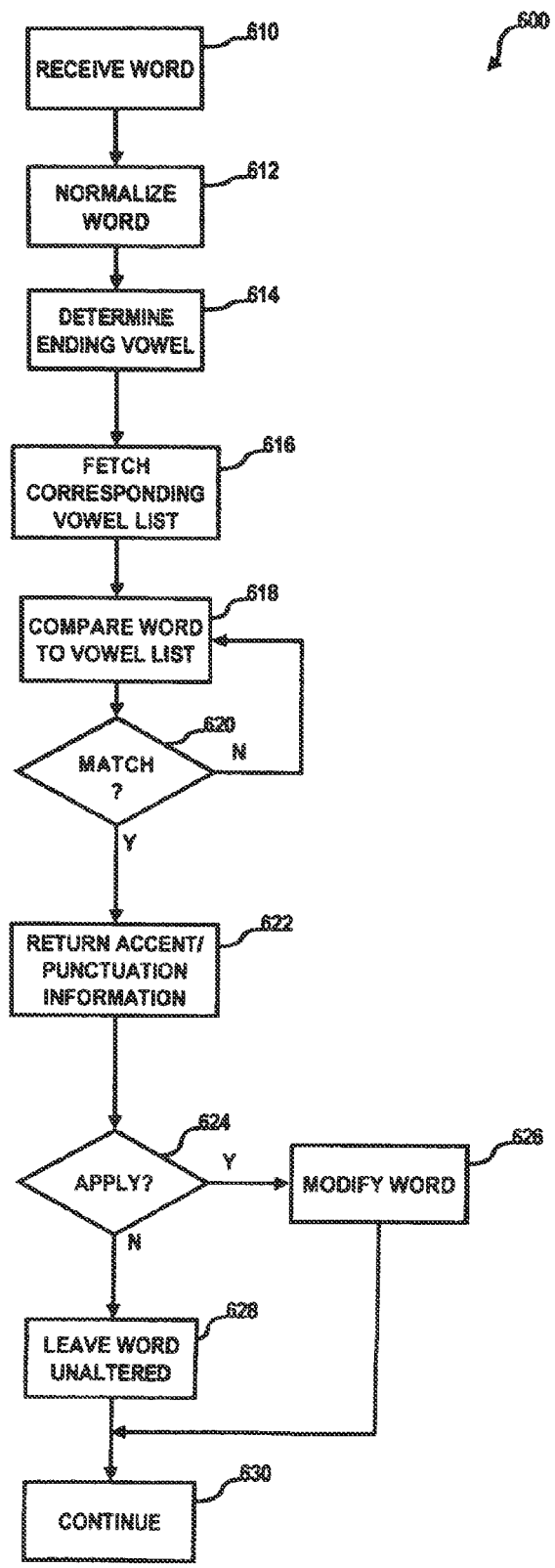
FIG. 6 is a flow diagram of a method for processing text in accordance with the present invention.

Referring now to FIG. 3, a flow diagram of a method for processing text in accordance with the present invention will be discussed. Method 300 provides a first step 310 for receiving character input. As characters are received and read, the characters may be written at step 312. For example, if the character "e" is received, the letter "e" may be written to a display device so that the character "e" may be viewed on the display by the user. A determination is made at step 314 whether a received character is an accent indicator character. For example, the apostrophe character (') may be assigned as the accent indicator character. A determination is made at step 316 whether a vowel precedes the accent indicator character. In the event a vowel does not precede the accent indicator character, then the accent indicator character is regarded as intended to represent its nominal meaning (e.g., an apostrophe), and method 300 continues with step 310 by continuing to receive further character input. In the event that a vowel does precede the accent indicator character, then method 300 interprets the vowel and accent indicator character combination to represent the desire to utilize an accented vowel. In this case, the character set for that vowel that includes a range of accented vowel characters is fetched at step 318. Method 300 then deletes backwards two characters at step 320 to delete the vowel and accent character tandem. The next character from the character set is read at step 322 whereby the next vowel character is written in place of the previously written vowel and accent indicator character tandem. When step 322 is initially executed, the next character written is the first character in the vowel character set. The next character input is then read at step 324, and a determination is made at step 326 whether the next character input is also the accent indicator character. The accent indicator character may be repeatedly input (e.g., the user repeatedly hits the accent indicator character on the keyboard one or more times in succession). By repeatedly inputting the accent character indicator, the user is able to scroll through the vowel character set until the correct accented vowel character is written. In the event the next character is the indicator character, for each input of the indicator character, one character back is deleted at step 328, thereby deleting the previously written vowel character, and the next character from the vowel character set is written at step 322, and the next character input is read at step 324. This loop may continue until the desired vowel character, with correct accent and correct punctuation, is written. When the vowel character set is fetched at step 318, the vowel character set may be written in a circular buffer so that when the end of the vowel character set is reached, the vowel character set may be read again from the beginning at the first vowel character upon successive input of the vowel indicator character. In the event the next character input is not the vowel indicator character, for example, a space character, the next character input is written at step 330, and method 300 may continue at step 322.

The user may be provided with one or more available accented character sets depending upon the level of writing desired. For example, at least one or more of the following accented character sets may be available:

Set 1: [■ ● ★ ✘ ✱ ♣ ]
Set 2: [☾ ☉ ◫ ☐ ⬥ ]
Set 3: [✘ ⊕ ✦ ● ]

Set 1 may be described as comprising characters: lower case "a" with grave accent, lower case "e" with acute accent, lower case "e" with grave accent, capital "e" with grave accent, lower case "i" with grave accent, lower case "o" with grave accent, and lower case "u" with grave accent. Set 2 may be described as comprising five characters: capital "a" with grave accent, capital "e" with acute accent, capital "e" with grave accent, capital "o" with grave accent, and capital "u" with grave accent. Set 3 may be described as having four characters: lower case "i" with circumflex accent, capital "i" with circumflex accent, lower case "o" with acute accent, and capital "o" with acute accent.

Character sets may be selectively available depending upon the needs of the writer and the level of formality required. For example, only Set 1 may be available for very simple Italian writing style such as for personal correspondence. For writers requiring accented capital letters, for example when writing titles, Set 1 and Set 2 may both be available to the user or system. For more demanding writing, Set 1, Set 2, and Set 3 may be available, for example, when a higher level of formality is desired. One or more vowel character sets per vowel may be created based upon the available character sets. The created vowel character sets may also include essential accented vowels with punctuation as necessary so as to be able to discriminate between accented vowels, with and without punctuation, and non-accented vowels, with and without punctuation. For example, the following vowel character sets may be created if only Set 1 were available:

Set a: [a • •✪ a✪]
Set e: [e ♠ ■ ♠ ✪ ■ ✪ e✪]
Set E: [E ★ ★✪ ← ✪]
Set i: [◎ ✖ ✖✪ ◎ ✪] etc.

If Set 1, Set 2, and Set 3 were all available, Set a and Set e are unchanged, but Set E and Set i, for example, are enlarged to include the additional available characters. Thus, new and/or enlarged vowel character sets may be created as appropriate:

Set E: [E ★ ★✪ ◎ ◎ ✪ ←✪]
Set i: [◎ ✖ ✖ ✪ ✖ ✖ ✪ ✖ ✪]
Set I: [I ◻ ◻ ✪ ✪ ✪✪ ❘ ✪] etc.

The vowel character sets may be ordered or sorted according to the frequency of occurrence in the language of interest such as Italian so that the most frequently occurring character will be selected first, the second most frequently occurring character will be selected second, and so on, in order to maximize the efficiency of selecting the desired accented or non-accented, punctuated or non-punctuated vowel.

Functions

Basics

Disclosed is a system that processes a stream of text data. This can for example be keyboard data as it is typed (connecting to the operating system as a keyboard "hook", or through interfaces for input method editors, or through interfaces for assistive technologies, or physically connecting to the keyboard hardware, etc.), or data being read from an existing file, or data being accessed through a standard interface provided by programs like MICROSOFT WORD, or computer clipboard data (which the user has copied there, our system processes, and is then ready for being pasted back). The system has access to all input data, and it can also affect the output data to apply certain changes, which are the objective of this invention. How exactly this is done depends on the implementation. For example, if the system is implemented in the same program that writes the data, for example a file processor or a word processor, then the system can directly write the processed output data, modified as necessary. If however the system is implemented as a keyboard hook (especially in an interactive context, where the user expects to immediately see every character typed), either in software (by inserting itself in the operating system's or the application's input stream) or as hardware (e.g. as a device plugged between keyboard and computer), then it may have to change the output data by simulating the input of appropriate backspace or cursor movement characters, followed by new output data, to change data that already resulted in screen display. Even when the system is passive, i.e. it does nothing to actually modify the text, it is busy collecting "context information", i.e., it maintains a local buffer of all recent input. This is necessary to know the full word that is currently being written, and also (optionally/preferably) to understand the context in which the last word or character appears, for example to identify an apostrophe character that can be expected to be part of a closing quote (because the system has previously recognized an opening quote), so that it is not confused with an apostrophe that may have some other meaning that would affect the operation of this system. If the system is implemented in a way that it has direct access to text context information, for example as part of a word processor, or through an interface to a word processor that gives such access (e.g. MICROSOFT WORD scripting interface), or as a file processor that only deals with a continuous input stream, then context information can also be acquired directly on the text data itself, without needing to keep a copy of the recent data in a local buffer. There are however cases in which the text input stream is not linear, or it can be disrupted, for example when the system is implemented as a keyboard hook, and the user moves the Cursor Up or Down keys, or the mouse, to reposition the cursor. These cases can be detected (by detecting keyboard, mouse and other input events that affect the position of the text input position), but it is not always possible to reconstruct the new local context information (e.g. the system does not know where the cursor is, after a Cursor Up). In some cases the new context can be reconstructed by on-screen character recognition.

The system is character-oriented, i.e. it becomes "active" when certain characters are encountered in the input stream. Implemented in a keyboard input context, it reacts to certain keyboard keys. No special "conversion" keys are necessary. Rather, the system uses context information to give special meaning to an otherwise possibly standard (because it may also appear in the text) input character. In the algorithms of this system, context information is combined with the most recent input character, and also, optionally, in a dynamic way to the number of times the last input character occurs in a row, resulting, in the case of keyboard input, in a dynamic sequence. Unlike systems which are for example used to enter different characters by repeatedly pressing a single key, as on telephone keypads (e.g. to enter short messages on a PCS keypad), the system described here has the ability to affect not only the current character, but also previous characters. The system described here implements "smart" procedures to process the combined context and input data, and generate output data in a way that results in new, reliable, intuitive and extremely useful text input methods which have practical applications in Italian, German, French and other languages which use Latin characters plus diacritical marks (but also to generate some special non-Latin characters). The present system is more focussed on the input of certain characters while the single characters (not words) are being written, and in particular Italian accented vowels, but also characters with diacritical marks in other languages, and also certain non-word characters (currency symbols, etc.) Only in rare cases does our system take action at the end of a word to recorrect a previous mid-word correction. This may happen for example when our system detects that an apostrophe originally interpreted to indicate an Italian accent was instead meant to be an English possessive (which can only be recognized after a non-word character follows an "s" which follows an apostrophe). But in general our system strongly favors intervening in real time on each character.

The two first items of prior art mentioned above (i.e. a system with a special character variation key that affects the character just typed, and cell phone text input systems where repeated pressing of the same key results in a loop where different characters can be selected) are probably the most "dangerous" ones, and have to be taken into consideration when writing our claims. There are also a variety of add-on programs and procedures built in certain programs which simply replace one input character or string with another one (also during typing). The system described here is however more "intelligent" than a dumb text replacement. The "core" is the input of Italian text, for which in particular different algorithms are proposed. The procedures can be described in a way that goes from the general to the more detailed, with the general version applicable to other languages and other special characters. If it were possible to try and claim applications which extend beyond text in a certain language to include for example that whenever the dollar (or another) key is pressed twice it replaces the first dollar character with a euro character, and which maybe by further inputs of the same key keeps on looping through various currency symbols, that would be desirable. A further option in such a loop would cause the characters to appear in an order affected by previous selections, with additional options to not have this order change too easily (all of this improving current character-oriented telephone input technology, i.e., static character loops, and not systems such as word-oriented methods and systems). But it should be done in a way that it cannot hurt the other claims, with the procedures oriented to Italian and to the "intelligent" handling of the apostrophe characters being the ones most "protected" from possible attacks. The implementation algorithm goes much more down to the details and to aspects that make the system unique.

Disclosed is a product specifically (at least initially) for the Italian language, which adds the following features when writing with any application under Windows: "Magic apostrophe", to enter the correct accent at the first press, and to change it (e.g. for the input of French words) by pressing the key again, and with different ways to override the automatic actions, and with automatic detection and recorrection of "'s" possessive in English. The software works by acting as an add-on on the keyboard input stream, but it can also be directly embedded in text editing software, in the operating system, and on text systems for cellular phones, for example.

With different variants and combinations, the two aspects of the invention are:

Use of a key as part of an interactive (dynamic) "input method editor" system, to handle accents in foreign words, or to otherwise write any combination of accents and special characters as desired. Basically, each time a certain key is pressed (which key could be the apostrophe after a vowel in Italian, or an "e" after "a", "o" or "u" or "s" after "s" in German), and in relation to a specific vowel or other context, the system generates a different character, in a loop. The order in which the characters are generated can be constant, context-based, or custom, or experience-based (depending on previous selections).

Algorithms for the above to automatically place the correct Italian apostrophe or accent on a vowel, based on a simple and generic "hint" (such as an apostrophe character following a vowel, or a vowel with an accent on it, or certain other characters). The "magic" is given by the combination of intuitive use, high reliability, and no need for a special and new key, all of which is possible specifically with Italian writing. In particular, when the apostrophe is used as the activator (which is very intuitive in Italian, but sometimes ambiguous, yet in a way that is good, because often the writer does not know whether an apostrophe, or an accent, or nothing are appropriate, and our system does instead "know"), there are cases where "intelligence" is required to understand whether the apostrophe was word-related or not (e.g. an opening or closing single quote), and if word-related, the English "'s" possessive must be recognized and treated differently. Also, with certain types of actions where the apostrophe is entered as a recognized mistake, the system must either delete the entry, or delete it and replace it with a space character, depending on Italian writing rules (where the apostrophe can be used as part of a word, or between words).

Ways to override or correct an automatic action generated by the system, and remember it:

Possible variations and extensions, all implemented in the same software, ranging from a way to use the intercepted input to take quick notes and then paste them, to a way to generate different currency symbols using a single currency key or symbol.

Ways to place information box near to current cursor position, with notes about correction that was made or future results of repeated presses:

EXAMPLES

The following are examples of different actions that can be performed by the system described here.

| User Input | System Output | Note |
| --- | --- | --- |
| e' | è | Changed to grave e |
| é | è | Changed to grave e |
| perche' | perché | Changed to acute e |
| perchè | perché | Changed to acute e |
| po' | po' | Unchanged (correct) |
| pò | po' | Changed to apostrophe |
| po' | po' | Consistent apostrophe style applied |
| quà | qua | Accent removed |
| qua' | qua | Apostrophe removed |
| qual' | qual | Apostrophe converted to space |

The above examples reflect rules which are built into the algorithms for Italian which are part of this system. These rules make sure that the system has a reliability exceeding 99% without even requiring an exhaustive dictionary of words.

The following examples show the effect on a more dynamic situation, where the user repeatedly presses a certain key to intentionally achieve certain results (even overriding Italian rules, in an Italian context).

| User Input | System Output | Note |
| --- | --- | --- |
| po'' | pò | Second press of " ' " starts loop |
| e'' | é | First apostrophe = è, second = é |
| e''' | ê | Third press = ê |
| e'''' | è' | Fourth press = è' |
| e''''' | e' | Fifth press = e' |
| e'''''' | è | Sixth press restarts from è |
| è | è | No change |
| èè | é | Same loop as that activated by " ' " (è is easier to reach than é) |
| $ | $ | No change |
| $$ | € | Second press = euro sign |
| $$$ | ¥ | Third press = yen sign |
| $$$$ | $ | Back to step 1 |
| oe | oe | No change |
| oee | ö | Second press of "e" starts loop |
| oeee | oe | Third press toggles back to beginning |
| oe | ö | Variant of the above |
| oee | oe | Loop like above, but in different order |

| User Input | System Output | Note |
|---|---|---|
| ö | ö | No change |
| öö | oe | Same loop as that activated by "e" (less practical, though) |
| ss | ss | No change |
| sss | β | Triple s begins German sharp-s/ss loop |
| ssss | ss | Back to step 1 |

The above are just a few examples of what can be done in the "dynamic" mode of this system. The same dynamic mode which causes different characters to be displayed one after the other (which, when the system is implemented as a keyboard hook, is achieved by sending fake character and backspace inputs to the system) can be applied in different ways based on different "activator" keys, different output sequences (which can be static or dynamic, e.g. "learning" from past selections), and also in combination with Italian rules to generate the most likely desired output first. Variations could include for example a way for the above "ss" cycle to break the loop after the third "s" is pressed so that repeated presses just result in the same amount of "s" characters, or the insertion of just one more step to generate three "s" characters in a row, but then restart from "ss", "β", etc. The loops can be "closed" (beginning again from a certain step, not necessarily the first step), or "open" (i.e. after a certain number of identical inputs, the output is simply identical with the input), and consist of any number of entries.

A "learning" mode could be particularly convenient for the "Jolly dollar" example, where the most frequently used currency symbols could always be output first in the loop.

The examples show how there can be more than one "activator" key (apostrophe, accented character, specific currency character, generic currency character) to access the same character loop, with some keys, such as apostrophe, being generic and combined with a previous character, while others, such as accented characters, serving both as a reference to a base character and an "activator".

The order according to which the items in these dynamic loops occur could be defined as: static (program-defined), static (defined by user in program settings), dynamic (frequency-based), dynamic (frequency-based, with optional adjustable limit before changes occur), dynamic (combination of the previous ones with Italian language rules which to calculate the most likely cases). For example, it could be programmed that the order in which the items appear is changed only after two (or one, or three, or more, etc.) consecutive selections of an item which is not already at the first place in the list, or it could be set that the order changes after the total number of selections in a given timeframe (which can be unlimited, i.e. not time related at all) is such that a certain item is preferred over another one at least 5%, or 10% more times, etc.

It is believed that the intuitive and simple use of the single apostrophe key will be very successful in Italy. The first press of the apostrophe will automatically put the correct accent (thanks to the riles described in the algorithms section), while consecutive presses will enter the dynamic manual selection mode. Other peculiarities of Italian could be exploited. For example, instead of, or in addition to, the apostrophe key(s) as a preferred way to initiate the automatic placement of the sign which the system determines to be the best, since in Italian a vowel never appears twice, each vowel itself could act as a character which, pressed more than once, begins a character selection loop. Pressing the same vowel key twice is less intuitive than using the apostrophe after the vowel, but more efficient.

A rule-based approach is also possible for German (which has the special characters "ä", "ö", "ü", "β", "Ä", "Ö", "Ü"), where the context can help the software decide whether "oe" is more likely to mean "oe" than "ö", for example, and propose that as a first choice when the user writes "oe", and the other when the user presses "e" again ("oee"="ö"). As for Italian, repeated identical characters could be used instead of the vowel+"e" combination.

Additional ways for the user to specify a certain accent may be implemented. For example, the user could use the characters "/" or "\" (or both combinations thereof to indicate a circumflex accent) before the apostrophe to quickly specify the accent. E.g. "a\'" would mean "à", and "a/'" would mean "á", and "a\/" or "a/\" would mean "â". Another variant would be to place the symbols before the vowel, as in "\a", etc.

There shall be different ways for the user to override the system, and just enter what is typed. Our software can for example use the Num Lock key for this purpose. On one hand, the software makes sure that Num Lock is always switched on (if the user wishes so), and on the other it then interprets any Num Lock actions as on/off commands for its text processing system as described here. Num Lock is a key that has no practical use any more, so this action has two benefits in one. Scroll Lock or other keys could be used in a similar way. For temporary on/off, it is possible to hold down certain keys while entering text that would otherwise be modified. The implementation/algorithm section describes in more detail a technique where the user can go back after an automatic correction, and rewrite the text so that it is not modified a second time.

Examples of additional program options include a setting to make sure that accent changes in the middle of a word, as opposed to changes at the end of a word, are applied only while typing, and not on file operations. This would be in the assumption that accents placed in the middle of a word, which the average Italian never uses, have been placed with proper knowledge.

More options could include the possibility to scan a text file for obvious character set errors, which might for example have lead to the word "perché" to become "perchX" or "perch{". This however is also a good example for the need for a clear limit in both detail depth and extension of the topic.

Input and Output Interfaces

Depending on the hardware and software with which the invention works, examples of sources from which the input data can be acquired include the operating system, an input method system interface, an error-handling interface, an accessibility interface (e.g., as used to handle input, output and context for blind users), or an application (piece of software), or the keyboard system (hardware), or display memory, or computer memory. Text context data can be acquired either from the operating system, or from an input method system interface, or from an error-handling interface, or from an accessibility interface, or from an application, or from display memory, or from computer memory, or by buffering the input data. Output is sent to the operating system, or to an input method system interface, or to an error-handling interface, or to an accessibility interface, or to an application, or to the part normally receiving data from the keyboard system. If the input stream cannot be intercepted for exclusive use, then output is generated in a way as to produce the deletion and replacement of the parts that require modification, for example by inserting "cursor", "backspace" and "delete" control commands as appropriate.

Input and Context

The system recognizes certain input events as causing a disruption of context, requiring the collection of new context information. For example, when the user moves the cursor with the mouse, or moves the cursor up or down, or selects an application command via the mouse or keyboard, the system knows that it has to take steps to try to reconstruct the new text context, i.e., the text surrounding (at least preceding) the new cursor position. Modern operating systems, such as MICROSOFT WINDOWS, provide dedicated interfaces for this purpose, designed to give text context data for accessibility purposes (e.g., to read out the current text context to a blind user), or as part of an input method system, which is more common for Asian languages, but which the system described here embodies for languages such as Italian. If context collection through this type of system calls is not possible, it may still be possible to obtain equivalent information directly from the application being currently used. For example, applications like MICROSOFT WORD provide such information. On systems where neither the application nor the operating system provides such information, it is always possible to buffer the input data as it is being typed, and resort to that information as the only context data. However, when the text context is lost (e.g., after a vertical cursor movement), it is desirable to try out different techniques to collect text context information, at least for the part immediately preceding the new cursor position. On-screen OCR (optical character recognition) is one such possibility. A system employing on-screen OCR could recognize the cursor because it is the only object on screen that flashes, or it could query the operating system, and then analyze the surrounding screen bitmap for text patterns. Other techniques are also possible. For example, with certain operating systems and/or applications, it is possible to directly access the region of memory that provides the necessary text context information.

Where no context is available, the system may still work based on generic (not context-specific) likelihood rules, but it becomes more important and useful to take advantage of the interactive mode offered by this invention, whereas repeated input of a certain character (e.g., a vowel character) causes different outputs, i.e., the system becomes less "intelligent" and the user has to do more manual work.

Context in Detail

Context information provides the following data: the last (current) word up to the current insertion/input point; information on whether the context before that word required a capital (upper case) initial; information on whether the context before the current insertion/input point includes a single opening quote with no corresponding closing quote; text language for the block including the last word, if specified by the user or otherwise known.

For a basic implementation of the invention, for example on a slow handheld device, word context information (i.e., the last word) alone could be sufficient, depending on the priorities concerning execution speed, memory use and output quality. Word context is an important piece of context. Even partial word context can be useful (e.g., when the language rules include suffix rules).

The special handling of the single quote character is utilized for Italian and other languages where the preferred implementation uses the apostrophe character (or possibly any character resembling it, such as the "acute" character) as an "activator" character.

Defined as variables, in a possible implementation the context variables could be:
   context.buffer=context string and data
   context.word=string
   context.capital=yes/no
   context.expectsinglequote=yes/no (or counter)
   context.language=language code
   context.typemode=insert/overstrike These variables can be provided by the host environment (input method interface, word processing application, etc.), or be calculated by the system employed in the invention.

In the context of an interactive use (i.e. system applied while the user is typing), context.buffer is an optional copy of the local text region, which is dynamically maintained by the system while the user is entering text. The purpose of this data is to be able to provide information about the current word, i.e., to construct context.word, when the system is applied to an environment where the application in use, or the operating system, are unable to provide text context information. This data consists of a string of characters which represents a "sliding window" region of the text currently being typed, plus status variables that indicate the cursor position with respect to the buffer, and the size of the buffer. When the user types characters of text, these are appended to the string in context.buffer until a maximum size has been reached, after which new characters are added, and old characters are discarded from the buffer, as necessary to maintain the maximum buffer size, if one has been set. Depending on the implementation, characters may be discarded at the beginning of the text buffer (but not at the current word, if the cursor is at the beginning of the buffered data), or at the farthest point from the cursor position, or using other preferences. When the user uses the cursor left/right keys to move the cursor in the application currently in use, the cursor position in the local buffer is also updated accordingly. During cursor left/right events, the cursor position may temporarily fall outside the current "window" of buffered characters without requiring the buffer itself to be reset, but if text is then added outside the buffered region, then the buffer contents may have to be reset, as the contents of neighboring regions of text is unknown. The context buffer data also is reset when the user uses the cursor up/down keys, or when the mouse is used to move the cursor, or to execute commands, or when certain combinations of keys are pressed to execute a command, if it cannot be determined how these events affect the text currently being written.

A "word" (as stored in context.word) is defined as a sequence of characters building a single word, as it would appear in a dictionary. This includes, without being limited to, letters, digits, and the dash sign. An apostrophe sign before a word is not considered part of the word for the purpose of this system. An apostrophe sign, or other sequence of one or more non-word signs after the last letter of a word is processed as a possible "activation sequence" (when the system is applied to Italian and certain other languages), rather than being accepted without action as part of that word. If the word context cannot be determined, either interfacing with the application, or interfacing with the operating system, or through the local context buffer context.buffer, then the word context string is left empty. This may for example occur if the system is poorly integrated with the host environment, so that context information can only be acquired through buffering of the input characters, and is lost after vertical cursor movement.

A buffer holding more context text than the current word is both desirable and useful, as it avoids having to request context information (which may also be unavailable) to the operating system or application after horizontal cursor movement and text deletions going backwards beyond than the current word. A possible implementation could be a circular text buffer of constant length, from which the current context word could be derived as necessary.

The variable context.capital is set to yes if, according to the punctuation or other context attributes (e.g., beginning of sentence), the word stored in context.word would need to be capitalized. This information is not used for capitalization purposes, but rather because some accent rules need to know if an unknown word is likely to be a proper noun or not, and proper nouns can be recognized by the capital initial, but only if such capital initial is not context-specific.

The variable context.expectsinglequote would be set to yes if it was determined from the context that, within a certain range (the maximum of which can be specified, e.g., as one or two sentences from the current position, or as a certain number of characters or words) going back from the current position, certain characters were found which are normally used as an opening sequence for certain types of quotes for which the closing sequence may consist of one or two consecutive apostrophe or grave characters, but no such closing sequence was found. Knowledge of this is valuable because if an apostrophe is for example found immediately after an unknown word, especially where it is intended to produce good results even with unknown words, it might indicate an accent, or instead a closing quote. Certain rules for placing accents where automatic correction is desired and no user preference is given will leave an apostrophe (or grave character) unchanged after an unknown word, if a closing single quote is expected. A "single opening quote" is in general defined as an apostrophe sign (decimal ASCII code 39, or similar characters), a grave character (decimal ASCII code 96, or similar characters), or a comma (decimal ASCII code 44, or similar characters) when they immediately precede a word. An additional condition to recognize such an opening sequence could be that the sign does not immediately follow a letter, or that it immediately follows a space, line feed, or appears at the beginning of a sentence, or that it immediately precedes a letter. The sign may also appear twice (consecutively), or for example in single-quotes within double-single-quotes within double-quotes, in which case it is expected that the context.expectsinglequote condition be not cleared until all quotes are matched. For this purpose, it is possible to associate a counter field to this information. The context.expectsinglequote condition is cleared after a certain number of characters, words or sentences, in order to avoid the carrying over of possible interpretation errors. Furthermore, the single quote counter should not be increased or decreased for single quotes which can be recognized as having a specific purpose that does not require paired sets of quotes. This applies, for example, to single quotes appearing as part of a quoted possessive or negative or known abbreviation form, as in "Will said 'Don't play with Mary's ball before 5 o'clock, or I'll be very angry,' and went to work." Known patterns such as "*'t", "*'s", "o'*", "*'ll" ("*" denoting any word-string) could be part of a list used to exclude certain single quotes from the count of opening and closing quotes.

The variable context.language indicates the language of the current context. This is used by certain accent rules because, if a word requiring accent action is found that is unknown, then no action should be taken if the word is known to be not Italian or another language for which this system can be applied. Background: we need things like rules (pattern matching rules, which for Italian accents result in suffix rules as the only necessary ones) and generic fallback rules because otherwise the system only works with known in a dictionary. Also, a system based on dictionary entries could use too much memory. However, rules tend to be too generic, and could too easily be applied to words which are in a language other than the one intended. As an example, if the implementation is based on a set of suffix rules, with optional dictionary words (usually exceptions to rules), and where a word does not match any dictionary entry, the system would apply rules, and if no rule is found, a fallback rule (for example, a rule saying that if the last letter of the word is "a", then an activator after the last vowel would mean that the "a" should be converted to an "à") would be applied. If the host environment (operating system, or application) provides no language information (Microsoft's Windows error handling interfaces do, and Microsoft Word also does the same at the application level), a method can be used to identify Italian text by comparing all bigrams (letter pairs) in the current word with a table of bigrams used in Italian. This technique occupies about 100 bytes of memory to store bigram data for all possible pairs, is fast, and for Italian gives quite reliable results, because Italian uses only a small part of the possible two-letter combinations (about only one third of all possible combinations). The table of bigrams is preferably stored so that each possible bigram is represented by one bit, which is set to 0 or 1 to indicate that that bigram is used in Italian (or other language to which this invention is applied) or not. A bigram language analysis is extremely fast and improves the reliability of accent rules on slow systems where a word-based analysis (where a whole dictionary of words is stored) or other techniques might use too much memory and execution time.

The variable context.typemode indicates whether, during interactive text input mode, text is being inserted (i.e. text to the right of the current cursor position moves to the right as new text is entered) or overwritten (i.e. new characters replace existing characters). This information is used both to appropriately update the local context buffer, and when sending "fake" input characters to replace one string with a new one. For example, in "insert" mode, to replace a character with another one the user (or a system simulating user input) would press the Backspace key followed by the new character. In "overstrike" mode, however, the user would have to use the Cursor Left key instead of Backspace, or otherwise one character of unrelated text following the replacement point would be lost. Alternatively, the user (or a system simulating user input) could temporarily change the "TypeMode" as appropriate before text input, and then restore the original status. The TypeMode is usually changed with an appropriate application or system command. Under Windows and other operating systems running on PCs the TypeMode is changed using a dedicated keyboard key, named Insert. Use of this key can usually be intercepted or simulated as necessary. Applications usually start in insert mode (with a few exceptions starting in overstrike mode, such as the Windows Command Prompt window, which are known, and/or which the user may want to program with appropriate settings), and the system described here must keep track of all actions which affect the TypeMode status. A few applications use the Insert key for other purposes (e.g., Microsoft Word can use it to insert clipboard text), but these same applications usually provide an interface with TypeMode status information. On other systems and applications, equivalent keys and commands can usually be detected and simulated as necessary.

Activation Sequences

The most important activation character for Italian is the apostrophe. The simplicity and intelligence of the system described here lies in the algorithms employed to make sure that the apostrophe character is properly converted to an accent, or left as is, or recognized as an error and therefore totally removed from the input stream.

The acute character (the character under the tilde character, on US keyboards) can be used instead of the apostrophe, or to possibly explicitly set one type of mark instead of the default one placed by the apostrophe sign.

For an implementation applied to Italian, accented vowel characters in the input stream can be processed as if they were two separate characters, i.e. the vowel character plus a generic "activator" character expressing a "hint", or an "intention", more than an exact character. This is the same as an occurrence of the vowel character followed by an apostrophe character, with the exception that the considerations dealing with possible single quote character ambiguities ("Could this be a closing quote character?") do not need to be applied. In practice, it was found to be most effective to treat accented vowels in this way always in interactive mode (i.e. when the user is typing), and only if they appear at the end of words, and optionally unless they are not preceded by an apostrophe, when working on file or clipboard data. This is because accented vowels in the middle of words are usually not Italian, and are written by more sophisticated writers who "know what they are doing", and at the same time only interactive mode provides the additional control to correct or change the proposed accent or apostrophe. In other words: in interactive mode it is fine to take action one letter after the other, as they are typed, and the concept of "inside a word" does not exist (during normal typing of a word, letters are always "at the end of the partial word"), and the system described here provides an intuitive way of looping from one character to the other. On file and clipboard data, however, the system "knows" when something occurs at the "real" end of a word, and there is no option for user interaction, so it is best not to apply changes in the middle of a word (unless specific user settings or dictionary entries require such a change), or at least not based on generic suffix rules alone. For this purpose, accented characters appearing at the end of a word but before an apostrophe should also be "left alone".

Certain characters ("\", "/", "|", apostrophe, acute, etc.) could be used to explicitly express what type of accent/apostrophe should be placed. This might be one way to handle exceptions. The average writer will probably not use it, and in general it is best to extend the dictionary, rather than to use this method when typing. This could however be useful to handle exceptions when encoding accented text as 7-bit ASCII, for future reconversion.

Repeatedly pressing an activator character during text input toggles the state of different diacritical signs, such as acute, grave, circumflex, apostrophe, umlaut, no sign, etc. This set of signs, as well as the preferred order, is based on language, user settings and possibly dynamically adapted based on the frequency of previous selections.

In other languages, or for language-neutral applications, such as for entering currency or other symbols that are not present on a keyboard, this system works best in combination with certain sequences of characters which normally do not occur in real text. For example, currency symbols are usually never used more than once in a row, so the repeated pressing of a currency character, e.g., "$", could be recognized and processed as an "activator", initiating a certain action. In many languages, action could be initiated after a certain character is pressed two or three times, or when this is done one, two or three times after a certain context (for example, in German, repeating "e" after an existing "ae", "oe" or "ue" could initiate a loop toggling between the two letter pair and the first letter with an umlaut).

Automatic Changes and User Recorrections

When the present system is applied in interactive mode, i.e. during typing, it may be desirable not only, following an automatic change, to optionally initiate a loop providing multiple options, as described elsewhere, but also to more simply override the automatic change and manually enter some text, which should then not be modified again.

Partially similar considerations appear for example in U.S. Pat. No. 5,754,737, claim 8 ("monitoring whether a user changes the at least one replacement character back to the at least one character; and if so, then creating an exception to the auto-correct rule") and U.S. Pat. No. 5,761,689, claim 10 ("disabling step (d) in a current instance to prevent said entry from again being replaced with the replacement if the user backspaces over the replacement and reenters the entry, thereby enabling the user to override the automatic replacement for said current instance") and 20 ("determining whether a user has entered a command to undo the replacement of said current word with said at least one predefined replacement character, and if so . . . "). This system has slightly different requirements, which could be formulated more like "if, in interactive input mode, the user manually re-writes, in the same original position, one or more characters that were automatically changed, then the automatic change shall not be applied again". This "memory" would be limited to the last automatic change. There could be a system option to manually request, or automatically take action, to create a permanent override rule. The issue in our case is not limited to whole "words", nor to actions resulting from the user using the Backspace key (the cursor key could be used to go back, or the position could remain unchanged), nor to "replacements". The system described here could simply have deleted a character, which is not a replacement action, nor does it require any backspacing. Re-pressing the same character in this case could either initiate a loop as described elsewhere, but the loop step is optional, and so repeated action could simply initiate the present override step.

It is proposed that an additional claim consider the possibility that the system alternately apply the automatic change, and then leave the user override it, and so on, every even number of times. Example: the user writes something which is changed by the system (which places the correct Italian sign on or after a vowel). Then, by mistake (or, more frequently, as the result of being undecided about a combination of words), the user goes back and deletes the last characters, but then, re-writing the original characters the original input method does not produce the correct characters any more, which can be very frustrating, because the automatic system does not work. By going back again and re-writing the characters a third (or fifth, seventh, etc.) time, the system would again apply the automatic change. This is important, because unlike the systems described by Microsoft, which are more strictly "error correction" systems, the present system, especially when applied to Italian, becomes a new "way of writing" (referred to as an "Input Method" by some), allowing the input of characters that may not be present on the keyboard, and placing characters in a way that the average writer would often be unable to do. This, combined with the high reliability of the system when applied to Italian, motivates the additional operating mode where automatic changes can not only be disabled (possibly by mistake, or not with a final intention), like proposed by Microsoft, but also re-enabled with immediate effect.

The user additionally has other manual ways to input sequences which would normally be changed by the system, such as certain combinations of characters which might otherwise initiate an IME loop that does not include those combinations of characters. This includes the possibility of using traditional text editing sequences to input one character at a time, separated by a space character, and then removing the space character. Even after very short use of this system the user gets both familiar and comfortable with the fact that certain actions result in automatic changes and loops, and because these automatic actions are very predictable, the ways to avoid them, should this ever be necessary, also come very natural to the writer.

Rules and Data Structures Used for Italian Text Input

When this system is applied to Italian, in which case all the considerations about apostrophe and accent characters apply, it is a very important objective to offer the best possible reliability when automatically producing the correct output on first try. This is unlike many other input method editors, as those used for certain Asian languages, for example, which during writing frequently rely on specific manual user feedback to select one from different possible choices proposed (displayed) by the system.

The functional objective of the system, applied to Italian, is to automatically place the appropriate accent or apostrophe marks at the end of words, which in general means on or after a vowel. For a basic implementation, it is sufficient to consider a set of word suffix pattern matching rules, with appropriate priorities, and default fallback cases. Specific words may be included in the rules, mainly to define rules and exceptions that are associated to certain exact words, rather than to groups of words ending with a certain suffix.

There are also cases in which it is desirable to be certain that a word is written in a certain way, rather than just basing the assumption on a sequence of suffix rules, which could for example produce a positive match on a foreign word, or one that had not been appropriately considered as an exception. This is the case, for example, when the user is writing inside a single-quote context. In such a case, the system may consider that an apostrophe character after a word which in the dictionary explicitly appears as being always written with a certain accent or apostrophe is not a closing quote (but rather should be transformed into an accent), whereas if instead the word does not produce an exact match, but rather only satisfies the suffix rules, then the system may for example display a little information box and/or produce an audio cue, while at the same time still producing a default output. The default output in such uncertain conditions ("is this a closing single quote, or an accented word we don't know?") could be based on statistical considerations about the likelihood of a closing quote at a certain distance (measured in characters, or words) from an opening quote, as opposed to the statistical likelihood of an accent sign on an unknown given word. This information, together with accents on words that match suffix rules, but not exact word entries, could even be collected and "remembered" by the system, so that user choices progressively lead to a system producing better results on first try.

Another case in which it might be desirable to try to have an exhaustive dictionary of words, in addition to suffix rules, is an editorial context. In a professional publishing house it might be a policy to check out every single word. In this case, even if the suffix rules produce the correct output, a warning might be issued informing the user that the word is unknown, as would probably already be done for unknown words in general, based on a traditional error detection approach. The system described here is however designed to be applied independently from traditional spelling checkers and similar technologies, in comparison to which it requires by far less manual intervention, and is more reliable.

The data structure presented here can be used for all of these purposes, integrating a varying number of suffix rules and exact word entries, based on accuracy, speed and memory overhead priorities. Even a simple system with only a few dozen suffix rules and exception words would achieve a "first hit" reliability exceeding 99% for the average Italian writing needs.

The context.language status variable can be used to determine whether to apply Italian rules to the text, or not. Automatically detecting a language change is however not always easy, not even for humans (especially on the first word in a new language), so this particular implementation of this system employs two additional techniques to prevent possible errors. The first is a simple bigram table, so that Italian suffix rules are not applied to words which contain one or more bigrams which do not normally occur in Italian words. The second is a list of certain word patterns which in English, which is often used in an Italian context, are associated to an apostrophe sign, and which do not occur in Italian. English words ending with a vocal and which are more frequently followed by an apostrophe (e.g., "I", "he", "she"), and which do not have an Italian accented equivalent, are listed together with other Italian words, but with appropriate flags indicating that these words are never accented, i.e. the system should not convert an apostrophe after these words to an accent (which is a default action for Italian, unless a word is known to occur with a final apostrophe). Additionally, the system includes a special list of words (rules with POSTAPOSTROPHE flag) which are known to only exist after an apostrophe, and which are used in English, such as: "s" (also used in German), "d", "ll", "ve" and "em". When the user writes a word, ending in a vowel and followed by an apostrophe, and the Italian rules (possibly a suffix or fallback rule) cause the word to be accented by the system, and then these known "post-apostrophe" words occur, and then the word ends, the system restores the previously changed apostrophe. For example: "I'll go home": the system recognizes "I" as a word which can be either without accent (Italian) or followed by an apostrophe (English), but never accented (not even in Italian), and leaves the apostrophe as is. (Had the entry for the word "i" not indicated that the word does not exist with an accent, the system would still have been able to retroactively correct a change from apostrophe to accent after checking the "ll" word, as is done for the case below.)

"Gina's car is red": the system might initially convert "Gina'" to "Ginà" (assuming that no exact entry for "Gina" exists indicating that the accented "Ginà" does not exist, and therefore applying a generic suffix or fallback rule), but then, after the following non-word character, it recognizes the apostrophe+"s" pattern, and restores the apostrophe.

In the implementation published by Cloanto, the data structures for Italian consist of a series of lists which all deal, in one way or another, with apostrophe and accent information. The lists consist of:

Five sorted lists ("A", "E", "I", "O", "U"), each containing rules for word and word suffixes ending with the corresponding vowel. Each entry can refer either to a word suffix (i.e. to a group of words ending with the same suffix) or to an exact word, and can have one or more flags, described below.

One optional list of words ending with a consonant, but which are nevertheless frequently written followed with an apostrophe even if no apostrophe should be placed after the word. For example, the list could contain an entry indicating that the word "qual" is never to be followed by an apostrophe. In this case, as explained in the general overview, the system could replace the apostrophe with a space character. These entries usually only have the NOTHING flag.

One list of replacement rules. These can optionally be enabled to place accents inside certain foreign words. For example, a rule could say that if the user writes "Cezanne", the word should automatically be converted to "Cézanne". These rules, like the rules for words ending in a consonant, only complete the system in an optional way, and do not affect the main feature of "input method editor" functionality.

One optional list of words which are known to occur after other words separated only by an apostrophe character. These entries include mostly particles, such as "s" (English and German possessive), "d", "ll", "ve", etc. This list enables the system to postumously recover from certain incorrect changes which might have been applied as a result of suffix and fallback rules included in the "five vowel lists". As a result of this list the system becomes extremely reliable even when writing for example in English, and when language detection is not possible.

Word and suffix entries in the lists are case, accent and apostrophe insensitive, i.e. the entries produce matches ignoring accent, apostrophe and case information. This is also referred to as "normalized". The entries only consist of the letters "a" to "z", and the dash symbol ("-"), if surrounded by other characters. One asterisk character may be used, at the beginning of an entry, to indicate that the entry refers to a word suffix, and not an exact word (e.g., "*che" vs. "perche").

The following flags and attributes can be associated (also in combinations) to the entries:

NOTHING: this flag indicates that the word (also) exists without a final accent or a final apostrophe sign.

GRAVE: the word (also) exists with a final grave accent

ACUTE: the word (also) exists with a final acute accent

CIRCUMFLEX: the word (also) exists with a final circumflex accent

APOSTROPHE: the word (also) exists with a final apostrophe (immediately following the last letter)

APOSTROPHERARE: used with APOSTROPHE, meaning that use of the word with apostrophe is very rare. The user may decide to set the system in a way that the word is not considered to have APOSTROPHE if APOSTROPHERARE is set, which would improve the automatic detection of certain common apostrophe and accent errors.

INFORMATION=string: This is an information text which may be displayed as a "tooltip" above the cursor position, or elsewhere on the screen. It could say something like: "This word is used with or without accent. Without accent it means XYZ. With accent it means ABC." Usually the tooltip is displayed to inform the user that an entry with accent or apostrophe is probably not what was meant, i.e. not necessarily an error, but more likely to be one than now. In the program settings, the user can decide to display different types of messages.

COMPOUNDSTRICKY: This flag, used with words that have no accents, indicates that compounds of that word do have an accent. This is a confusing condition for the writer, and this flag allows for a more detailed explanation to the user, depending on the desired level of information messages. For example, if the user wrote "tre" with an accent, the system could remove the accent and display a message saying that "Unlike its compounds, 'tre' is written without accent".

TRICKYCOMPOUND=string: This string attribute indicates the COMPOUNDSTRICKY word of which an entry is a compound, for the purpose of displaying complete information to the user, if desired.

ITALIANIZED <LANGUAGECODE>=string: This attribute and additional string fields indicate that the word is an "Italianized" version of the word, which in the original language(s) is written differently. Italianization of words is not as frequent today as it used to be, and often resulted in accented words. In modern writing the original words (English, French, etc.) tend to be preferred to the old Italianized forms. Appropriate program settings could for example be used for automatic replacement with the preferred word variant, to consistently use the Italianized or the original forms.

String attributes complete the information by indicating the original word, specifying the original language.

CAPITAL: This attribute indicates that the word to which the rule refers always appears with a capital letter. This information may be useful to detect certain proper nouns for which specific accent rules apply.

TRADEMARK: This attribute indicates that the word is a trademark or registered trademark. This information could be displayed to the user as part of a view of all the word properties. For example, the entry for the company name "Océ" would be "Oce ACUTE CAPITAL TRADEMARK".

WEEKDAY: This flag indicates that the word is the name of a weekday. Weekday names from Monday to Friday are accented in Italian, and represent one of the more frequent instances of errors in which an accent is not written, when instead it should be. This flag, in combination with an appropriate program option, could be used for automatic correction of weekday names written without an accent.

TRICKYINSIDE: This flag indicates that the word contains accents, but not at the end of the word. This flag would normally only be used for non-Italian words (typically French words sometimes used in an Italian context). Like WEEKDAY, this flag allows the program to reduce the computational overhead by limiting the search of words in a non-end-of-word-accent context to the words that may require attention even if written without a final sign.

COMPLEX=string: This string attribute is used to describe the accents in a (usually non-Italian) word when the attributes for final accents (GRAVE, ACUTE, CIRCUMFLEX) are not sufficient, i.e. because the word contains diacritical marks inside the word, and/or at the end of the word, but not of type GRAVE, ACUTE or CIRCUMFLEX.

FALLBACK: This flag marks the last rule in the first part of the list. A fallback rule is of type "*a", "*e", "*i", "*o", "*u", i.e. it is used only in the lists associated to words ending with the five vowels, and indicates the fallback rule to apply when the previous rules, which are parsed sequentially from top to bottom, produced no match. This flag has no functional purpose other than to mark the boundary between the two parts of the list, as explained below.

POSTAPOSTROPHE: this attribute, used in a dedicated list, marks those particles such as the English "s" and "ll", which are written after an apostrophe. These particles are useful to correct signs incorrectly changed to an accent, which is a condition which might occur when applying Italian rules to non-Italian words, as is the case with words which usually precede such particles. At the same time, these particles represent, in many languages, the only cases in which apostrophes are used at all. Recognizing these occurrences increases the reliability of the system when applied to a multilingual context.

NOTITALIAN: this attribute is used to allow certain word entries in the rules lists to be recognized as not being Italian words, so that they can be considered even if the current language context is not Italian, which would normally disable the system. This allows, for example, to place the correct accent on non-Italian words such as the noun "José", which would normally fail even a simple Italian bigrams test. Use of this flag is optional, and also depends on the advantages it brings with consideration to the procedure used for language detection, if any.

Flags can and should be combined, if more than one flag applies to the same suffix or word. For example, a word may exist, with different meanings, with no sign, with an apostrophe, and with an accent. Such a condition is rare, but exists. Great care must be placed in compiling the list of rules that are part of the lists, because if a word or suffix rule becomes part of the list, then it must consider all words for which there might be a match, not just some words. Bad entries, i.e. entries that do not consider all possible cases in which they may be applied, are worse than no entries, because they could produce incorrect output while at the same time indicating to the user that such output was confirmed by a certain rule. In this implementation, entries with no flags would have no meaning, and are not permitted.

For the purpose of determining whether the input of a universal activator character in an Italian context refers to an apostrophe, an accent, or an error, in Cloanto's implementation of the system a high priority was placed on the collection of data about words and suffixes which are often incorrectly written with a sign, and those which are written with an apostrophe. These two cases, which tend to be covered through word rules rather than suffix rules, are usually better excluded in an exhaustive way before focussing on accents, because accents use more suffix rules, including fallback suffix rules, which might otherwise be applied incorrectly.

In Cloanto's first implementation the lists are parsed sequentially, top-to-bottom. This system could be improved to reduce the number of comparisons, using a variety of possible data structures for sorting and searching, which are well-known (e.g., Donald Knuth's Sorting and Searching book). In practice, however, the method described here is sufficiently fast, and helps to better understand the procedure. When the system has a positive match between the current word and a rule, it ends the search, unless a second search is necessary, in the second part of the lists, as described below.

Rules which represent exceptions to other rules must appear higher in the list than the rules of which they are an exception. Rules may also be placed higher on the list based on frequency considerations. The 20 most frequently-used rules cover more than 90% of Italian accents, which could be considered a good reason for working with a simple sorted list as described here, rather than introducing additional code complexity. In a sorted list, careful placement of the rules based on frequency is the factor that mostly improves performance. However, as said before, rules must always be preceded by their exceptions. For example, a rule indicating that "*che", i.e. words ending with "che", can have either an acute accent or no accent or apostrophe, must be preceded by exception entries for words such as "picche", which can be written either without any sign or with a grave accent. If a "*che" rule is placed on top of the list for frequency/access speed reasons, then all of its exceptions must be placed before it as well.

Each of the five "vowel lists" must contain a fallback suffix rule entry (SUFFIX flag), being the shortest possible suffix rule, i.e. just the one vowel to which the list itself refers (e.g., "*a", "*e", etc.), and following all other rules (although additional entries may follow, in a second part of the list, as described elsewhere). This entry is also marked with the FALLBACK flag, although it could, in theory, be implicitly identified by the fact that it is a one-character SUFFIX rule. For words ending with a vowel, a fallback rule indicates the statistically best fallback description for words ending with each vowel, when none of the previous rules matched. A fallback rule usually indicates that words ending with that vowel either have no sign, or they have a certain type of accent. For example, the fallback rule for words ending with E could indicate that those words, unless covered by rules appearing higher in the list, have either no sign, or they have an acute accent. So if for example the user writes an unknown word ending with "e", and followed by an apostrophe, the system would transform the vowel+apostrophe combination into the vowel with an acute accent ("é"), rather than leaving the apostrophe, because the fallback rule had no APOSTROPHE flag. For this reason it is very important to have complete rules that cover words ending with E that are written with an apostrophe, or that end with a grave accent, or that are often written with a sign even if they shouldn't, as well as additional "safety nets" to recognize apostrophes which may be closing single quotes, or English or German possessives, or similar particles used in combination with an apostrophe sign. If these cases were not handled correctly, the system would output incorrect acute accents.

In Cloanto's first implementation, when a rule entry contains the flag NOTHING and no other flag of type GRAVE, ACUTE, CIRCUMFLEX or APOSTROPHE, and the input contains an accent on the last character of the word, or an apostrophe after the last character, then the system removes that sign. If however the sign was a sign that could be used as a single closing quote, and the context is such that a single closing quote is indeed expected, then the sign is not removed. Also, if after the removal of a sign equal or similar to an apostrophe, a POSTAPOSTROPHE word string follows, as soon as this second word string is complete (i.e. after the first non-word character following the string), then the system retroactively recorrects the previous correction, reinserting the apostrophe. A peculiarity of the writing of truncated words ending with an apostrophe is that if the last character of the truncated word is a consonant, then the apostrophe also acts as a spacing character between that word and the following one, i.e. no space character is used between the two words. An automatic system removing an incorrect apostrophe sign would have to take this into consideration, in order to place an appropriate space character where necessary, and indeed so does Cloanto's software. As described elsewhere, the system provides for different ways to override the automatic removal or change of a sign (e.g., by manual editing, or by repeating input and initiating an IME loop).

A rule entry containing only one flag of type GRAVE, ACUTE, CIRCUMFLEX or APOSTROPHE expresses a very clear statement about matching words, indicating that any matching word cannot be written without sign, but only with a sign, and also indicating the exact sign. This not only eliminates ambiguities in a context such as that where a closing single quote is expected, and the user pressed the apostrophe key, but it could also be used to place missing signs when the text input stream did not contain any special signs. In practice, Cloanto does not recommend this, because it would be impossible to do it for all words, as many words can be written both with and without signs, with different meanings. So the user would not reliably know when to expect system action, and when not, which is the opposite of the reliability and predictability that Cloanto would like to implement with such a system. Such a behavior could however optionally be enabled for a selection of words commonly written without signs even when they actually need one, such as weekdays. More in general, the single flag would only used to apply the correct sign on or after a word, but only if a sign was also present in the input text.

When a rule entry contains multiple flags, of which one is of type NOTHING, and only one other flag is of type GRAVE, ACUTE, CIRCUMFLEX or APOSTROPHE, then the system places the appropriate sign, if an apostrophe or similar character follows the word, or if an accent is on the last vowel of the word. Optionally, the system could be programmed to leave accented vowels (i.e., in interactive mode, the result of an explicit selection of an accented key, opposed to the selection of the apostrophe) as they are, and only apply its logic to the output when apostrophe characters, or some other specific activator character, appears in the input. Also, as already mentioned, the system can be set not to apply any changes when accented characters are found inside (not at the end of) words (which condition of course can be detected when working on clipboard or file data, but not during typing, unless action during typing is deferred to when the end of the word has been reached, which however would make the system much less interactive, partially defying the purpose).

Word or suffix entries with more than one of the GRAVE, ACUTE, CIRCUMFLEX or APOSTROPHE flags are very rare in Italian, and usually consist of either GRAVE or ACUTE and APOSTROPHE+APOSTROPHERARE. The default setting in Cloanto's implementation is to ignore APOSTROPHE+APOSTROPHERARE flags, resulting, in practice, in simpler entries consisting of NOTHING and/or GRAVE or ACUTE. Still, a few entries may in theory remain with more than one of the GRAVE, ACUTE, CIRCUMFLEX or APOSTROPHE flags, which may or may not also be combined with the NOTHING flag. In these cases, the system may not have enough data to automatically make changes to the input stream, but it may use the flags to display an information or warning message in case the input does not match any of the flags, or to place certain signs before others in the preferred order for the IME loop. In practice, however, statistical analysis of Italian texts by Cloanto showed that the only cases in which multiple flags appear are entries (with or without NOTHING)+(usually GRAVE, but sometimes ACUTE)+(APOSTROPHE, sometimes combined with APOSTROPHERARE), and that it is practical to leave the entry unmodified if the input contained no accent or apostrophe, and to accept an apostrophe in the input as the correct accent, which is statistically considerably more frequent than the apostrophe, even if APOSTROPHERARE is not present. The following is a sample entry of such a multiple-flag word, which also includes an information message that the system could optionally display:

di NOTHING GRAVE APOSTROPHE INFORMATION="di=preposition (as in "di più"); dì=day; di'=you say (imperative)"

In Cloanto's preferred implementation, a POSTAPOSTROPHE condition always overrides a previous automatic conversion of an apostrophe to an accent, or the removal of an apostrophe, even as part of an IME loop (e.g., a user trying to write "José's car is red"). This is because a POSTAPOSTROPHE condition usually indicates a non-Italian context, in which an Italian word or suffix rule was applied by mistake, or in which an IME loop was initiated by mistake.

It should be noted how the inclusion in the rules of English words such as "I", "she", "he", "we", as well as proper nouns, all with the NOTHING flag, as long as these words are never accented even in their possible Italian word equivalents, combined with POSTAPOSTROPHE entries, creates a double-barrier against possible misinterpretations (and incorrect changes) of apostrophe characters used in a "non-Italian fashion", as in "I'll go home". The additional word entries are useful because the POSTAPOSTROPHE entries cause a recorrection after the user may already have been slightly confused by a temporary incorrect change. The additional entries help to prevent these (already rare, in an Italian context) cases.

Optionally, the lists of rules associated to words ending with a vowel may have a second part of entries, after the fallback rule. This second set of entries does not change in any way the results that would be achieved by applying the first part. An entry in the second part conflicting with the rules appearing in the first part (including the fallback suffix rule), would be considered an error in the data structure. While the first part of the list has a priority on performance, which is achieved using suffix rules, the second part additionally specifies words (and in rare cases suffixes) that are already covered by suffix rules in the first part, but which in the second part are listed in detail. This more exhaustive information is used to produce more accurate results in a context where single quotes are used, or in a very professional editorial context (where unknown words should not be processed applying a generic suffix rule, but rather be double-checked manually), as well as to provide additional information to the user about an automatic change. When a word (not a suffix) rule appears in the first part of the list, that word is considered a positive confirmation that the word exists in Italian, and that it is written as indicated by the attributes for that rule. When however a suffix rule appears in the first part of the list, then that is treated as a generic rule, and not as an exhaustive information. For this reason, it is prudent to always use the NOTHING flag on suffix rules that appear in the first part of the list. For example, a suffix rule describing words ending with "che" would have to have both flags for NOTHING, and for ACUTE. If the user wrote "affinche'", the system would correctly output "affinché". However, if the user wrote "affinche'" in a context were a pending closing single quote was detected, the system would not be sure whether it would be best to treat the apostrophe as a closing single quote, or rather as an accent. Different fallback behaviors can be defined for these conditions, including the display of a warning message, and/or access to statistical data about the likelihood of a closing quote at a certain distance from the opening quote, opposed to the frequency of an accent on an unknown word. If however the second and longer second part of the list, which would only have to be accessed in these more ambiguous cases, included an entry for "affinche" having only the ACUTE flag, then the system would know that the word "affinché" exists, and that it is always written with an accent, and therefore the apostrophe character was intended as an accent for "affinché". The input of a second apostrophe character, should one follow, could then be interpreted as a closing quote.

The second part of the list only serves the purpose of defining in detail, with separate word entries, what should already be included by suffix rules in the first part, but which these suffix rules cannot describe and at the same time limit in an exhaustive and complete way. In addition to the cases described above (single quote context, editorial context), another possible application of the entries in the second part could be to change the color of a status indicator from one color indicating that a suffix rule was applied (e.g., yellow), to a different color (e.g., green) when an exact word match was found. Also, whereas suffix rules have to be more open minded, generally including the NOTHING flag to consider for possible unaccented words matching that rule, exact word entries do not need to do that (unless an exact word can be written both with and without accent), making it possible to automatically add accents and apostrophe characters even if the user placed no sign. Except for very specific cases, such as weekdays and a few other common mistakes, such automatic behavior would however not be encouraged, because Italian still has many words which can be written either with or without a sign, and in these cases no safe automatic action would be possible.

To further clarify, even in a system with vowel-lists divided in two parts, the first part should be designed in such a way that correct output is generated when the user enters, for example, the apostrophe key after a word. The second part of the list only serves the purpose of giving additional certainty, which is normally not required. The flags for the exact word entries in the second part of the list must match or be a subset of the flags for the matching suffix rule in the first part.

In rare cases it is possible to also use suffix rules (opposed to word rules) in the second part of the list. If they are used, then the entries are treated as being as "authoritative" as exact word entries. One case in which a suffix rule may be used in the second part of the list, is for suffixes such as "ventitré", which means "twentythree", and which can be appended to an unlimited combination of other numbers. However, the suffix rule "*ventitre" has a string which makes it detailed and precise enough so as to only be applicable to words meaning numbers. It can safely (unless the entries of this system also need to be used for ortographic error detection, which is beyond the scope of this system) be used without the NOTHING flag, to mean that all words ending with "ventitre" must be accented.

To conclude, word entries have the same meaning and are treated the same way both in the first and the second part of a list, and do not need to be repeated twice. Suffix rules are considered "authoritative", meaning that they give sufficient certainty about all matching words even in certain unusual circumstances such as single quote contexts, only in the second part of the list. Word entries in the second part of the list may not conflict with suffix entries in the first part, of which they must have either the same flags, or a subset.

Depending on the implementation, it is possible to not include entries for the type of rules that here have been described as belonging to the "second part". Conversely, on a sufficiently fast system, or using different data structures, it may be possible to merge the two lists into a single list. The purpose of the separation, as described here, is only to keep the first list as short as possible, yet to still be able to access, in exceptional cases, additional and more exhaustive data.

Sample Implementation: Processing of Italian Text Input

The following description (and separate pseudocode, variables and tables) documents an implementation of the system applied to Italian writing, as will be published in Cloanto's "AlphaShift" and "Accenti" (respectively, international and Italian versions of substantially the same product) software packages for Windows. Opposed to traditional error detection and correction systems, these packages by Cloanto focus on text input (rather than error handling), have a much higher reliability (i.e., what they do automatically, does usually not require intervention), and are open minded about possible diverse user intentions, new words, and multilingual contexts.

The system is interfaced with the Windows operating system as an "input hook", having access to keyboard and mouse events as they occur, and providing the ability to simulate keyboard input. If the application currently processing input is Microsoft Word, then the system uses specific functions, documented by Microsoft, to get current context and language information from Microsoft Word. Similar interfaces could be used for other programs, as available. If the application is not Microsoft Word, or another application providing access to information such as text context and language, then special operating system interfaces provided by Windows are used to try to collect text context, language and current cursor position information. These interface specifications currently include: Active Accessibility ("Active Accessibility is one of Microsoft's most strategic initiatives to improve the accessibility of our own applications and computer software in general. It consists of a new suite of technologies that let applications actively cooperate with accessibility aids, providing information about what they are doing and the contents of the screen. It also lets utilities automate control of the application.") and Input Method Editor ("The input method editor relieves users of the need to remember all possible character values. Instead, the IME monitors the user's keystrokes, anticipates the characters the user may want, and presents a list of candidate characters from which to choose. By default, the IME provides an IME window through which users enter keystrokes and view and select candidates. Win32®-based applications can use the input method manager (IMM) functions and messages to create and manage their own IME windows, providing a custom interface while using the conversion capabilities of the IME."). In the future, it is expected that Windows will offer a generic error handling interface as well (in addition to the accessibility and IME interfaces). These operating system-wide interfaces, however, only give meaningful results when the user is writing using an application that provides such data to the operating system, which in turn can then pass it to an application such as the system described here. For example, in order to use IME functionality, the application used for writing must be "IME-aware". In the worst case, i.e. when the application supports no interface to provide text context and language data, the system described here can still get the current word context from the local copy of the context, which is desumed from the keyboard input stream, but which is lost in cases such as vertical cursor movement, use of the mouse to move the cursor, or selection of a command, either via the menu or via a an "Keyboard Accelerator" combination of keys. To reconstruct context in this case, it is still possible to use the system functions to try and determine at least the text cursor, also called caret ("A caret is a blinking line, block, or bitmap in the client area of a window. The caret typically indicates the place at which text or graphics will be inserted.") If it is not possible to determine the cursor position through system functions, it may be possible to analyze the display memory, looking for a small flashing object. Once the cursor position has been determined, in the case of a bitmapped display, it is possible to apply optical character recognition (OCR) algorithms to the bitmap contents, with particular focus on the letters to the left of the cursor. OCR is particularly effective on screen bitmaps, because the character data is both "clean", i.e. not rotated or disturbed by printing or medium imperfections (which usualy disturb OCR applied after optical scanning from a physical medium such as printed paper), and because it is usually possible to use system functions to determine the fonts (typefaces) which are currently in use, and therefore make the OCR process easier, as the possible fonts are known, narrowing the possibilities (Windows for example provides information about the fonts which are in use). If the display is not bitmap-based, but character-based, then the text can be extracted directly from display memory. It has to be added that it is not very likely that text context is actually needed immediately after it is lost following a cursor relocation. Even if it is needed, e.g., if the user moves the cursor and immediately afterwards presses the apostrophe key to edit an Italian word, the OCR or other context analysis routine only need to succeed in obtaining the current word. Even if only a few characters before the cursor can be obtained, this is usually sufficient to apply Italian rules, which in most cases are suffix-based, i.e. giving more importance on the ending of words, which is where this system usually works (because in Italian that's where the whole accent and apostrophe issue is primarily located). Statistically, because of the events that need to occur in order to fail (i.e. the application and/or the system fail to provide context data, and the text buffer also does not contain context data, and OCR or other technique also fails, and the user input is such to require more context data than is sufficient, and the fallback rules give incorrect results), the system works very reliably even when context is temporarily lost as part of normal writing use. As far as on-screen OCR is concerned, it is most likely to succeed on the characters that are most important, i.e. the current word or at least a part containing the relevant suffix of the current word, because these parts are most likely to be visible immediately before the cursor position, rather than being located on a different line, or covered by another window. OCR analysis can also be closely coupled with the Italian rules parser, to stop analyzing text right-to-left after a positive suffix-rule match occurs.

If the system determines that the text stream needs to be modified, for example to replace a vowel and an apostrophe with an accented vowel, it adds "fake" information to the output stream, generating characters such as a backspace key input followed by an accented character. Where the application or operating system support this, it is possible to directly replace a string with another one, without simulation the progressive deletion of the old string. In either case, the local context buffer is also updated accordingly.

In Italian, we believe that it is desirable to treat the apostrophe character, and similar characters that may be present on a keyboard or character set, as well as all accented vowels, as activator sequences for the purposes of this systems. This is because of the intuitiveness, as well as because of the common errors in Italian writing that have been explained in the introduction. In consideration of the desired reliability of the system, the special handling of the apostrophe character requires very special care to avoid interpretation errors by the system. It would for example be very easy, for a system that is known to only have to deal with Italian text, to try to keep a dictionary of words, and, after the apostrophe key is pressed following a vowel, check if context.word appears in the dictionary with an accent or not, and add the correct accent (i.e. removing the vowel already typed, and adding an accented vowel) if appropriate. This is however not always possible, for several reasons. Firstly, design constraints (need for low computing or memory overhead) may limit the size of the dictionary, so that not all words may be present. The system was however conceived to be able to process Italian end-of-word conditions (accent, apostrophe, no sign) also using more general suffix rules, which would be implemented in a system with limited or no word dictionary. Secondly, regardless of the size of the word dictionary employed by the system, the user may enter a new word, or may start writing in another language, or may write an Italian word which may exist both with and without a sign on or after the last vowel. In these cases, it becomes important for the system to estimate the most likely intention of the user for pressing the apostrophe key. If the system finds no specific likely reason for the apostrophe, other than it being part of the word, then the word suffix rules are applied, otherwise the apostrophe is left as is, and is not treated as an activator character. For these reasons, it is always desirable to have a list of the most frequent words with an apostrophe or accent, as well as words which commonly are mistakenly written with such a sign, regardless of whether the system has a suffix rule that already would produce accurate result for this word. For example, a suffix rule saying that the sign normally used on words "*che", i.e. all words ending with "che", is an acute accent (as in "perché"), would work very well if the user wrote
    perche'
at the beginning of a sentence: the word would be automatically converted to
    perché
But if the system encountered
    'perche'
Then it could decide to reliably convert the input to
    'perché only if the complete word "perché" was found in the dictionary, and the data in the dictionary made it clear that the word only existed with an acute accent. If the word was unknown, or was such that it could be written both with and without accent (usually with two different meanings), then the system would leave the apostrophe unmodified, assuming it was a closing single quote. (Different default behaviors could optionally be set.)

In the previous example, i.e. in a system containing an exact word entry for "perché" when the user presses the apostrophe for the second time, the system would produce:
    'perché'
I.e., as explained more in detail in a specific section, having recognized both the pending closing single quote condition, and the accented word, the IME loop would place the vowel+acute accent+apostrophe combination in second position (after the first press of the apostrophe, resulting in vowel+acute accent), resulting in a very intuitive and efficient input sequence for this particular context.

In Cloanto's implementation, two major aspects differentiate the default behavior of the system when applied in an interactive context (keyboard input), compared to a non-interactive stream, such as file or clipboard data:
1. Accents inside words are not corrected in non-interactive mode;
2. Repeated activator characters (e.g., apostrophe characters) do not initiate IME loops in non-interactive modes.

Both differences are motivated with the additional control provided by interactive mode, which is not available when working on a non-interactive input stream. A program option could however be set to change this behavior. For example, if the present system were applied with the purpose of converting 8-bit Italian text data to 7-bit data (plain ASCII character set), apostrophe characters (which are part of the ASCII set) could be used in the text in place of accents (not part of the ASCII set). This would produce a text with simple apostrophe characters instead of more complex control sequences, that would still be very readable by humans, and which could be processed by the same system for re-conversion to 8-bit data. In a few rare instances, where during conversion to 7-bit data the system detects that the output of a single apostrophe character would be such that re-conversion to 8-bit data would produce a result different from the original, the system could output multiple apostrophe characters, in which case it would be desirable to have functionality comparable to interactive IME loops even in non-interactive contexts. (Also see the previous section titled "Activation Sequences".)

The program has an option to indicate whether accents should be placed on upper case letters. The default for Italian is Yes. If the setting were No, as required by some languages (e.g., French) and editorial styles, unlike for French in which this would result in all upper case letters with no sign, regardless of their position in the word, for Italian Cloanto's system follows a different rule, always removing accent signs, but appending an apostrophe to the end of the word if an accent was removed from the last vowel of the word.

The program has a similar option to indicate whether accents should be placed on lower case letter. The purpose of this option is, when set to No in combination with the option to not place accents on upper case letters, to create a pure 7-bit text.

The program also has settings to change the apostrophe character which is appended at the end of words when an accent was removed as a result of a setting indicating not to place accents on upper and/or lower case letters. By default, the apostrophe character is always used, but it is possible to use different characters, for example a special "grave" and "acute" character, depending on whether the accent removed from the vowel at the end of the word was grave or acute.

Another program option determines whether foreign words appearing in the word lists (ITALIANIZED flag) should be left as written, or replaced with the original non-Italian word. The default setting is to leave the words as written.

Another program option is used to enable replacement rules for words with a COMPLEX=<string> attribute, where any matching word would be replaced with the <string> (e.g., "Cezanne" would become "Cézanne"). This option is enabled by default, and is helpful to properly write certain non-Italian words (usually French words used in Italian).

Another program option determines whether end-of-word accents or apostrophe characters may be automatically added to words even if the input stream contained no sign at all. This option is disabled by default, as already explained. One possible setting is to enable this option only for weekdays (WEEKDAY flag) and/or for words with the TRICKYCOMPOUND attribute. Another setting enables the option for all words which have no NOTHING flag, and only one of GRAVE, ACUTE, CIRCUMFLEX or APOSTROPHE. This setting is however not encouraged, because the system would not always be able to add missing signs (as many words have a NOTHING flag, as they can be written both with and without sign, with different meaning), and it would not feel natural for the user to only place the sign for certain words, and expect the system to place it automatically for others.

Another option lets the user set the level of "verboseness" during interactive mode, i.e. the frequency with which "tooltips" are opened above the cursor to display information. The default setting is to only display information relating to words which may be written with more than one sign (e.g., with an apostrophe, or with an accent, or with no sign), and which have different meanings depending on the sign that the user may decide to use. Tooltips are also displayed by default when an IME loop is in progress.

A program option allows for the normalization of the apostrophe character, i.e. if the input contains a character which is similar, but not identical, to the apostrophe character, then the input character is processed as a user-preferred standard apostrophe character. For example, many keyboards contain a "grave" character, which is often used instead of the apostrophe, to which it is visually very similar, and possibly resulting in inconsistent use in the text. This option would make sure that the text always contains the same apostrophe character.

An additional program option is associated to the "spacing apostrophe" as described in the section titled "Italian: The Next Step". In Cloanto's implementation, apostrophe characters (as well as similar equivalent characters) are interpreted as opening single-quotes if they are immediately followed by a letter or digit, and not immediately preceded by a letter or digit. Similarly, in order to be recognized as such, closing quotes must be immediately preceded by a letter, digit or punctuation sign, and not be followed by a letter or digit. Quote characters followed by POSTAPOSTROPHE strings, or by two digits (as in "the summer of '99"), do not count as either opening or closing quotes. Other techniques to recognize opening and closing quotes are known and in use, for example simply requiring a single opening quote character to be preceded by a space, new line or beginning of text, and treating every other quote as a closing quote. All of these techniques could be used. Double single opening and closing quotes are recognized in a similar way. For certain languages, it may be necessary to treat single or double-comma characters, immediately followed by a letter or digit, and not immediately preceded by a letter or digit, as if they were quote characters used as opening quotes (as in "This is an „example" used in German"). After a single or double opening quote has been identified, the program sets a corresponding flag that is cleared only after a corresponding closing single or double quote. In order to avoid leaving the flag set by mistake, e.g., after a single quote that had incorrectly been identified as an opening quote, the flag can be cleared after a certain number of characters, words or sentences. Also (and again, optionally), the system may contain a table indicating, for varying character, word and/or sentence distances from an opening single or double-single quote recognized with a certain technique, the statistical likelihood, based on previously analyzed real-text data, that a closing item appear in that relative position (e.g., "After 100 characters from an opening quote, the likelihood that the following character is a closing quote is 1.31%"). If necessary, this data could then be compared with a threshold below which the "single quote mode" flag should be cleared, or the data could be compared with statistical data about the likelihood of an apostrophe character after an unknown word being an apostrophe or accent, or being unrelated to the word.

As also mentioned elsewhere, in certain environments, such as for example those requiring very high editorial standards, various contexts in which single quotes are encountered could be flagged as warnings, for human inspection, without relying on automatic processing.

Optionally, the system could issue a warning whenever the "single quote mode" flag is automatically cleared because the distance from the opening quote(s) was judged to be excessive, or because the end of the text was reached. Also, a warning could be issued if an opening single quote is encountered within a context which already is in "single quote mode". If a quote-depth-counter is used instead of a simple flag, a warning could be issued if, at the end of a document, or after a certain distance from the last opening quote, the numbers of opening and closing quotes do not match.

Interactive Mode Preferred IME Loops for Italian

The action wherein the system, based on a sequence of input events, produces different text outputs, one replacing the other, is herein referred to as "IME Loop" (IME=Input Method Editor). The contents and arrangement of the possible outputs, through which the system loops, can change depending on the application (e.g., writing of Italian or another language, or the input of currency symbols, etc.), user settings and data collected during previous IME loops.

For Italian, the purpose of the default IME loops is to allow the user to cycle through all the possible accent and apostrophe combinations. This includes all possible accents, the apostrophe, and the letter without sign.

The user must also be able to write an accented letter followed by an apostrophe or single quote, which it would not be possible to input if multiple apostrophe signs activated the IME loop. For this reason this combination of characters is also (optionally, from a claims perspective?) part of the IME loop. Different variants are possible here: the IME loop for each vowel could for example include all combinations of accents followed by an apostrophe, or only the correct accent as determined by the rules, followed by the apostrophe. The first case would however double the length of the loop, which would have to include all accents, and all accents followed by the apostrophe. In Cloanto's preferred implementation, balancing these two considerations, the IME loop contains only the second case, because it would be most unlikely that the user writes a word on which the system would place an incorrect accent, and that the same word also be followed by a single quote or apostrophe. Even such an unusual input would however remain possible (see the section titled "Automatic Changes and User Recorrections", as well as the following considerations).

As explained before, it is expected that IME loops will have the most practical use in interactive mode, i.e. during keyboard input, rather than in file and clipboard operations. This, however, is open to different implementation decisions.

In general, the IME loop for Italian would be initiated and used with the same keyboard key that also serves as an activator for the automatic placement of the correct sign at the end of Italian words. This could be the apostrophe key, and/or the grave key, and/or any accented letter key. When an apostrophe or grave key is pressed once after a letter, or when an accented vowel key is pressed, the system goes through its rules and outputs the character(s) considered correct, which could be a letter with no sign, a letter followed by an apostrophe, or a vowel with an accent, or a letter followed by a space. This means that the first output is, tentatively, the correct output. The purpose of the IME loop is to allow for a different output in the most intuitive and comfortable way, which in Cloanto's implementation occurs by simply pressing the key (accented vowel, or apostrophe, or acute) again. Program settings and implementation choices could limit both the key(s) that are considered "activator keys" (for example, to use accented letters for manual input, and the apostrophe for automatic input), as well the keys that can activate an IME loop, if any at all.

An additional option could determine the behavior when different activator keys are enabled, and when such different keys are pressed one after the other. For example, the user could enter the following 8 keys:

P-e-r-c-h-è-é-'

Should the above be considered an IME loop, equivalent with:

P-e-r-c-h-e-'-'-' and

P-e-r-c-h-é-é-é

?

In Cloanto's default implementation for the input of Italian text, an IME loop is only initiated when the same key is pressed more than once. This results in a more rigid, but also more simple and predictable system for the user, leaving out the different sequences for the manual handling of exceptions. Different systems may opt for different behaviors, however. Also, if the above first example is not to initiate an IME loop, should each of the last three characters be considered an activator character, causing the system to apply its usual rules to each character? Again, in Cloanto's implementation the answer is yes. In particular, if the activator character is an apostrophe, the previous context letter is always considered as if it were written without any accents, i.e. the apostrophe, when pressed for the first time, always causes the correct sign (accent or apostrophe or space character or no sign) to be placed by the system. This also applies to the case in which the user moves the cursor immediately after an existing word in a document, rather than writing the word (or part of it), and then presses the apostrophe key (or the acute key—whatever is enabled). This means that if the user moves the cursor immediately after a word that already has the correct accent on the last letter, and presses the apostrophe key, then that input has, to the user, no effect, other than confirming that the existing text is already correct. The following, repeated input of the same apostrophe key would, however, initiate an IME loop. A different implementation or program option could allow for the IME loop to work in such a way that when the user writes multiple but different activator characters one after the other, these all contribute to the activation of the same IME loop.

Another implementation or program option could affect the system behavior in such a way that if the apostrophe or acute character (or any other character considered similar) is pressed after an accented letter, then that letter is not considered without accent, as in Cloanto's first implementation, but rather, an IME loop is immediately initiated, causing the apostrophe to change the accent to the next step in the IME loop, rather than starting from the rule placing the correct sign.

In Cloanto's implementation, the rule for the user is always a very predictable "The first press of an activator key always results in the correct sign". What next, however? Should the second press, which initiates the IME loop, produce a character that is always the same, or should it rather consider, for example, a context where a single closing quote is expected, and place the accent followed by the apostrophe in the immediately next position of the loop? Also, if the user repeatedly, or even just once, used the IME loop functionality to change a sign after a certain word, should the system "remember" this, and automatically add an appropriate entry to its rules, or at least display a message (instantly, or when the user asks to view a list of words that were manually changed) proposing to do so, so that when the user again writes the same word, the chosen sign is produced as a first result? Also, should the order in which different accented characters appear in the IME loop always be the same for each letter, or should the flags that indicate the possible accents or apostrophe combinations for that word be considered, to place the known possibilities for that word first in the list? All of these variants, should, where possible, considered for different claim variants.

In Cloanto's first implementation, the IME loop begins after an activator character is pressed for the second time in a row. The first time, the system considers its rules to place the correct sign. The second and following times, other characters are produced, and when all the steps of the cycle have been exhausted, the loop begins again as if the key was pressed for the first time. When the key is pressed for the second time, a tooltip (small information window) appears over the cursor position, with a message saying something like "Press again for: . . . ", and indicating the order in which the following characters would appear, with the next IME step due appearing first. For example, after the user writes "perché" (using the apostrophe after the "e" to produce the last accented letter), and presses the apostrophe for a second time, the word is be changed to "perchè", and the tooltip would say "Press again for: ê é' e' é è". If the user had chosen to display the tooltips always, and not only in cases such as when the IME loop was actually used as a result of repeated pressing of the activator key, then the tooltip would have been displayed immediately (at the first press of the apostrophe key after "perche", which resulted in "perché"): "Press again for: è ê é' e' é".

Very different possibilities exist for the exact implementation of the IME sequence. Cloanto's choice was in favor of stable predictability, with consideration for a sequence that, when applied to vowels, would result, in this order, in the vowel with grave accent, acute accent, circumflex accent, the initial "correct" accent followed by an apostrophe (intended as a possible closing quote), and the vowel without accent followed by an apostrophe. For words which are known to exist with a final apostrophe (APOSTROPHE flag in the rules), after the grave, acute and circumflex steps, the IME loop additionally includes the vowel followed by two apostrophe characters (one as part of the word, and one as a possible closing quote). For consonants after which the system has automatically removed the apostrophe (e.g., after "qual"), the loop consists of only two steps, i.e. the letter followed by an apostrophe, and the letter followed by a space character. The sequences described here of course always begin with the "correct" sign, which is placed automatically by the system when the user presses the activator character for the first time. After the other options are output as part of the loop, the loop continues again with the "correct" output, etc. When the first output caused the removal of an apostrophe, then the letter followed by the apostrophe appears in following position in the IME loop.

Examples of IME loops (first output is rule-based, i.e. "correct", and in this example is activated with a first press of the apostrophe key; last output is identical with first, and indicates where the loop begins again):
perche+'=perché→perchè→perchê→perché'→perche'→ [repeat from "perché"]
e+'=è→é→ê→è'→e'→[repeat from "è"]
po+'=po'→pò→pó→pô→po"→[repeat from "po'"]
omicidi+'=omicidî→omicidì→omicidí→omicidî'→omicidi'→[repeat from "omicidî"]
qual+'=qual+SPACE→qual'→[repeat from "qual+SPACE"]
qui+'=qui[apostrophe removed]→qui'→qui→quí→quî→[repeat from "qui"]
Of course, for upper case letters the output would be identical, but in upper case.

If the activator key was an accented letter, instead of the apostrophe, the output would be slightly different, because the steps of the IME loop would not include entries with an apostrophe, because only the input of the apostrophe itself expresses a user intention that might mean apostrophe/closing quote. If the initial automatic change of the system had however transformed the accented letter to a letter followed by an apostrophe, or to the letter without any sign at all, then of course that initial "correct" output would be repeated at the end/new beginning of the IME loop. For example:
perch+è=perché→perchè→perchê→[repeat from "perché"]
è=è→é→ê→[repeat from "è"]
p+ò=po'→pò→pó→pô→[repeat from "po'"]
omicid+ì=omicidî→omicidì→omicidí→[repeat from "omicidî"]
qu+ì=qui[accent removed]→qui→quí→quî→[repeat from "qui"]

As mentioned before, different implementations could use different sequences, for example allowing for all the possible combinations of accents followed by the apostrophe, rather than only the "correct" accent. Or, a system could be designed to only include a subset of Cloanto's implementation, considering that in Italian the circumflex accent is generally used only on the letter I, and the acute accent is generally only used with E and O. However, the implementation described here allows for the input of foreign (non-Italian) words, which was considered to be of advantage, and also results in loops that are identical (apart from the initial output which is context-based), and therefore more predictable, which for the user means more intuitive, regardless of the letter.

Another possible implementation could consider the ACUTE, GRAVE, CIRCUMFLEX and APOSTROPHE flags associated to the rules entry that produced a match for the current word. Depending on the flag(s), the combinations that had no matching flag could be excluded from the IME loop, or appear at the end.

Another possible implementation could take into consideration whether the current word was written in a context where a closing single or double-single quote was expected, and add these options to the loop, optionally to the beginning of the loop, if the activator character was the apostrophe.

One variant which is being considered even in a future Cloanto implementation is identical to the current implementation, except that, if the activator character is the apostrophe, and the rules for the current word confirm that the word is certainly written with a certain accent or apostrophe (with no ambiguity, or possibility for the word to be written without sign), and the context is such that a single closing quote is expected, then the first press of the apostrophe produces the correct sign after the word, and the second press adds the closing quote. Similarly, in a context where double-single quotes were used instead of single quotes, a third press would add the second closing quote. Afterwards, the IME loop would continue with the other signs.

Another possible implementation would "learn" from previous user choices, and propose an IME loop where the most frequent previous choices appear first. The data could be associated to individual words, or grouped by letter (A, E, I, O, U, consonants).

Another possible implementation would consider the final selection resulting from the use of the IME loop, and add an appropriate entry in the rules, so that the following time the word was written, with the same activator character, or optionally even with another activator character, the first output (without even waiting for the IME loop) would be the one previously chosen through the IME loop. Different variants and/or program settings would make it possible to make the record temporary or permanent, and automatic or based on user action. An additional variant could allow for the new rule to be automatically recorded for a word only after the user wrote a word in a certain way (overriding the initial default output of the system) for a certain number of times, and, again optionally, without ever accepting the default output for that word.

In another possible implementation, a POSTAPOSTROPHE condition could retroactively override a previous automatic conversion of an apostrophe to an accent, or the removal of an apostrophe, even as part of an IME loop (e.g., the user trying to write "José's car is red"). This is because a POSTAPOSTROPHE condition usually indicates a non-Italian context, in which an Italian word or suffix rule was applied by mistake, or in which an IME loop was initiated by mistake.

The above optional possibility could also be extended to activate a recorrection not only after a POSTAPOSTROPHE string, but also, more in general, whenever the activator character is followed by a letter, placing the previous output in the middle of a word, rather than at the end of it. This would be of disadvantage for the writing of French and other languages where accents appear inside words (not just at the end of words), but it could possibly be useful for languages where this is not the case, but where instead it is of advantage to give priority to correct and unmodified input of the apostrophe sign.

Italian: The Next Step

During the development of this project, dozens of gigabytes of text data in Italian and other languages were analyzed. This included not only proofread texts (e.g., newspapers), but also internet newsgroup messages, school projects, texts written on keyboards that did not match the text language, and texts written with severe keyboard, text size and other input constraints, such as input by physically handicapped users, and GSM SMS (digital cell phone messaging format, normally written with a telephone keypad, and limited to 160 characters per message) messages. Also, software was written and constantly improved to test and refine the algorithms described here.

One of the findings of this experience is that after using such a system for one minute, users just love it, and would never again type without it. Writing with this new system does not require any training at all, other than to know that:

The apostrophe key can be used for "everything" (from a claims-perspective, this should perhaps be both enabled and disabled, like the following points): Accent keys can still be used, and the program can be set to always leave these characters unmodified or change them as necessary (as it does for the apostrophe)

Pressing a Character More than Once Produces Different Results ("IME Loop")

A slightly surprising aspect was however also noticed: Users of this system on standard computer keyboards tended to more frequently skip (by mistake) the space character after the apostrophe following a vowel, as if the apostrophe itself had become a spacing character, which indeed it normally is, but only after consonants. This may in part be rooted in the habit of pressing "something spacing" after a word, which the apostrophe (being "non letter") in some way satisfies, but the "old-fashioned" accented keys did not.

The study of the way Italian SMS messages were written (without this system, and using telephone keypads) resulted in the observation that space characters were sometimes skipped on purpose, to save time and space, after the apostrophe character, in a vowel-apostrophe context after which the space would normally be required.

The above inspired an additional step in the system described so far, at which point one might consider how dramatic the impact of this complete system could be, as it would at last close the gap between the spoken word and roman type, which began diverging in the fifteenth century, when apostrophe and accent characters were introduced in print, leading to the confusing and still evolving situation described in the introduction. Technology can, with this system, contribute to eliminate the differences between speaking and writing Italian, which would fit well into the cultural context of modern Italy, where the differences between written and oral language have almost disappeared (half a millennium ago, in part as an effect of the introduction of print, they were almost different languages, for most of Italy), and the handling of accent and apostrophe characters in writing is now the major issue requiring the knowledge of rules that are not used for speaking. With the introduction of this system, a writer would only have to know that there is "something" at the end of the word, and actuate that thought using just one key (the apostrophe key, but for the purposes of the claims we shall also consider the optional and/or alternate use of accented keys and/or another special key), and not having to worry about anything else, be it a matter of diacritical sign (should it be an apostrophe, a grave accent, an acute accent, or nothing?) or spacing characters (space after vowel-apostrophe and vowel-apostrophe, no space after consonant-apostrophe, but space if sign was placed by mistake). In practice, this additional step consists of letting the system also automatically add a space as part of the input method. The apostrophe key becomes not only a universal "put the right sign, and forgive me if I was wrong" key, but it also eliminates both the physical and mental step of having to place the additional spacing character, if any. In the dynamics of machine-assisted Italian writing, the apostrophe key also becomes a spacing key, which is a revolutionary concept, but which also feels very natural in practice.

It is not easy to objectively measure the negative effects of the additional accented characters which are present on traditional Italian keyboards, with respect to the additional possibilities for typing errors they introduce, and the space they take away from other signs, which were originally not present on Italian computer keyboards (e.g., the now increasingly used "@" sign and the euro sign). It could however more easily be criticized that a system where the apostrophe key has to be used after a vowel, meaning a total of two key presses, instead of pressing a single accented vowel key (which however in itself often requires the pressing of at least two keys, such as is the case for "é" on an Italian keyboard), adds not only simplicity and comfort, but also some overhead. The addition of letting the system add spacing as appropriate brings the result of the equation back to a single keypress, even when the new method is used. Also, this particular procedure can be applied for the sole purpose of automatically inserting the space, but without the part that applies logic to place the correct accent or apostrophe. In theory this system would lead to a reduction of key presses compared to traditional input, however it would have to be seen if there is practical demand for a system which only slightly reduces the number of key presses, and produces no other result.

Example—Traditional input: L'alba è bella (14 key presses, requires appropriate keyboard and writing knowledge)

Example—Intermediate system: L'alba e' bella (15 key presses, easy input)

Example—Extended system: L'alba e'bella (14 key presses, easy input)

Example—Possible option/variant to 3.: L'alba ébella (13 key presses, easy input using both apostrophe and any accented key, which is automatically corrected if necessary)

Example—Possible variant of 1.: L'alba èbella (13 key presses, requires appropriate keyboard and writing knowledge)

In all cases the output would be L'alba è bella

The "extended system" would of course also accept the input of a space key after the apostrophe. If such a space key were pressed, or if the vowel-apostrophe combination were followed by a punctuation character, no space would be inserted. The automatic space insertion would occur, or be confirmed, only if the apostrophe were followed by a letter, number or graphical sign that, if it occurred alone as part of a sentence, would require a space character before it.

For certain characters which normally occur in pairs, such as parentheses, brackets, single quotes, double quotes and other characters, no space character is normally placed before the closing item. When these characters are graphically different, such as is the case for the "(" and ")" parentheses, it is easy for the automatic system to know whether they require a space before them or not, in the event that they appear after an apostrophe input that is processed in such a way as to possibly require the automatic insertion of a space character. There are however characters which can also be written as graphically identical signs, but based on the context they are interpreted either as opening or as closing items. These characters include the double quote and the simple quote character (which in general happens to be the same character as the apostrophe). Modern word processing programs, such as Microsoft Word, already include automatic and well-known techniques to recognize, based on the context, whether a quote should be considered an opening or closing quote, and if a certain program option is selected, to automatically replace the generic character with the more specific opening or closing character. Some of the techniques employed simply verify by which character the quote character was preceded, for example considering the quote as an opening quote if it was preceded by a space or if it appears at the beginning of line, or after certain characters such as an opening parenthesis, and instead a closing quote if it appears after a letter, number or punctuation sign. Other systems additionally analyze the preceding context, looking if there are opening quotes, and if not insert an opening quote, or else a closing quote. Other systems employ a combination of the two techniques, resorting to context analysis only when the immediately surrounding characters are ambiguous. In an application such as the one described here, analysis of the preceding context or tracking of the count of opening and closing quotes, as was already described in this document for single quotes, would be necessary. This requirement is important in a condition which can easily be demonstrated with an example: the user writes è"p . . .

In the above case, the system would add a space after the accented letter only if the quote character is an opening quote. However, if the type of the quote character, i.e. whether it is an opening or closing quote, is itself determined by the presence of a space or a letter before it, then no result can be achieved, and the context remains ambiguous. It therefore either becomes necessary to keep track of opening and closing double quotes, as the system already does for single quotes, or, in such a case the automatic insertion of the space character could be deferred until the user enters an additional character after the quote character. In this way, the type of quote would be determined not by the characters before it, but by the text following it. A closing double quote is usually never immediately followed by a letter or number, but rather it is followed by a spacing or punctuation sign. By applying this simple detection rule, or an equivalent one as already used in various text processing applications, the type of double quote can be determined, and, if the quote is identified as an opening double quote, a space would retroactively be inserted between the accented character (or character with apostrophe) before and the opening double quote.

The specific output of different combinations of an accented vowel followed by a closing single quote, or of a vowel followed by an apostrophe followed by an identical sign which however is a closing quote, or of an unaccented vowel followed by a closing quote, which are rare, but exist in practice, are all possible with the system described here by repeatedly pressing the apostrophe key until the desired combination is output (IME loop, which includes not only accent variants, but also accent/apostrophe combinations).

In French, as well as according to some editorial guidelines, the set of characters that have to be preceded by a space includes punctuation signs which are composed of more than one graphical mark, such as "?", "!", ";" and ":". In Italian these punctuation signs normally have no space before them.

In the preferred implementation of this system, as published by Cloanto, the space character is not automatically inserted immediately after the apostrophe is processed (which would possibly require a recorrection based on the following input), but only after the character after the apostrophe is input by the user.

In the rare event of this system producing incorrect output, which would result either in a missing space character, or in an undesired space character, it would be very easy and intuitive, for the writer to go back one character, using the backspace or cursor left key, for example, and respectively either add a space, or continue writing (as mentioned elsewhere, this system includes the option not to recorrect, or to alternately recorrect, after the user overrides an automatic correction).

Sample input: la liberta'(e'perche')
Resulting output: la libertà (è perché)
(Spaces automatically added before words and other non-punctuation signs)
Sample input: la liberta'; e'"perche"
Resulting output: la libertà; è "perché"
(No space automatically added between apostrophe and punctuation or closing quote, but added before opening quote)

As already mentioned, and implemented in other parts of this system, there are special cases in which even in an Italian context the apostrophe sign after a vowel may be immediately followed not by a space, but by a letter. This is the case, for example, of English possessives, and other patterns (e.g., "I'd try") which, in an Italian context, are usually related to either English or German, and which can be solved with appropriate POSTAPOSTROPHE entries. This means that the additional step described above, like other parts of the system, will have to optionally remove any space characters it may have automatically added, if they are followed by a POSTAPOSTROPHE string.

Sample Implementation: Processing of German Text Input

German uses the special characters "ä", "ö", "ü", "ß" in lower case, and "Ä", "Ö", "Ü" in upper case ("ß" becomes "SS" in upper case). This is a total of 7 special characters, compared to basic Italian's 12 characters. The sign on top of the vowels is called "umlaut". Where these characters are not available on the keyboard, character set or output system, the traditional replacements are "ae", "oe", "ue" and "ss", respectively. In rare cases, such as for internet web and email addresses, it has become accepted use to also use "a", "o", "u" instead of "ä", "ö", "ü" (both lower and upper case).

The special characters used in German are associated to needs which, in the case of text input, are in part similar to Italian. Unlike Italian, however, these characters appear more frequently, also appear in the middle of words, and are more difficult to be algorithmically determined. Nevertheless, even if this makes automatic processing more difficult, compared to Italian, the need remains to input these characters when they are not present on the keyboard.

Cloanto's Accenti/AlphaShift products incorporate different optional ways to enter the special characters for German. The preferred method is a keyboard hook function which intercepts the combinations of Alt+a, Alt+o, Alt+u, Alt+A, Alt+O, Alt+U, Alt+s and Alt+S, and changes the output to ä, ö, ü, Ä, Ö, Ü, ß, SS. The qualifier key is set to Alt by default, but could be changed.

Alternatively, input of German characters is possible through IME loops. E after A, O or U results in the output to be changed to Ä, Ö, Ü. When E is pressed again, the less frequent AE, OE, UE pairs are produced. When E is pressed again, the very rare ÄE, ÖE, ÜE pairs (as in "Europäer", "Böe") are generated. If E is pressed again, the loop begins again from Ä, Ö, Ü. This applies both to upper and to lower case. If the case of E is different than that of the first letter, the case of the first letter is the one that is applied to the output, which makes it easier to write initials with umlauts. (Options for different behavior are possible.)

In lower case only, an IME loop that produces ß and other character combinations is activated by repeated presses of the "s" key, as follows: s, ss, ß, ßs, sss. When the "s" key is pressed a sixth time, the loop starts again from the simple "s", and so on. The order of the steps in this loop is based on frequency. Especially after the writing reform ("Rechtschreibreform") approved in 1996, "ss" is more frequent than "ß". Both "ßs" (as in "Großschreibung") and "sss" (as in "Flusssand") are rare, but possible.

The default initial output of the system could optionally be made dynamic, based on rules, as is already done for Italian. For example, Hubert Kaeslin, in "Behandlung der Umlaute bei der Verarbeitung deutscher Texte unter UNIX", published by R. Oldenbourg Verlag, Zurich, in Informationstechnik—IT, vol. 30 (1988), no. 1, p. 11-16, describes an algorithm to automatically convert AE, OE and UE pairs to the respective vowel with umlaut, as appropriate.

Sample Implementation Processing of Spanish Text Input

Spanish uses the special characters Á, É, Í, Ó, Ú, Ü, Ñ, both in lower and in upper case, appearing anywhere in the word, as well as the special punctuation signs "¿" and "¡". The apostrophe character is only used for single quotes and non-Spanish patterns such as POSTAPOSTROPHE. This means that a system very similar to Italian could be implemented, where the rules for each vowel consist of simple fallback rules with an ACUTE flag, so that after the apostrophe is pressed following a vowel, the result would be the vowel with an acute accent. For consistency, the apostrophe could also be used to place the tilde on top of the N. The IME loop for the vowels could toggle between all possible signs, as for Italian, or only between the acute accent, the umlaut (optionally only for the letter U) and the vowel followed by an apostrophe. For the N, the IME loop would toggle between the N with tilde and the N followed by an apostrophe. The special signs "¿" and "¡" could be generated via an IME loop that produces the special character when "?" or "!", respectively, are pressed an even number of times.

The above implementation would greatly simplify the writing of Spanish using a non-Spanish keyboard, where currently different combinations of Ctrl, Alt, Shift, Alt+digits and/or other difficult to enter and to remember keyboard sequences are required, depending on the operating system and application. An existing system for the input of Spanish acute accents on top of vowels requires that a special key be pressed before the vowel. This is effective, but somehow innatural, because when people write with a pen, they place the sign after writing the vowel, and not before. Like for Italian, the system described here could make the input of Spanish very intuitive even using a keyboard without the Spanish characters.

Sample Implementation: Processing of International Text Input

In theory, IME loops could be used to generate all variants of a certain character when that character is input a certain number of times (e.g., pressing a certain key two, three times or more to initiate the output of special characters, rather than the same letter repeated two, three or more times). In practice, as the description for German in part illustrates, such a system would be potentially complex and confusing, when different characters based on the same root letter (or "activator key") were to appear next to each other. This is, fortunately, not the case for Italian, and it may be rare even in other languages, so the option of using such IME loops remains open.

An alternative would be to initiate an IME loop only when a certain character is pressed in combination with a qualifier key, such as Alt. For example, repeated presses of Alt+A could produce all the variants of A with various diacritical signs.

Cloanto's Accenti/AlphaShift implementation uses a simpler approach, combining the already-described loops for Italian with a combination of Alt+letter filters which for example produce "ñ" when Alt+n is pressed, "β" when Alt+s is pressed, "ç" when Alt+c is pressed, etc., and optionally inserting the vowel+umlaut step in the IME loops for Italian.

For languages such as Greek, where certain letters may have different shapes depending on the position in the word (e.g., sigma at the end of word, or beta at the beginning of a word), the system would place different characters based on the context. At the beginning and in the middle of words this would be done immediately, whereas conditions requiring different handling at the end of a word would be processed retroactively, as soon as a non-word character is entered. Each time characters were removed or added from or to the beginning or and of a word, the procedure would dynamically apply the required changes, to keep the initial beta or the ending sigma correct.

Sample Implementation: Input of Currency Symbols

The "Examples" section in the "Basics" chapter illustrates some possible implementations of this system, and in particular IME loops, applied to the writing of currency symbols.

Cloanto's Accenti/AlphaShift software includes an option to place the Euro sign in first or second position (based on user choice) in the IME loop associated to keys such as $ or £. For example, pressing the dollar key once would produce the dollar sign, and twice it could produce an Euro sign, or vice-versa. More complex loops, generating a wider variety of currency symbols, can be associated either to an existing currency key, or to an otherwise unused key, such as the backslash ("\").

As considered for the input of Italian, the order in which the currency signs appear in the IME loop could be changed dynamically. It could be possible to automatically output the most frequently-used currency symbol when a certain key is pressed the first time, and then, in order of frequency of use, produce IME steps when the key is pressed again. Or, it could be possible to maintain the first character output constant, for example, to be identical with the character normally associated to the keyboard key, and only affect the output of the following characters, i.e. when that key is pressed more than once.

The dynamics by which the order of the IME steps changes could be controlled by parameters indicating, for example, by how much (percentage, or absolute value) a certain key must have become more frequent than another one before it takes its position in the loop, and/or whether a change in order requires a certain number of consecutive "wins" by a character before it is considered for a higher position in the IME loop.

Additional Options and Variations

Considering that the system knows the relationship between 7-bit input characters and their accented forms, and can convert between the two by applying different techniques and considerations, a possible implementation of the system could be such that the system is directly interfaced with contexts where the user enters an internet URL (Uniform Resource Locator, commonly referred to as "internet address"), and, knowing which characters are acceptable in the URL string, it could convert "illegal" signs to legal signs, applying different variations, if more than one acceptable variation exists. For example, internet world wide web addresses can be recognized because they begin with prefixes like "http://" or "https://". Modern browsers make it possible for the user not to need to explicitly enter this information, and automatically try these protocols when an address begins with "www.", or ends with ".com", for example. In the domain and host names which make up such web addresses, it is currently not allowed to include any character other than letters from A to Z (without accents), digits and the minus sign (hyphen). If the user, remembering a company name such as "Müller", entered a web address of "www.müller-.com", the browser would only (this has been verified with latest versions of Microsoft and Netscape web browsers) try to connect to the server with the name exactly as typed, which would fail, because such a domain registration is not even possible. A more "intelligent" system, as described here, may or may not make a first attempt to connect to www.müller.de, but then, if that failed, it would in turn attempt a connection to www.mueller.de, or www.muller.de, or both, in this preferred order until a connection succeeds. If the domain or host names contained more than one special character, they would, in a similar fashion, all be converted to characters that are acceptable for the type of URL being entered (first attempting expansion, then, optionally, stripping of accents, and then, optionally, combinations thereof). Similarly, for the special signs of Italian, the accents would be removed, without replacing them with apostrophe signs, and also removing any existing apostrophe signs that may have been entered. The same would occur for the special signs of French and Spanish, which would leave plain letters A to Z. Any syntax that at the time of coding of the system would have been known to be invalid could still be attempted, either as a first try, or as a last attempt, with consideration to the fact that it is likely that special characters will in the future become acceptable even in domain and host names.

As for the activator keys for Italian (and other languages comparable, for this purpose), these could optionally be, instead of, or in addition to, the already mentioned accented vowels, and the apostrophe (and similar) key, the repeated press of a vowel key (vowels almost never appear more than once in a row, in Italian), or the action of holding a key pressed for longer than a certain predefined amount of time. For example, entering "perchee", or entering "perche" and holding down the last key a little bit longer than usual, would automatically result in "perché". Pressing "e" again, or holding it down even longer, could initiate an IME loop, proposing further possible signs. A similar technique could be applied to special signs such as opening and closing double quotes (and other characters which for example Microsoft's Autocorrect technology can replace during writing, but often so in quite annoying ways): it could be possible, for example, to simply associate an IME loop to the double-quote character, with the first press generating the "plain old double quote", and repeated presses producing either opening and closing double quotes in a predictable constant order, or with the entire order based on frequency and context considerations. Or, the IME loop functionality could be implemented in such a way that the first input of the double-quote character is tentatively automatically changed to the correct opening or closing double quote, but then repeated presses would restore the original manual input and/or loop through the other possible related characters.

As mentioned in the last paragraph, we would like to consider the option of simply holding a key pressed as applicable as a variant to all the cases where activator characters as well as the repeated input of a certain character have been mentioned in this documentation for the purpose of activating a certain event, such as a correction, a recorrection, or the initiation or next step of an IME loop. Such an action of "holding down" a key could optionally have a special meaning for some characters and contexts, depending on the implementation, and be considered as a more traditional "autorepeat" for other keys and/or contexts.

As for the meanings that can be associated to certain input patterns, including holding a key down, repeated press of the same key, with or without consideration to context, this system can consider and apply: simple activator character (e.g. to place an Italian sign), overriding a previous automatic correction, initiation or continuation of an IME loop, and request to display some type of information, e.g. linguistical help. These may be implemented in any combination.

The system shall also optionally include a number of options to temporarily disable all or part of its actions. This may be done by assigning a certain key or sequence of keys to the temporary turning off of the system, which could be limited to the next character, or to all characters until the same certain key or sequence of keys, or another key or sequence of keys is input meaning that the system shall continue operation. Certain keys which on most keyboards have a status indicator light, such as Scroll Lock, can also be used, in which case the light could become an useful indicator of system status. Another option to disable the system and allow for unmodified input is to consider certain qualifier keys, which, when held down during input of other text, cause the system not to take any action. Another additional option to allow for unmodified input would be to not take any action if the user explicitly resorted to an Alt+(0+)number combination, or another keyboard sequence which by default is used on the system to input certain characters even if they are not present on the keyboard.

We would also like to stress again how the actions that cause certain events to occur in this system are based on the analysis of context (e.g. consideration to pending single quotes, or in German the repeated press of "e" after "a", etc.), and linguistical and literary factors such as the likelihood that certain text patterns (e.g. double or triple vowel, or quote, or currency symbol) appear as part of the traditional text flow or not. With the present system, it is possible to use certain characters both in a "normal" and in a "special" way, whereas other systems only allow for some or all keys to be used always in the same "special" way. This is opposite to other systems, such as telephone keypads, and keyboards employing special keys for the generation of special characters, which are unable to make such considerations, and therefore are unable to properly recognize and use characters that may also appear in the normal input stream, but which in some cases, as described in this system, are intended to have a special meaning. In particular, the elegance of the default implementation applied to Italian consists in the fact that the same set of activator characters serves the dual purpose of allowing for the input of special characters, and correcting certain common accent and apostrophe errors.

An interesting option to handle unknown words for languages such as Italian where accent rules have a strong focus on the word suffix could be to let the system consider the best accent for an unknown word based on the longest matching suffix of other word (and optionally suffix) entries in the list of rules. As the number of entries in the rules increases, such an approach could become capable of producing better results when applied to unknown words than the fallback rule (and, in some cases, even suffix rules). Furthermore, as an additional option, in case this previous check did not produce any matches, for the purpose of matching the suffix of the unknown word with the suffix of existing entries, it could be possible, with exception to the last vowel, to consider certain sets of letters to be identical, i.e. to count as a match. For examples, all vowels could be considered as a universal vowel matching character, so that "ahime" could match "ohime".

To further deal with unknown words in the best possible way, the system benefits from different options to extend its dictionary of rules. Cloanto's implementation allows for the rules to be updated from the internet, loading a new set of rules published by Cloanto or by others, and through the user interface, where the user may add, edit or remove individual rule entries. Also, optionally, the system can either automatically add to the rules, or modify a rule entry if it exists in a different format, instances where the user changed, either with the IME functionality or by re-writing, or by temporarily switching off the system, the output of the system, generating a word that the system would otherwise have changed. Optionally, this step of applying the change to the set of rules would be semi-automatic, i.e. be initiated, but require user confirmation. This method could also be applied to possibly learn new POSTAPOSTROPHE words (or remove them from the list).

Optionally, the set of rules includes some flags, which in turn can be considered or not based on user interface settings, which determine whether certain ambiguous entries require an explicit choice by the user, rather than the system proposing a certain initial output without further action.

A further operating mode of the system, when applied to file or clipboard data, allows it to try and automatically detect certain character set errors which resulted in the wrong characters appearing in place of accented letters. To do this, the system has a series of lists, each associated to a common, known, transmission or character set problem (e.g. 7-bit national character set used instead of 8-bit one, $8^{th}$ bit stripped, one computer's character set used in the context of a different system, etc.). Entries in these lists can be used as activator characters equivalent to, for example, accented vowels that would normally be used if the correct character set were used. The replacement list can be selected either manually, or automatically, applying all lists to the same text, and then selecting the one list that resulted in the text containing fewer unknown words, based on either a spelling checker dictionary, or the accent rule entries.

In Cloanto's implementation of the system applied during typing, a small symbol on the screen changes color depending on the reliability of the rule that was applied (e.g. ranking word entries higher than suffix entries, and entries with only one apostrophe or accent flag as less ambiguous than entries with multiple such flags), and the completeness of the current text context data (only one character of available text context data would for example cause the color to appear as a yellow or orange warning).

One variation of the rules system could be such that entries for accented and unaccented verbal forms do not need to include all possible variations as a static database, but rather, considering that Italian uses about 110 clearly-defined verb categories, each with its known derived forms, to algorithmically generate only the required verb forms when necessary.

One list of replacement rules. If the word to be replaced has an accent or apostrophe, then it should not be placed in the list of replacement rules, but rather, with the appropriate COMPLEX attribute, in one of the previous lists (five vowel lists, or consonant list).

COMPLEX=string: As part of an implementation or options which apply changes not only at the end of words, but also in the middle of words, the COMPLEX attributes and data can be used to invoke appropriate automatic replacements.

A POSTAPOSTROPHE condition also causes the apostrophe to be ignored for the purpose of opening and closing quote counts.

In theory, if the system were applied to ancient Italian, or to some current Italian dialects (e.g. in the Rome or Florence regions), where almost every word could be transformed to a short form where it is truncated using an apostrophe, then it might be more practical to set the fallback rules for the vowel-lists to APOSTROPHE entries, rather than GRAVE or ACUTE. This would also mean that the list of accented words would have to be complete (exhaustive), because all words "with a sign" that do not match any rule would be output as words with apostrophe, rather than words with an accent.

In ancient Italian, and in some of today's regional dialects, it is easier to define accented words, rather than words with an apostrophe. In modern Italian, instead, words with an apostrophe are more limited, so it is more practical to consider these as exceptions from accent rules. In modern Italian accented words are also easily defined, although their number is greatly higher than that of words ending with an apostrophe. A system giving a high priority on a complete list of accented words could reach a point where, even for modern Italian, it may be of advantage to use the APOSTROPHE flag for fallback entries. Cloanto's implementation, instead, excels in working with resource-efficient rules lists, and is therefore more "humble" in reaching conclusions, and therefore has to consider that words that do not match any rule other than a fallback rule are likely to occur, in which case it is better to place an accent, which is more frequent.

It is conceivable that, in a system like that described above for an ancient Italian/regional dialects scenario, or in a context where a second language which makes intense use of apostrophe characters is frequently used together with Italian, the system may optionally incorporate a feature similar to the recorrection applied after the detection of POSTAPOSTROPHE strings, but generalized to all apostrophe characters which were initially converted to accents, but then followed by more text, rather than non-word characters. Such an optional variant could only be applied if the additional feature described in the section titled "Italian: the next step" is not active, because that other feature is designed to do the opposite, i.e. to automatically insert space characters after words ending with an apostrophe or accent.

The list with the replacement rules is separate from the lists for words ending with a vowel and that for words ending with a consonant for reasons of logical and computational simplicity. In a case in which a word is not terminated with any "activator" characters, and no other special options are enabled to correct, for example, weekdays or words that should have a final accent or apostrophe but have been written without one, then the system only needs to check the list of replacement rules (if these are enabled), rather than also the lists with all the entries which are necessary for the proper placement of accents and apostrophe signs.

Trigrams (combinations of three letters) could be used instead of bigrams to further improve the recognition accuracy, at the expense of some additional memory (about 2000 bytes instead of 100 bytes).

In the default settings of Cloanto's implementation, three major aspects differentiate the default behavior of the system when applied in an interactive context (keyboard input), compared to a non-interactive stream, such as file or clipboard data:

1. Accents inside words are not corrected in non-interactive mode;
2. Repeated activator characters (e.g. apostrophe characters) do not initiate IME loops in non-interactive modes;
3. Spacing characters are not automatically inserted as part of the automatic processing of accent and apostrophe characters (see "Italian: The Next Step") in non-interactive mode.

Flowcharts

These flowcharts describe a sample implementation of the system applied to Italian keyboard text input, similar to what will be published in Cloanto's ACCENTI and ALPHASHIFT products for WINDOWS. As described in the accompanying text, the system is implemented as a hook on the input stream, that monitors all keyboard and mouse activity, and is able to add "fake" keyboard events to the stream (e.g. to backspace and replace an existing character with another one).

File and clipboard data processing in general requires only a subset of the procedures described here (context is always available), optionally with small variations (e.g. no IME loops, no correction of non-final accents, no automatic insertion of spaces after accents).

The default initial condition of the system is with an empty local context buffer, Insert/Overstrike status set to Insert, language set to Italian, and no pending single quotes. Whenever this data is unavailable, these are the default values.

This implementation accepts either the apostrophe key, the acute key, and accented vowels as "activator" characters. The acute character (and, optionally, similar characters that may be found on certain keyboard, such as a grave key being separate from both the acute and the apostrophe) is normalized to the apostrophe character as part of this particular implementation.

Further possible implementation options and details, such as described in the section "Italian: The Next Step", details on the counting and handling of single and double single quotes, cases like spaces added in place of incorrect apostrophes that later need to be removed again because the user enters a punctuation character, are not discussed here, but rather explained in the textual section.

<Junction points> marked in angle brackets are used for the graphical representation of the flowcharts, and indicate where "goto" lines end.

Comments begin with "//".

The event loop starts from [Procedure Main InputLoop].
[Procedure CheckVowelWordSigns]
//This procedure gets an input word CurrentWord, ending with a vowel with or without diacritical sign or apostrophe, and returns accent/apostrophe information about the word. By definition, a word is a string of one or more alphabetic letters with or without diacritical signs, in upper or lower case, allowing for hyphen signs inside the word, as long as each hyphen is both preceded and followed by at least one alphabetic letter, and allowing for one optional apostrophe at the end of the word.
[normalize CurrentWord, converting all letters to lower case letters without diacritical signs, and removing final apostrophe, if present]
//The above step is optional, if we can say that the comparison functions ignore differences in case and diacritical marks
[If CurrentWord ends with letter A, set CurrentList to List-A]
[If CurrentWord ends with letter E, set CurrentList to List-E]
[If CurrentWord ends with letter I, set CurrentList to List-I]
[If CurrentWord ends with letter O, set CurrentList to List-O]
[If CurrentWord ends with letter U, set CurrentList to List-U]
[ListPosition=beginning of CurrentList]
<Junction 1>
[(Rule at ListPosition in CurrentList is a suffix rule and CurrentWord ends with that suffix) OR (Rule at ListPosition in CurrentList is instead a word rule and it matches CurrentWord)?] If No increase ListPosition and goto Junction 1.
//Now we have a positive match. In the worst case it's the FALLBACK rule, which is at the end of the first part of the list.
[Set ReturnRule to Rule at ListPosition in CurrentList]
[If ReturnRule is a suffix rule, then set ReturnAttribute to NOT EXHAUSTIVE, else set ReturnAttribute to EXHAUSTIVE]
[If ReturnRule has APOSTROPHERARE flag and current program settings indicate to ignore such case, remove APOSTROPHE flag from ReturnRule]
[If Rule does not have FALLBACK flag, set ListPosition to position in CurrentList where the rule with FALLBACK flag is located]
[Set ListPosition to next position]
//now we are at the first rule after FALLBACK, which is either the first entry in the second part of the list, or we are beyond at the end of the list
<Junction 2>
[If ListPosition is beyond end of list] Return "ReturnRule, ReturnAttribute"
[(Rule at ListPosition in CurrentList is a suffix rule and CurrentWord ends with that suffix) OR (Rule at ListPosition in CurrentList is instead a word rule and it matches CurrentWord)?] If No increase ListPosition and goto Junction 2.
//Now we have a positive match in the second part of the list
[Set ReturnRule to Rule at ListPosition in CurrentList]
[If ReturnRule has APOSTROPHERARE flag and current program settings indicate to ignore such case, remove APOSTROPHE flag from ReturnRule]
[Set ReturnAttribute to EXHAUSTIVE]
Return "Return Rule, ReturnAttribute"
[Procedure CheckConsonantWordSigns]
//This procedure gets an input word CurrentWord, ending with a consonant with or without apostrophe after it, and returns accent/apostrophe information about the word.
[normalize CurrentWord, converting all letters to lower case letters without diacritical signs, and removing final apostrophe, if present]
//The above step is optional, if we can say that the comparison functions ignore differences in case and diacritical marks
[Set CurrentList to List-Consonants]
[ListPosition=beginning of CurrentList]
<Junction 1>
[If ListPosition is beyond end of list] Return "No entry found"
[(Rule at ListPosition in CurrentList is a suffix rule and CurrentWord ends with that suffix) OR (Rule at ListPosition in CurrentList is instead a word rule and it matches CurrentWord)?] If No increase ListPosition and goto Junction 1.
[Set ReturnRule to Rule at ListPosition in CurrentList]
[If ReturnRule has APOSTROPHERARE flag and current program settings indicate to ignore such case, remove APOSTROPHE flag from ReturnRule]
[If ReturnRule is a suffix rule, then set ReturnAttribute to NOT EXHAUSTIVE, else set ReturnAttribute to EXHAUSTIVE]
Return "Return Rule, ReturnAttribute"
[Procedure CheckPostApostrophe]
[normalize CurrentWord, converting all letters to lower case letters without diacritical signs, and removing final apostrophe, if present]
//The above step is optional, if we can say that the comparison functions ignore differences in case and diacritical marks
[Set CurrentList to List-PostApostrophe]
[ListPosition=beginning of CurrentList]
<Junction 1>
[If ListPosition is beyond end of list] Return "NO"
[Rule at ListPosition in CurrentList matches CurrentWord?] If No increase ListPosition and goto Junction 1.
Return "YES"
[Procedure CheckReplacement]
[normalize CurrentWord, converting all letters to lower case letters without diacritical signs, and removing final apostrophe, if present]
//The above step is optional, if we can say that the comparison functions ignore differences in case and diacritical marks
[Set CurrentList to List-Replacements]
[ListPosition=beginning of CurrentList]

\<Junction 1\>
[If ListPosition is beyond end of list] Return "No entry found"
[Rule at ListPosition in CurrentList matches CurrentWord?]
    If No increase ListPosition and goto Junction 1.
[Set ReturnRule to Rule at ListPosition in CurrentList]
Return "ReturnRule"
//by definition must be of type COMPLEX
[Procedure IsItalian]
[If the current application supports querying about language in use at current text input position, query application and return Yes if language is Italian, and No if not]
//Now we can take different approaches . . .
[Do we have rules-lists with exhaustive entries for all Italian words?] If Yes, check if word appears in vowel/consonants rules lists (return attribute must be EXHAUSTIVE) and is not flagged as NOTITALIAN, and return Yes if if the word is found and is Italian, and No if not
[No rules-lists with exhaustive word entries? Then apply other algorithm, for example looking up all letter pairs in current word in a bigram table having 1 entries for letter pairs that exist in Italian words, an 0 for letter pairs that are not used in Italian, and return No if any pair of two consecutive letters in the word produces a 0, or otherwise return Yes]
Sample bigram table for Italian (real data, but variations are possible to allow for different levels of tolerance, e.g. with more or less consideration towards rare words and patterns, etc.):

| [Procedure GetNewContext] |
| --- |
| ABCDEFGHIJKLMNOPQRSTUVWXYZ |
| A = 01111110100111110111110001 // Row for pairs "aa" to "az" |
| B = 11011000100100100100100000 // Row for pairs "ba" to "bz" |
| C = 10101001100101101100100000 // etc. |
| D = 10011000100000100100100000 |
| E = 11111110100111111111110101 |
| F = 10001100100100100100100000 |
| G = 10001011100111100100100000 |
| H = 10001000100000100000000000 |
| I = 11111110100111111111110001 |
| J = 00000000000000000000000000 |
| K = 00000000000000000000000000 |
| L = 11111110100111111011110001 |
| M = 11001000100010110000100000 |
| N = 10111110100001101011110001 |
| O = 11111110100111110111110001 |
| P = 10001000100100110111100001 |
| Q = 00000000000000000000100000 |
| R = 11111110100111111111110001 |
| S = 11101101001101111111110000 |
| T = 10001000100010100101100000 |
| U = 11111110100111110111000001 |
| V = 10001000100000100100110000 |
| W = 00000000000000000000000000 |
| X = 00000000000000000000000000 |
| Y = 00000000000000000000000000 |
| Z = 10001000100001100001100001 |

//We need to get (at least) the current word, until the cursor position. If we are here, it means that we did not have a chance to create our context buffer yet, or we lost it after vertical cursor movement, mouse action or keyboard, menu or other command that might have affected the text. When requesting or getting context data, the system tries to also get insert/overstrike, language and pending closing single quote information. If no such data is available, default values are used. If however context data was previously available for that input window, then the Insert/Overstrike setting is preserved, and not reset to a default value.
[If the OS and current application support querying of context data as part of an application-specific interface, or for purposes of accessibility for disabled users, or as part of an IME interface, or as part of an error handling interface, or as part of any other interface capable of providing that information, let's get it from there, and return]
[If the hardware, OS or current application (e.g. a word processor) have a way of directly accessing the text buffer memory (RAM), e.g. because the memory region is constant, or pointers to that region are known, let's get the context from there, and return]
[Locate cursor position and apply OCR to get current word context, for example using library provided by http://www.structurise.com, or other similar tecnology, as described in main documentation. If screen is not bitmapped, but character-mode, it is only necessary to isolate text from non-relevant characters. Return if successful.]
Clear local context data and return
//We failed, there is no context data
[Procedure MainInputLoop]
//Main input loop. Shields the text-processing part from a few non-text-stream issues.
\<Junction 1\>
[Wait for keyboard or mouse event]
[Non-character event potentially involving context disruption?] If Yes, GetNewContext and goto junction 1
//Events that involve context disruption include: new window; cursor up/down and other cursor positioning keys (e.g. Home, End, Page Up, Page Down) other than cursor left/right; mouse click events that cause cursor to be repositioned; menu selections and keyboard accelerators to menu selections; command-shortcuts.
[Cursor left or right, or Delete, or Backspace key?] If Yes, update local context buffer contents and insertion position accordingly, then goto Junction 1
[Insert key?] If Yes, update insert/overstrike mode status in context data, then goto Junction 1.
[Does current application support notification of language and insert/overstrike status?] If Yes, just to be on the safe side, read these settings again and update them in the local context data.
[Text character?] If Yes, update local context buffer, then call TextInputLoop. If TextInputLoop applied changes to the output stream, update context buffer again and send backspace or cursor-left and new characters as appropriate.
//Text characters include letters, numbers, space, punctuation, and all other graphical characters that produce an editing action.
Goto Junction 1
[Procedure TextInputLoop]
//Text input loop, gets called whenever a new character appears in the input stream.
[Is the character an activator?] If Yes execute ActivatorCharacter, then Return.
//depending on program options, activator characters can be the apostrophe and similar characters, or an accented letter
[Non-word character?] If Yes execute NonWordCharacter.
Return
[Procedure ActivatorCharacter]
//If we are here, in an Italian implementation it means that the user pressed an accented vowel key, or an apostrophe after a word

[Same position as a previous activator character that caused system action, which was manually changed by user?] If yes, Return.
//We do nothing if we just did something, and the user changed what we did. If however we do nothing, and the user again changes the input, then again we do something, because this time the previous time was not such that system action was initiated. The result is that we do something every second time.
[Same activator character as previous character?] If Yes, execute next step in ImeLoop, then Return.
[Acute character, or other character equivalent to apostrophe?] If Yes, replace it with apostrophe
//note: change in local context data only; later all differences will be cumulatively applied to output stream. This transformation from acute etc. to apostrophe is an example of many optional things that can be done.
[Activator is accented vowel?] If yes, add it to the current word
//Here we are adding to the local context data. The application already received the character, and all we can do (later, if necessary) is to send a fake backspace (and/or cursor left, if overstrike mode) followed by new data (unless backspace alone was sufficient).
[Last character of the current word is a vowel?] If Yes CheckVowelWordSigns else CheckConsonantWordSigns
[No ReturnRule was found?] If so, Return
//This can only happen if the word ended with a consonant, and input was OK (word not in list), because vowel lists must have fallback rules
[ReturnRule has COMPLEX attribute?] If Yes, replace word with COMPLEX word (if the word was different), and Return.//
//This is an example of action that can be turned on or off by the user, or depending on the implementation
//Only three cases possible: vowel with accent, vowel with apostrophe, consonant with apostrophe
[Activator is on or after vowel?] If Yes
{
[Activator is accent?] If yes, ProcessVowelAccent, else ProcessVowelApostrophe
}
Else ProcessConsonantApostrophe
Return
[Procedure NonWordCharacter]
//checks replacement rules, and POSTAPOSTROPHE
[Did we change user input of apostrophe immediately before this word?] If yes
{
[CheckPostApostrophe gives POSTAPOSTROPHE match on current word?]
If yes, restore previously changed apostrophe, and Return
}
CheckReplacement
[ReturnRule has COMPLEX attribute?] If Yes, replace word with COMPLEX word (if the word was different)
Return
[Procedure ProcessVowelApostrophe]
//Handling of Word ending with vowel and followed by apostrophe activator. Note: "Word" in this entire subroutine means word with apostrophe
//This is one of the most complex cases, because the intention may have been to enter a closing single quote (an opening single quote would not have immediately followed a word, but rather it would have preceded it)
[ReturnRule has APOSTROPHE attribute, and none of GRAVE or ACUTE or CIRCUMFLEX attributes?] If Yes
{
NewWord=Word
[ReturnRule also has NOTHING flag?] If Yes, Optionally (based on implementation and/or settings): inform user via tooltip that the case is ambiguous, and could be resolved in more than one way, adding additional ReturnRule information as appropriate
Return
}
//the above is the simplest case: no ambiguity, nothing to correct; we could however issue an optional information message if the rule also had the NOTHING flag. Most practical ambiguities are however taken care of via APOSTROPHERARE, which is already filtered based on implementation/settings.
[ReturnRule has APOSTROPHE attribute, and we are expecting a closing single quote?] If Yes
{
NewWord=Word
Optionally (based on implementation and/or settings): inform user via tooltip that the case is ambiguous, and could be resolved in more than one way, adding additional ReturnRule information as appropriate
Return
}
//the above does not represent a logical guarantee, but just the statistical fact that if the word can be written with an apostrophe, and we are also expecting a closing quote, then it is more likely that the user actually wanted to input an apostrophe, even if the word can also be written with an accent
[ReturnRule has NOTHING attribute, and none of APOSTROPHE, GRAVE or ACUTE or CIRCUMFLEX attributes?] If Yes
{
[are we expecting a closing single quote?] If Yes, NewWord=Word
Else NewWord=Word without apostrophe
Return
}
//If we are here, we either have APOSTROPHE as well as one or more other accent flags, in which case, based on a statistical choice, we decide to give priority to the accent, if only one (which is usually the case), or we have one or more accent flags, in which case we also would change the apostrophe input to an accent output. This all means that we can simply ignore the APOSTROPHE flag from here on, as it does not change anything, because the cases in which we would have output an apostrophe have all already been considered. However, we might add appropriate user info, which also shows how much more complex the flowchart becomes if we have to show user info for all possible cases of ambiguity.
[ReturnRule has more than one of NOTHING or GRAVE or ACUTE or CIRCUMFLEX attributes?] If Yes
{
NewWord=Word with first most likely accent (first item of sequence used for IME loop for last vowel in word, considering only the accent flags we have in Return Rule)
Optionally (based on implementation and/or settings): inform user via tooltip that the case is ambiguous, and could be resolved in more than one way, adding additional ReturnRule information as appropriate
Return
}
//Note: the above is extremely rare //If we are here, it means that the word has one and only one of GRAVE or
ACUTE or CIRCUMFLEX, plus, possibly, APOSTROPHE
NewWord=Word with accent as per single accent flag (GRAVE or ACUTE or CIRCUMFLEX)
[ReturnRule also has APOSTROPHE flag?] Optionally (based on implementation and/or settings): inform user via tooltip that the case is ambiguous, and could be resolved in more than one way, adding additional ReturnRule information as appropriate
Return
//Note: the above cases could have been resolved in fewer, but more complex IF/AND/OR constructs, but they would have been less understandable (as in the previous version of the flowchart)
[Procedure ProcessVowelAccent]
//Handling of Word ending with vowel input as accented vowel activator
//This case is simpler than vowel+apostrophe, because although the accent could be wrong, having to be changed to nothing, or to an apostophe, the case where a closing quote could have been intended does not apply here
[ReturnRule has only one of APOSTROPHE, GRAVE, ACUTE or CIRCUMFLEX?]
{
NewWord=Word with sign as specified by APOSTROPHE, GRAVE, ACUTE or CIRCUMFLEX
[ReturnRule also has NOTHING flag?] If Yes, Optionally (based on implementation and/or settings): inform user via tooltip that the case is ambiguous, and could be resolved in more than one way, adding additional ReturnRule information as appropriate
Return
}
//If we are here, the ReturnRule has NOTHING and/or more than one accent/apostrophe flag
[ReturnRule has more than one of APOSTROPHE, GRAVE, ACUTE or CIRCUMFLEX?]
{
NewWord=Word, if compatible with ReturnRule flags, or otherwise Word with first most likely accent (first item of sequence used for IME loop for last vowel in word, considering only the accent flags we have in ReturnRule)
Optionally (based on implementation and/or settings): inform user via tooltip that the case is ambiguous, and could be resolved in more than one way, adding additional ReturnRule information as appropriate
Return
}
//If we are here, the ReturnRule has NOTHING flag and no accent or apostrophe flag
NewWord=Word without accent
Return
[Procedure ProcessConsonantApostrophe]
//Handling of Word ending with consonant and apostrophe activator
//Here we could be expecting a closing quote, but the number of possibilities for the word itself are only two: apostrophe or no apostrophe (consonants do not have accents)
[ReturnRule has APOSTROPHE attribute?] If Yes
{
NewWord=Word
Return
}
//if we are here, the ReturnRule has a NOTHING flag and no APOSTROPHE

[Are we expecting a closing single quote?] If Yes
{
NewWord=Word
Return
}
//Note: in cases like the above, if we were in a very demanding editorial context, we might want to be sure that the apostrophe found here after a word with NOTHING and no APOSTROPHE flag actually was the closing quote we were looking for, rather than a mistake. In such a demanding context, appropriate information messages could be used.
NewWord=Word without apostrophe, followed by space
Return
//Note: in case that this space is then followed by a punctuation sign, the system may optionally recorrect the automatically inserted space, removing it. Optionally, the system does not even add a space character in the first place.
Rules for Italian Text
//® 1998, 1999 Cloanto Corporation
//Note: accents and apostrophe characters in the list entries are for simplicity only.
//They are expanded to the correct flag (one only, so be explicit if more than one!)
//by the parser when compiling the rules. "*" is used for pattern matching, indicating
//a match with any combination of zero or more characters.
//Comments ("//") are what they are: for humans only. They are ignored by the rules compiler.
//A few "todo" issues are marked with ***. In user messages, quote characters inside quotes
//are preceded by a backslash character
//Comments with "GROUP" label mark groups of rules which are linked (generic suffix rules
//preceded by their exceptions, which if they are suffix rules may in turn be preceded by
//their own exceptions, etc.)
//The "POST-FALLBACK VERBS" sections are partial, and should be completed with an exhaustive
//list of accented verbal forms, if desired. Ideally they list should be created automatically,
//using a database of verb roots and accented composed forms.
//All non-verbal post-fallback sections are complete (tentatively exhaustive for average
//Italian), except for a few suffix rules which it might be safer to extend to a detailed list
//of words, and accented verbal forms, which are almost completely missing
//from the list for now.
//AAAAAAAAAAAAAAAAAAAAAAAAAAAAAAAA
ca' NOTHING APOSTROPHE APOSTROPHERARE// (ca'=troncamento di casa, calle); nota: non ha molto senso mettere APOSTROPHERARE se comunque mai accentata, quindi nessuna contrapposizione con errore frequente
pa' NOTHING APOSTROPHE APOSTROPHERARE// (pa'=form a tronca di papà)
ma' NOTHING APOSTROPHE APOSTROPHERARE// (ma'=form a tronca di mamma, mai)
ta' NOTHING APOSTROPHE APOSTROPHERARE// (ta'=tosc.) Form a tronca di 'tali'
da NOTHING GRAVE APOSTROPHE APOSTROPHERARE
COMPOUNDSTRICKY INFORMATION="da=prep. semplice (\"vengo da casa\"); dà=presente verbo dare; da'=dai (imperativo)"//form a dell'imperativo del verbo dare; form a tronca della prep. art. dai fra NOTHING//(sia preposizione semplice, che troncamento di frate, ogni caso senza apostrofo, che però va in form a tronca di "fra i")
sa NOTHING COMPOUNDSTRICKY
tra NOTHING COMPOUNDSTRICKY
qua NOTHING COMPOUNDSTRICKY
fa NOTHING APOSTROPHE APOSTROPHERARE COMPOUNDSTRICKY INFORMATION="fa=presente verbo fare (\"fa caldo\"), prep. semplice (\"un anno fa\") e nota musicale; fa'=fai (imperativo)"//accettabili anche: dà, [da secondo gramm. Zanichelli, ma non secondo Zingarelli 1998,] dai, dì, fa, fai, sta, stai, va, vai; NB: fa e do sono confondibili con note musicali, ma essendo questo un contesto non confondibile con il verbo, non basta a giustificare accento; inizialmente il tooltip era più lungo: . . . musicale (a differenza di \"dà\", non vi sono ambiguità di contesto) . . .
sta NOTHING APOSTROPHE APOSTROPHERARE COMPOUNDSTRICKY INFORMATION="sta=presente verbo stare (\"sta bene\"); sta'=stai (imperativo)"//sta'=form a dell'imperativo del verbo stare
va NOTHING APOSTROPHE APOSTROPHERARE COMPOUNDSTRICKY INFORMATION="va=presente verbo andare (\"va bene\"); va'=vai (imperativo)"
sofà GRAVE ITALIANIZED FR=sofa//EN=sofa
*à NOTHING GRAVE FALLBACK
maestà GRAVE
podestà GRAVE
onestà GRAVE
potestà GRAVE
amistà GRAVE
costà NOTHING GRAVE
venustà GRAVE
vetustà NOTHING GRAVE
sciacchetrà GRAVE
ultrà NOTHING GRAVE
mistrà GRAVE
babà
abacà
gagà
scià NOTHING GRAVE
pascià
sciuscià
ratafià
già
ragià NOTHING GRAVE//anche acqua ragia
maragià
là NOTHING GRAVE
olà NOTHING GRAVE//anche ola spagnola
colà NOTHING GRAVE//anche cola
baccarà
parà NOTHING GRAVE//anche para
terà//stradario VE: "Rio Terà . . . "
urrà//itaglese FR=hourra, EN=hurrah
hurrà//itaglese
età NOTHING GRAVE//esiste anche "eta[beta]"
//BEGIN GROUP
dieta NOTHING
isoieta NOTHING
*ietà//tranne dieta, isoieta
//END GROUP
metà NOTHING GRAVE//meta
//BEGIN GROUP
aita
baita
barnabita
bibita
cenobita
orbita
forbita
cucurbita
*andita
*endita
troglodita
saudita
*fita
gita
salita
risalita
israelita
stilita
preraffaelita
lolita
cosmopolita
metropolita
pulita
ripulita
camita
calamita NOTHING GRAVE
elettrocalamita
palamita
vietnamita
eremita
*semita//in pratica *amita, *emits, ma non calamità, estremità, ma OK calamita
sodomita
dormita
granita
selenita
yemenita
incognita
belemnita
sannita
maronita
cernita
confraternita
pepita
pipita
caspita
sibarita
ipocrita
archimandrita
ferita
margherita
peperita
piperita
favorita
monofisita
visita
*parassita
matita
sfoltita
smentita
*partita
arrostita
*ttita
gesuita
pituita
vita
malavita
salvavita
levita
moscovita carovita
servita
zita
*ità GRAVE//tranne aita, baita, barnabita, bibita, cenobita, orbita, forbita, cucurbita, *andita, *endita, troglodita, saudita, *fita, gita, salita, risalita, israelita, stilita, preraffaelita, lolita, cosmopolita, metropolita, pulita, ripulita, camita, calamita (sia con the senza), elettrocalamita, palamita, vietnamita, eremita, *semita (in pratica *amita, *emits, ma non calamità, estremità, ma OK calamita), sodomita, dormita, granita, selenita, yemenita, incognita, belemnita, sannita, maronita, cernita, confraternita, pepita, pipita, caspita, sibarita, ipocrita, archimandrita, ferita, margherita, peperita, piperita, favorita, monofisita, visita, *parassita, matita, sfoltita, smentita, *partita, arrostita, *ttita, gesuita, pituita, vita, malavita, salvavita, levita, moscovita, carovita, servita, zita
//END GROUP
*ealtà
beltà
*fedeltà
crudeltà
*iltà
facoltà
difficoltà
bontà
volontà
*libertà
*ubertà
povertà
sicurtà
taffetà
*città
voluttà
//BEGIN POST-FALLBACK VERBS
ristà GRAVE TRICKYCOMPOUND=sta
risà NOTHING GRAVE TRICKYCOMPOUND=sa
rivà NOTHING GRAVE TRICKYCOMPOUND=va
rifà GRAVE TRICKYCOMPOUND=fa
strafà GRAVE TRICKYCOMPOUND=fa
andrà
farà
sarà NOTHING GRAVE
//END POST-FALLBACK VERBS
//EEEEEEEEEEEEEEEEEEEEEEEEEEEEE
//fallback=ACUTE, but some high-frequency ACUTE are on top to speed up things, and as exceptions to SUFFIX rules
è NOTHING GRAVE
cioè
//BEGIN GROUP
lacchè//FR=laquais, ma consideriamo lacchè una italianizzazione di successo, quindi la accettiamo come IT e basta
picchè NOTHING GRAVE ITALIANIZED FR=piqué//NB forma ITALIANIZED, come tutte, è quella GRAVE
*ché NOTHING ACUTE//attenzione a lacchè e picchè
//END GROUP
sé NOTHING ACUTE//anche in PW—messo qui per velocità
né NOTHING ACUTE APOSTROPHE APOSTROPHERARE//
INFORMATION="ne=pronome, avverbio ("ne scrivo"); né=congiunzione ("né io né lui"); ne'=nei"//anche in PW; TOLTO INFORMATION PERCHÉ TROPPO FREQUENTE RISPETTO A DUBBIO—PROBLEMA di ACCENTI (come far visualizzare inf su richiesta? o in modo meno intrusivo?)
be' APOSTROPHE APOSTROPHERARE//OK anche beh; bè=belato pecore, o derisione verso chi si dimostra pauroso
de NOTHING APOSTROPHE APOSTROPHERARE
ve NOTHING APOSTROPHE APOSTROPHERARE//OK anche veh
pe' APOSTROPHE APOSTROPHERARE//(form a tronca della prep. art. pei)
me NOTHING APOSTROPHE APOSTROPHERARE INFORMATION="me=persona (\"a me\"); me'=mio, mia, miei, meglio, mezzo, ecc."//(pop., tosc.)
Forma tronca di 'mio', 'mia', 'miei', 'mie', in posizione proclitica
tre NOTHING COMPOUNDSTRICKY
re NOTHING COMPOUNDSTRICKY//sia maschile di regina, che nota musicale
tè NOTHING GRAVE APOSTROPHE APOSTROPHERARE INFORMATION="te=persona; tè=bevanda (the); te'=tieni"
piè//vecchio italiano=pie' (anche PW)
riè
carcadè
caffè
macinacaffè
the NOTHING
bebè
ahimè
ohimè
canapè ITALIANIZED FR=canapé
coinè ITALIANIZED EL=koinè//koinè più che EL è italiano più usato koinè
diè NOTHING GRAVE//form a meno frequente=die' (come piè/pie')
coccodè
dappiè
ramiè
sakè ITALIANIZED JA=sake
stilè NOTHING GRAVE
stiè
rollè
macramè
musmè//JA=IT
rapè NOTHING GRAVE
tuppè
karatè GRAVE ITALIANIZED JA=karate
pancarrè
relèITALIANIZED FR=relais//EN (poco usato, secondo me)=relay
buffè ITALIANIZED FR=buffet
bidè ITALIANIZED FR=bidet
gilè ITALIANIZED FR=gilet
cabarè ITALIANIZED EN=cabaret//secondo sansoni IT=EN, secondo Garzanti FR non ha parola simile
purè NOTHING ITALIANIZED FR=purée//secondo sansoni EN=FR; esiste anche "pure"
cabriolè ITALIANIZED FR=cabriolet
bignè//FR non ha parola simile
corvè
tamurè//ballo di Tahiti
tzè GRAVE ITALIANIZED FR=tsè
tsèNOTHING ACUTE//in IT si può scrivere "tse" senza accento, o con GRAVE tzè-tzè COMPLEX=tzè-tzè ITALIANIZED FR=tsé-tsé//second choice; secondo Zanichelli si scrive tsè-tsè (o con zeta, o con s senza accenti), che in Accenti prima release non sappiamo gestire perche avremmo troppe varianti in una unica entry, quindi seguiamo solo via francese (tsé-tsé), o italianizzazione senza accenti, o italianizzazione con zeta, ma in nessun caso s+e grave, quindi altra regola (preferita) sta tra accento acuto
tsé-tsé NOTHING ACUTE COMPLEX=tsé-tsé//manca form a tsè-tsè GRAVE ITALIANIZED, che non sapremmo gestire
tsétsé COMPLEX=tsétsé ACUTE
Giosuè CAPITAL GRAVE
Esmè CAPITAL GRAVE
Mosè CAPITAL GRAVE
Salomè CAPITAL GRAVE
Noè CAPITAL GRAVE
Tigrè NOTHING GRAVE//ACUTE è CAPITAL, ma NOTHING non lo è-come gestirlo? In teoria se minuscolo seguito da virgoletta singola, conti come "tigre" senza ombra di dubbio; se tutto maiuscolo=dubbio, se iniziale maiuscola, abbastanza certezza che accento serviva lì
Acè GRAVE CAPITAL TRADEMARK//Acè (German version of Ace detergent)
//BEGIN GENITIVE
he NOTHING APOSTROPHE
she NOTHING APOSTROPHE
we NOTHING APOSTROPHE
Christie NOTHING CAPITAL APOSTROPHE//per scrivere subito giusto "Christie's"
//END GENITIVE
*è NOTHING ACUTE FALLBACK//contrario di PW, ma meglio cosi perché usato in verbi italiani, default in spagnolo, e prevalente in francese; PW also has dynamic suffix rules: *fé (exception: caffè)*ré (exception: Tigrè)*ché (PW prevede la prima sola, ma escluso sia lacchè che picchè)—all not necessary any more
exposé
communiqué
glacé
lamé NOTHING ACUTE
marché NOTHING ACUTE
séparée
soufflé//in FR anche senza, ma non usato in IT
rommé//parola trovata solo in tedesco
yé
yé-yé
testé NOTHING ACUTE//(anche in PW); teste=plur. di testa
scimpanzé//(anche in PW)
mercé NOTHING ACUTE//anche in PW
ché NOTHING ACUTE//(da solo è congiunzione, come perché; per regola suffisso notare eccezioni lacchè e picchè)
affinché
macché
perché
conciossiaché
conciossiacosaché
dacché
giacché
checché
comecché
sicché
cosicché
acciocché
perocché
dopodiché
poiché
anziché
talché
granché
benché
finché
sinché
nonché
senonché
sennonché
alcunché
essendoché
secondoché
dopoché
altroché
pressoché
fintantoché
sintantoché
contuttoché
ancorché
allorché
fuorché
purché
pavé
piqué
habitué
musqué//rat musqué
canneté
plissé
metalassé
rosé NOTHING ACUTE
osé//(errato in PW, the lo trasforma in ose'; verificato francese OK)
autodafé
*café//(FR) cybercafé, etc
pansé
affé
blasé
carré
nontiscordardimé
honoré
saint-honoré
ciré
coupé
frappé
fané
cliché
meublé
flambé
bouclé
bombé NOTHING ACUTE
soufflé
collé NOTHING ACUTE//papier collé
brulé
engagé
attaché
privé
imprimé
décolleté
variété
pâté
consommé
déshabillé
fumé
défilé
négligé
capitonné
démodé
passé NOTHING ACUTE//in FR esiste anche "passe", senza accento
Océ ACUTE CAPITAL TRADEMARK//Océ
Forté ACUTE CAPITAL TRADEMARK//Forté Software Xanté ACUTE CAPITAL TRADEMARK//Xanté Corporation
Asanté ACUTE CAPITAL TRADEMARK//Asanté Technologies, Inc.
Portégé NOTHING ACUTE COMPLEX=Portégé CAPITAL TRADEMARK
//(Toshiba, in USA scritto anche senza accenti, quindi eventualmente sparare entrambi solo quando utente mette qualcosa in fondo)
Nestlé ACUTE CAPITAL TRADEMARK
Henné ACUTE CAPITAL TRADEMARK//esiste anche non-marchio e non-capital
René NOTHING ACUTE CAPITAL//rene (organo)=minuscolo
André ACUTE CAPITAL
José ACUTE CAPITAL//WARNING: make sure rules like this are not excluded by bigrams/language detection***
Josué ACUTE CAPITAL
Chloé ACUTE CAPITAL
viceré ACUTE TRICKYCOMPOUND=re
*ventitré ACUTE TRICKYCOMPOUND=tre
*trentatré ACUTE TRICKYCOMPOUND=tre//regola semplice: *ntatré
*quarantatré ACUTE TRICKYCOMPOUND=tre
*cinquantatré ACUTE TRICKYCOMPOUND=tre
*sessantatré ACUTE TRICKYCOMPOUND=tre
*settantatré ACUTE TRICKYCOMPOUND=tre
*ottantatré ACUTE TRICKYCOMPOUND=tre
*novantatré ACUTE TRICKYCOMPOUND=tre
unduetré ACUTE TRICKYCOMPOUND=tre
unoduetré ACUTE TRICKYCOMPOUND=tre
//BEGIN POST-FALLBACK VERBS
fé//(form a tronca di fede e fece)
sté
credé NOTHING ACUTE//(anche in PW)
temé NOTHING ACUTE//(anche in PW)
poté//(anche in PW)
compié NOTHING ACUTE
//END POST-FALLBACK VERBS
//IIIIIIIIIIIIIIIIIIIIIIIIIIIII
mi' NOTHING APOSTROPHE APOSTROPHERARE INFORMATION="mi=a me (anche nota musicale); mi'=mio, mia, miei, ecc."//(pop., tosc.) Form a tronca di 'mio', 'mia', 'miei', 'mie', in posizione proclitica
di' NOTHING GRAVE APOSTROPHE INFORMATION="di=prep. semplice (\"di più\"); di=giorno; di'=dici (imperativo)"//(form a dell'imperativo del verbo dire; esiste anche di=preposizione semplice e di=giorno)
zi' APOSTROPHE APOSTROPHERARE//(dial., fam.) Form a tronca di 'zio' e 'zia'
chi NOTHING
pi NOTHING
vi NOTHING
ti NOTHING
ci NOTHING
sci NOTHING COMPOUNDSTRICKY
qui NOTHING COMPOUNDSTRICKY
sì NOTHING GRAVE INFORMATION="si=pronome (\"si dice\") e nota musicale; sì=affermazione (\"si, certo\")"// INFORMATION ha valore di rassicurazione the "sì" è giusto; sarebbe bello implementare intelligenza per casi in cui si riesce a riconoscere si affermazione
assassinî NOTHING CIRCUMFLEX
principî NOTHING CIRCUMFLEX
arbitrî NOTHING CIRCUMFLEX//secondo Zingarelli 1998 anche matrimonî, e chissà quant'altro
//BEGIN GROUP
mezzodi
*odî NOTHING CIRCUMFLEX//attenzione a eccezione di suffisso: mezzodi; tanti altri *odi senza nulla
//END GROUP
//BEGIN GROUP
coccidi NOTHING//non vuole circonflesso
gracidi NOTHING//non vuole circonflesso
cecidi NOTHING//non vuole circonflesso
gelicidi NOTHING//non vuole circonflesso
stillicidi NOTHING//non vuole circonflesso
ascidi NOTHING//non vuole circonflesso
*cidî NOTHING CIRCUMFLEX//escluso coccidi, senza niente, o al limite su o, e altre parole indicate sopra, in quanto non confondibilità tra plurale di agente e plurale di azione (omicidi/omicidii)
//END GROUP
//BEGIN GENITIVE
i NOTHING APOSTROPHE//English: I'll 've 'd, etc.
//END GENITIVE
*ì NOTHING GRAVE FALLBACK
lunedì GRAVE WEEKDAY
martedì GRAVE WEEKDAY
mercoledì GRAVE WEEKDAY
giovedì GRAVE WEEKDAY
venerdì GRAVE WEEKDAY
monoscì GRAVE TRICKYCOMPOUND=sci
doposcì GRAVE TRICKYCOMPOUND=sci
idroscì GRAVE TRICKYCOMPOUND=sci
eccidî NOTHING CIRCUMFLEX
deicidî NOTHING CIRCUMFLEX
regicidî NOTHING CIRCUMFLEX
omicidî NOTHING CIRCUMFLEX
tirannicidî NOTHING CIRCUMFLEX
uxoricidî NOTHING CIRCUMFLEX
parricidî NOTHING CIRCUMFLEX
matricidî NOTHING CIRCUMFLEX
fratricidî NOTHING CIRCUMFLEX
infanticidî NOTHING CIRCUMFLEX
suicidî NOTHING CIRCUMFLEX
ecocidî NOTHING CIRCUMFLEX
genocidî NOTHING CIRCUMFLEX
eccì
abbiccì
abiccì
cadì NOTHING GRAVE//esiste anche cadi
addì
oggidì
ognidì//controllo Cloanto, non trovato da altre fonti
buondì
chicchirichì
lì NOTHING GRAVE//anche li
balì NOTHING GRAVE//anche Bali=isola
hallalì
supplì//crocchetta di riso
salmì NOTHING GRAVE//esiste anche salmi
chepì
pipì
tarì NOTHING GRAVE//tare=the egli tare [la bilancia]
colibrì
cambrì
sagrì
asprì NOTHING GRAVE//esiste anche aspri
giurì NOTHING GRAVE//esiste anche giuri
altresì
bensì
così NOTHING GRAVE//esiste anche cosi signorsì
tassì NOTHING GRAVE//esiste anche tassi
aerotassì
muftì//in base a bigrammi sarebbe non-IT
uistitì
costì NOTHING GRAVE//esiste anche costi
luì NOTHING GRAVE//esiste anche lui
//BEGIN POST-FALLBACK VERBS
colpì NOTHING GRAVE
//END POST-FALLBACK VERBS
//OOOOOOOOOOOOOOOOOOOOOOOOOOOOOO
po' NOTHING APOSTROPHE//po'=troncamento di poco/poi-anche in PW, ma anche il fiume Po-maiuscolo; PROBLEMA: vorrei mettere it CAPITAL, ma poi ambiguo se riferito a form a con apostrofo, o senza
do' NOTHING APOSTROPHE APOSTROPHERARE INFORMATION="do=presente verbo dare (\"io do\") e nota musicale; do'=form a tronca di dove"//do' (form a tronca di dove; do=io do; qualcuno scrive anche io dò, ma meno bene); contrapposto a dà/da', ci sarebbe anche do' stai, ma lasciamo sta'; parametro dica se vogliamo accento in verbo dare; inizialmente it tooltip era più lungo: . . . musicale (a differenza di \"dà\", non vi sono ambiguita di contesto) . . . ; caso simile in fa
co' NOTHING APOSTROPHE APOSTROPHERARE//co' (form a tronca della prep. art. coi); cp=verso gallina
fo NOTHING COMPOUNDSTRICKY
to' NOTHING APOSTROPHE APOSTROPHERARE//to=inglese
mo' APOSTROPHE//mo'(troncamento di modo-anche in PW)
no NOTHING COMPOUNDSTRICKY//sbagliato persino in Flessioni Rime Anagrammi (lo mette "nò")
so NOTHING COMPOUNDSTRICKY
vo NOTHING COMPOUNDSTRICKY
sto NOTHING COMPOUNDSTRICKY
bistò GRAVE ITALIANIZED FR=bistrot//senza accento è un colorante
(FR=bistre) INGESTIBILE CON REGOLE SINGOLE***
giudò GRAVE ITALIANIZED JA=judo//Japanese=judo; idem per karate
yo-yò GRAVE ITALIANIZED EN=yo-yo TRADEMARK
//BEGIN GENITIVE
Cloanto NOTHING CAPITAL APOSTROPHE TRADEMARK//per scrivere subito giusto "Cloanto's"
//END GENITIVE
//BEGIN ENGLISH
o NOTHING APOSTROPHE//O'Hara ecc. (o' sole mio ?)
//END ENGLISH
*ò NOTHING GRAVE FALLBACK
menabò
ohibò
rococò
fricandò
landò
rondò
ciò
sopracciò
contuttociò
perciò
risciò
makò
oblò
iglò//igloo
allô NOTHING CIRCUMFLEX//francese, risposta al telefono; "allo"=prep. art.
comò NOTHING GRAVE
trumò//francese=trumeau, trumeaux, mettere bit "foreign/national version exists"
casinò NOTHING GRAVE
signornò NOTHING GRAVE TRICKYCOMPOUND=no
kapò
popò
borderò//GRAVE ITALIANIZED FR=bordereau//ESCLUSO IN QUANTO
borderò è ormai IT accettato
però NOTHING GRAVE
prò NOTHING GRAVE//italiano molto antico, non lo metterei neanche in Accenti
bersò
jò//friulano
//BEGIN POST-FALLBACK VERBS
ristò GRAVE TRICKYCOMPOUND=sto
rifò GRAVE TRICKYCOMPOUND=fo
ridò NOTHING GRAVE TRICKYCOMPOUND=do
risò NOTHING GRAVE TRICKYCOMPOUND=so
rivò NOTHING GRAVE TRICKYCOMPOUND=vo
andò
andrò NOTHING GRAVE
farò NOTHING GRAVE
sarò
può
//END POST-FALLBACK VERBS
//UUUUUUUUUUUUUUUUUUUUUUUUUUUUUU
su NOTHING APOSTROPHE APOSTROPHERARE COMPOUNDSTRICKY INFORMATION="su=sopra (anche esortazione); su'=suo, sua, sui, ecc."//su'=(pop., tosc.) Form a tronca di 'suo', 'sua', 'suoi', 'sue', in posizione proclitica); (tosc., lett.) Form a tronca della prep. art. 'sui'
tu NOTHING APOSTROPHE APOSTROPHERARE INFORMATION="tu=persona; tu'=tuo, tua, tuoi, ecc."//tu'=(pop., tosc.) Form a tronca di 'tuo', 'tua', 'tuoi', 'tue', in posizione proclitica
gru NOTHING COMPOUNDSTRICKY
blu NOTHING COMPOUNDSTRICKY
fu NOTHING COMPOUNDSTRICKY
vodù GRAVE ITALIANIZED EN=voodoo//v. vudù
vudù GRAVE ITALIANIZED EN=voodoo//EN=voodoo, secondo Sansoni anche
IT=vodù; ***opzione per forzare ita/engl?
iglù GRAVE ITALIANIZED EN=igloo//EN=igloo
zulù GRAVE ITALIANIZED EN=zulu//EN=zulu, FR=zoulou; SAREBBE BELLO POTER GESTIRE MULTIPLI ORIGINALI, CON SCELTA UTENTE
menù GRAVE ITALIANIZED FR=menu//menu=originale, menù=adattamento (grammatica Zanichelli, e anche FR, e anche preferirei io, vogliono menu senza accenti, ma in pratica si trova anche con)
sottomenù GRAVE ITALIANIZED FR=sottomenu II "sottomenu" non è proprio Francese, ma . . .
gnu NOTHING II ungulato
II BEGIN GENITIVE
you NOTHING APOSTROPHE
II END GENITIVE
*ù NOTHING GRAVE FALLBACK
*blù GRAVE TRICKYCOMPOUND=blu//(verificato-escluso "blu", indicato prima di FALLBACK)—altrimenti si avrebbe solo rossoblù, gialloblù, barbablù
autogrù GRAVE TRICKYCOMPOUND=gru
insù GRAVE TRICKYCOMPOUND=su
sottinù GRAVE TRICKYCOMPOUND=su
sottoinù GRAVE TRICKYCOMPOUND=su
orsù GRAVE TRICKYCOMPOUND=su
lassù GRAVE TRICKYCOMPOUND=su quissù GRAVE TRICKYCOMPOUND=su
quassù GRAVE TRICKYCOMPOUND=su
colassù GRAVE TRICKYCOMPOUND=su
costassù GRAVE TRICKYCOMPOUND=su
ragù//FR non ha questa parola
tabù Il sarebbe ITALIANIZED, ma diventato italiano ben accettato
*tribù//tribù, capotribù
bambù
cuccù
cucù
indù
caucciù
*giù//giù, acagiù, laggiù, colaggiù, costaggiù, quaggiù, quiggiù, ingiù, suppergiù
*più//più, viepiù, perlopiù, dappiù, soprappiù, sovrappiù, schiavitù
servitù
gioventù
virtù
tutù
Belzebù CAPITAL GRAVE
Gù CAPITAL GRAVE Il San Pietro in Gù (city near Padova)
//BEGIN parole rare
clatù
marabù//uccello
zebù//ungulato
caribù//ungulato
catecù
nandù
cudù//ungulato
sagù
cacciù
fisciù
chiù
putipù
ecrù//"color ecrù" found in MondOffice catalog
//END parole rare
//BEGIN POST-FALLBACK VERBS
rifù GRAVE TRICKYCOMPOUND=fu
//END POST-FALLBACK VERBS
//CONSONANTS
qual NOTHING//(poichè si tratta di troncamento e non di elisione, non si apostrofa mai: "qual è" e non "qual'è")
suor NOTHING//(non si apostrofa mai
tal NOTHING//(non si apostrofa mai)
//REPLACEMENTS
élite TRICKYINSIDE COMPLEX=élite
équipe TRICKYINSIDE COMPLEX=équipe
ménage TRICKYINSIDE COMPLEX=ménage
purée TRICKYINSIDE COMPLEX=purée//(per default verrebbe corretto a rovescio, per prime 4 lettere)
tournée TRICKYINSIDE COMPLEX=tournée
réclame TRICKYINSIDE COMPLEX=réclame//arguable, considering practical use in IT
mèches TRICKYINSIDE COMPLEX=mèches
mèche TRICKYINSIDE COMPLEX=mèche
entrée TRICKYINSIDE COMPLEX=entrée
Cézanne CAPITAL TRICKYINSIDE COMPLEX=Cézanne
//POSTAPOSTROPHE
POSTAPOSTROPHE//Teri's
d POSTAPOSTROPHE//Teri'd rather be
||POSTAPOSTROPHE//Teri'll go
ve POSTAPOSTROPHE//people've done
em POSTAPOSTROPHE//take'em It is believed that the method and apparatus for processing text and character data of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of processing text received from an input device, the method comprising:
   receiving a sequence of one or more input text characters forming a word;
   detecting an occurrence of at least one of: an undetermined phonetic emphasis status, a possible vowel accent error or apostrophe error in the sequence of one or more input text characters forming a word;
   modifying at least one input text character of the sequence of one or more input text characters forming a word to include at least one of a modified, added or removed vowel accent or apostrophe in response to a detection of the occurrence;
   detecting an actuation of at least one element of a user input device associated with at least one of: an apostrophe character, or a last character of the sequence of one or more input text characters forming a word; and
   modifying at least one input text character of the sequence of one or more input text characters forming a word in response to the actuation of the at least one element of the user input device.

2. The method of claim 1, wherein the detecting an occurrence of at least one of: an undetermined phonetic emphasis status, a possible vowel accent error or apostrophe error in the sequence of one or more input text characters forming a word comprises:
   detecting an actuation of an element of a user input device for a predetermined duration.

3. The method of claim 1, wherein the detecting an occurrence of at least one of: an undetermined phonetic emphasis status, a possible vowel accent error or apostrophe error in the sequence of one or more input text characters forming a word includes:
   detecting an activator sequence of one or more input text characters forming a word.

4. The method of claim 2, wherein the modifying at least one input text character of the sequence of one or more input characters forming a word in response to the actuation of at least one element of the user input device comprises:
   modifying one or more input characters a word in response to a duration of the actuation of the element of the user input device associated with the last character of the activator sequence.

5. The method of claim 1, wherein the modifying at least one input text character of the sequence of one or more input text characters forming a word to include at least one of a modified, added or removed vowel accent or apostrophe in response to a detection of the occurrence comprises:
   providing a first placement of at least one of an Italian vowel accent and an apostrophe.

6. The method of claim 1, further comprising:
   displaying a confidence level indicator based on a predicted accuracy of a modified word.

7. The method of claim 1, further comprising:
   displaying a context-specific language information user assistance.

8. The method of claim 1, further comprising:
detecting a first condition where the word is at least one of a possible correct Italian word, a possible unknown Italian word, or a possible non-Italian word;
detecting a second condition where a single closing quote is pending from the context of the input text;
disregarding a modification of the word if both said first and second conditions are detected.

9. The method of claim 8, further comprising:
detecting a third condition when a word in the input text immediately following an activator sequence of one or more characters is associated with an apostrophe mark which in languages other than Italian is used to indicate at least one of a genitive case, an omission of letters, or a plurality of letters; and
restoring an original form of the modified word.

10. The method of claim 1, wherein the modifying at least one input text character of the sequence of one or more input text characters forming a word to include at least one of a modified, added or removed vowel accent or apostrophe in response to a detection of the occurrence includes:
modifying at least one input text character of the sequence of one or more input text characters forming a word according to a previous modification of the word in response an actuation of the at least one user interface element.

11. The method of claim 1, further comprising:
displaying a list of alternative modifications of the word.

12. The method of claim 1, wherein the modifying at least one input text character of the sequence of one or more input text characters forming a word to include at least one of a modified, added, or removed vowel accent or apostrophe in response to a detection of the occurrence includes:
modifying at least one input text character of the sequence of one or more input text characters forming a word based upon a frequency of occurrence of a modification of the word.

13. The method of claim 1, wherein the modifying at least one input text character of the sequence of one or more input text characters forming a word to include at least one of a modified, added, or removed vowel accent or apostrophe in response to a detection of the occurrence includes:
modifying at least one input text character of the sequence of one or more input text characters forming a word based upon a rules list for one or more modifications of the word.

14. The method of claim 13, wherein the rules list comprises a fallback rule for the event in which the rules list does not provide one or more modifications of the word.

15. A computer-implemented system of processing text received from an input device, the system comprising:
a user input device configured for:
receiving a sequence of one or more input text characters forming a word;
a processing device configured for:
detecting an occurrence of at least one of: an undetermined phonetic emphasis status, a possible vowel accent error or apostrophe error in the sequence of one or more input text characters forming a word;
modifying at least one input text character of the sequence of one or more input text characters forming a word to include at least one of a modified, added or removed vowel accent or apostrophe in response to a detection of the occurrence;
detecting an actuation of at least one element of a user input device associated with at least one of: an apostrophe character, or a last character of the sequence of one or more input text characters forming a word; and
modifying at least one input text character of the sequence of one or more input text characters forming a word in response to the actuation of the at least one element of the user input device.

\* \* \* \* \*